(12) United States Patent
Lee et al.

(10) Patent No.: US 10,949,094 B2
(45) Date of Patent: Mar. 16, 2021

(54) STORAGE DEVICE AND OPERATING METHOD OF STORAGE DEVICE

(71) Applicant: SAMSUNG ELECTRONICS CO., LTD., Suwon-si (KR)

(72) Inventors: Han-Ju Lee, Hwaseong-si (KP); Youngkwang Yoo, Yongin-si (KR); Youngjin Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/298,318

(22) Filed: Mar. 11, 2019

(65) Prior Publication Data

US 2019/0205037 A1 Jul. 4, 2019

Related U.S. Application Data

(63) Continuation of application No. 15/055,689, filed on Feb. 29, 2016, now Pat. No. 10,261,697.

(30) Foreign Application Priority Data

Jun. 8, 2015 (KR) .................. 10-2015-0080636
Jun. 8, 2015 (KR) .................. 10-2015-0080741
Jun. 25, 2015 (KR) .................. 10-2015-0090652

(51) Int. Cl.
*G06F 3/06* (2006.01)
*G06F 13/38* (2006.01)

(52) U.S. Cl.
CPC .......... *G06F 3/0611* (2013.01); *G06F 3/0656* (2013.01); *G06F 3/0659* (2013.01); *G06F 3/0688* (2013.01); *G06F 13/385* (2013.01)

(58) Field of Classification Search
CPC .... G06F 13/385; G06F 3/0611; G06F 3/0656; G06F 3/0659; G06F 3/0688
(Continued)

(56) References Cited

U.S. PATENT DOCUMENTS 6,643,787 B1 * 11/2003 Zerbe .................. G06F 1/10
  713/400
7,020,818 B2 ‡ 3/2006 Dour ................ H03K 19/00384
  326/30

(Continued)

FOREIGN PATENT DOCUMENTS

EP 2458505 A1 ‡ 5/2012 ......... G06F 13/1657
EP 2458505 B1 10/2014
(Continued)

*Primary Examiner* — Hashem Farrokh
(74) *Attorney, Agent, or Firm* — Volentine, Whitt & Francos, PLLC

(57) ABSTRACT

A storage device includes a data buffer, a device controller, and nonvolatile memories. The data buffer is configured to transact data from an external device. The device controller is configured to receive a command and an address from an external device, to control the data buffers, and to transact data with the data buffers. The nonvolatile memories are configured to perform write, read, and erase operations under control of the device controller. When a first link training between an external device and the data buffers is performed by the external device, the device controller performs a second link training between the device controller and a data buffer internally without control of the external device.

14 Claims, 49 Drawing Sheets

(58) Field of Classification Search
USPC .......................................................... 711/100
See application file for complete search history.

(56) References Cited

U.S. PATENT DOCUMENTS

| | | | | |
|---|---|---|---|---|
| 7,432,731 | B2 ‡ | 10/2008 | Bains | G11C 7/1051 326/30 |
| 7,454,671 | B2 ‡ | 11/2008 | Adsitt | G11C 29/56 714/71 |
| 7,473,568 | B2 ‡ | 1/2009 | Co | G01R 31/3016 |
| 7,539,912 | B2 ‡ | 5/2009 | Chan | G11C 5/04 714/71 |
| 7,657,803 | B2 ‡ | 2/2010 | Chae | G06F 11/2221 365/20 |
| 7,668,028 | B2 ‡ | 2/2010 | Kim | G11C 29/1201 365/18 |
| 7,679,133 | B2 ‡ | 3/2010 | Son | H01L 21/8221 257/32 |
| 7,717,752 | B2 ‡ | 5/2010 | Loughner | G11C 5/04 439/63 |
| 7,865,660 | B2 ‡ | 1/2011 | Guo | G06F 13/4239 327/15 |
| 7,873,885 | B1 ‡ | 1/2011 | Shin | G11C 29/56 365/18 |
| 8,020,055 | B2 ‡ | 9/2011 | Nguyen | G11C 29/02 365/20 |
| 8,041,990 | B2 ‡ | 10/2011 | O'Connor | G06F 11/108 714/25 |
| 8,086,919 | B2 ‡ | 12/2011 | Chen | G11C 29/16 714/72 |
| 8,296,496 | B2 ‡ | 10/2012 | Mogul | G06F 12/023 711/10 |
| 8,390,315 | B1 * | 3/2013 | Wang | H03K 19/018571 326/26 |
| 8,397,013 | B1 ‡ | 3/2013 | Rosenband | G06F 13/385 365/20 |
| 8,407,394 | B2 ‡ | 3/2013 | Mazzola | G06F 12/06 711/11 |
| 8,423,700 | B2 ‡ | 4/2013 | Panabaker | G06F 12/06 711/10 |
| 8,553,466 | B2 ‡ | 10/2013 | Han | G11C 16/04 365/18 |
| 8,559,235 | B2 ‡ | 10/2013 | Yoon | G11C 16/0483 365/18 |
| 8,565,034 | B1 ‡ | 10/2013 | Lu | G06F 13/1689 365/18 |
| 8,612,712 | B2 ‡ | 12/2013 | Larson | G06F 13/4243 711/16 |
| 8,654,587 | B2 ‡ | 2/2014 | Yoon | G11C 16/0483 365/18 |
| 8,694,721 | B2 ‡ | 4/2014 | Haywood | G06F 13/1642 711/10 |
| 8,694,812 | B2 ‡ | 4/2014 | Vedder | G06F 1/263 713/32 |
| 8,745,450 | B2 ‡ | 6/2014 | Sutardja | G06F 11/1008 714/70 |
| 8,767,471 | B2 ‡ | 7/2014 | Chen | G06F 13/1689 365/18 |
| 8,874,831 | B2 ‡ | 10/2014 | Lee | G06F 12/0246 711/10 |
| 8,885,426 | B1 ‡ | 11/2014 | Burstein | G11C 29/40 365/14 |
| 8,909,856 | B2 ‡ | 12/2014 | Bains | G11C 7/22 711/10 |
| 9,087,614 | B2 ‡ | 7/2015 | Son | G11C 29/4401 |
| 2006/0265161 | A1 ‡ | 11/2006 | Querbach | G11C 29/02 702/79 |
| 2007/0217559 | A1 ‡ | 9/2007 | Stott | G11C 7/1051 375/355 |
| 2008/0126690 | A1 ‡ | 5/2008 | Rajan | G06F 12/06 711/10 |
| 2008/0294951 | A1 ‡ | 11/2008 | Ahmad | G11C 29/10 714/71 |
| 2010/0005212 | A1 ‡ | 1/2010 | Gower | G06F 13/4234 710/30 |
| 2011/0016267 | A1 ‡ | 1/2011 | Lee | G06F 13/28 711/103 |
| 2011/0233648 | A1 ‡ | 9/2011 | Seol | H01L 21/32137 257/32 |
| 2012/0260137 | A1 ‡ | 10/2012 | Berke | G06F 13/1673 714/721 |
| 2014/0177353 | A1 ‡ | 6/2014 | Park | G11C 13/0002 365/18 |
| 2014/0215129 | A1 * | 7/2014 | Kuzmin | G06F 12/0246 711/103 |
| 2014/0237205 | A1 ‡ | 8/2014 | Takefman | H03M 13/05 711/16 |
| 2014/0279759 | A1 ‡ | 9/2014 | Yang | G06F 3/0671 706/12 |
| 2015/0066819 | A1 * | 3/2015 | Mozak | G05B 13/02 706/12 |
| 2015/0092477 | A1 ‡ | 4/2015 | Chiou | G11C 11/417 365/15 |
| 2015/0310898 | A1 ‡ | 10/2015 | Takefman | G11C 7/1012 711/105 |
| 2016/0011802 | A1 * | 1/2016 | Berke | G06F 3/0632 711/166 |

FOREIGN PATENT DOCUMENTS

| | | |
|---|---|---|
| JP | 5349470 B2 | 9/2010 |
| KR | 10-2014-0067875 A | 6/2014 |

\* cited by examiner
‡ imported from a related application

STORAGE DEVICE AND OPERATING METHOD OF STORAGE DEVICE

CROSS-REFERENCE TO RELATED APPLICATIONS

This is a Continuation of U.S. application Ser. No. 15/055,689, filed Feb. 29, 2016, which claims priority under 35 U.S.C. § 119 is made to Korean Patent Application No. 10-2015-0080636 filed Jun. 8, 2015, Korean Patent Application No. 10-2015-0080741 filed Jun. 8, 2015, and Korean Patent Application No. 10-2015-0090652 filed on Jun. 25, 2015 in the Korean Intellectual Property Office, the entire contents of which are hereby incorporated by reference.

BACKGROUND

Embodiments of the disclosure relate to a semiconductor memory and, in particular, to a storage device and an operating method thereof.

A computing device includes a processor, a main memory device, and a storage device. With the advancement of semiconductor technologies, the performance of the processor, the main memory device, and storage device is being improved. As the performance of the processor, the main memory device, and the storage device advances, the performance of the computing device is also improved.

In general, an operating speed of the computing device is limited by the performance of the storage device. However, nonvolatile memories such as a phase-change random access memory (PRAM), a resistive RAM (RRAM), a magnetic RAM (MRAM), a ferroelectric RAM (FeRAM), and the like are applied to the storage device, thereby markedly improving the storage device. This means that the operating speed of the computing device is limited by a communication speed between the processor and the storage device, not the performance of the storage device.

Accordingly, there is required a new device and method capable of improving the communication speed between the processor and the storage device. Furthermore, there is required a new device and method capable of solving problems due to the improvement of the communication speed between the processor and the storage device.

SUMMARY

Embodiments of the disclosure provide a storage device with improved communication speed and flexibility and an operating method thereof.

One aspect of embodiments of the disclosure is directed to provide a storage device having data buffers, a device controller, and nonvolatile memories. The data buffers are configured to convey data from an external device. The device controller is configured to receive a command and an address from the external device, to control the data buffers, and to transact data with the data buffers. The nonvolatile memories are configured to transact data with the device controller and to perform write, read, and erase operations under control of the device controller. When a first link training between the external device and the data buffers is performed by the external device, the device controller may perform a second link training between the device controller and the data buffers without control of the external device.

Another aspect of embodiments of the disclosure is directed to provide a storage device having data buffers, a device controller, and nonvolatile memories. The data buffers are configured to convey data from an external device. The device controller is configured to receive a command and an address from the external device, to control the data buffers, and to transact data with the data buffers. The nonvolatile memories are configured to transact data with the device controller and to perform write, read, and erase operations under control of the device controller. The device controller may select one of a first link training sequence and a second link training sequence and may perform a link training with the external device based on the selected link training sequence.

Still another aspect of embodiments of the disclosure is directed to provide an operating method of a storage device which includes data buffers, a device controller, and nonvolatile memories. The operating method may include performing a first link training between an external device and the data buffers under control of the external device and performing a second link training between the data buffers and the device controller without control of the external device.

Still another aspect of embodiments of the disclosure is directed to provide a nonvolatile memory controller. The nonvolatile memory controller includes a random access memory that communicates a data signal and a data strobe signal with an external host device. A random access memory controller circuit interprets a command received from the external host. A process, voltage, temperature (PVT) compensation processor compensates a communication parameter of the random access memory or the random access memory controller circuit when the interpreted command is a refresh command or a precharge command.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
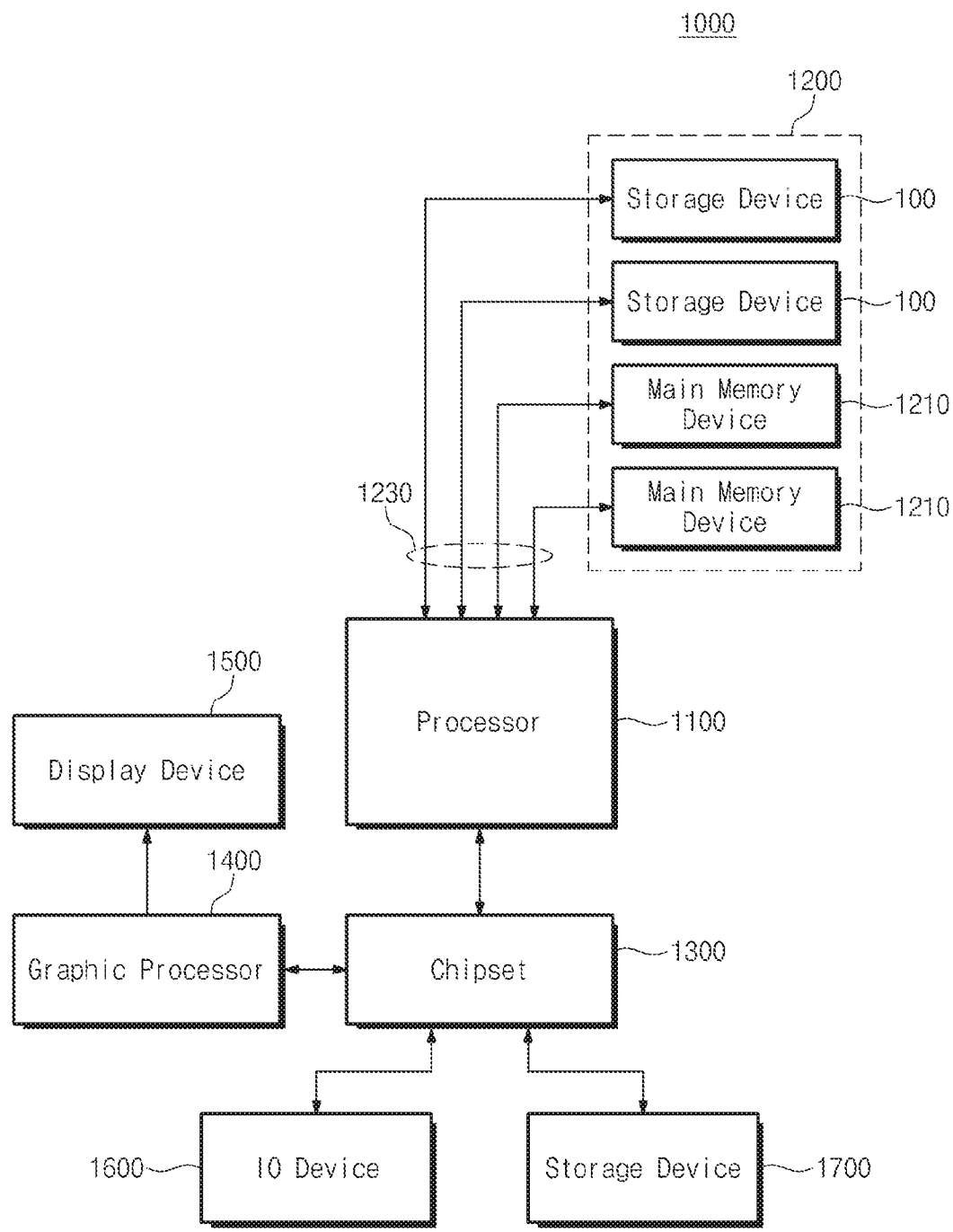
FIG. 1 is a block diagram illustrating a computing device according to an embodiment of the disclosure.

Below, embodiments are described to let those skilled in the art know the category of the disclosure.

While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. It will be understood that, although the terms "first," "second," "A," "B," etc. may be used herein in reference to elements of the disclosure, such elements should not be construed as being limited by these terms.

For example, a first element could be termed a second element, and a second element could be termed a first element, without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements.

Other words used to describe relationships between elements should be interpreted in a like fashion (i.e., "between" versus "directly between," "adjacent" versus "directly adjacent," etc.). The terminology used herein to describe embodiments of the disclosure is not intended to limit the scope of the disclosure. The articles "a," "an," and "the" are singular in that they have a single referent, however the use of the singular form in the present document should not preclude the presence of more than one referent.

It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof. Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this disclosure and the relevant art and will not be interpreted in an idealized or overly formal sense unless expressly so defined herein.

FIG. 1 is a block diagram illustrating a computing device 1000 according to an embodiment of the disclosure. Referring to FIG. 1, a computing device 1000 may include a processor 1100, a high-speed storage device 1200, a chipset 1300, a graphic processor 1400, a display device 1500, an input/output device 1600, and a storage device 1700.

The processor 1100 may control an overall operation of the computing device 1000 and may perform a logic operation. The processor 1100 may drive an operating system (OS) and applications. The processor 1100 may be a central processing unit (CPU) or an application processor (AP).

The high-speed storage device 1200 may be configured to communicate with the processor 1100 through the high-speed interface 1230. The high-speed storage device 1200 may include the main memory device 1210 and the storage device 100. The main memory device 1210 may be used as a working memory of the processor 1100. The main memory device 1210 may include a DRAM, in more detail, a double data rate (DDR) synchronous DRAM (SDRAM). The main memory device 1210 may be configured to operate based on the specification of a dual in-line memory module (DIMM), in more detail, the specification of a registered DIMM (RDIMM) or a load reduced DIMM (LRDIMM). The high-speed interface 1230 may include a DIMM interface defined by the DIMM specification.

Like the main memory device 1210, the storage device 100 may be connected with the processor 1100 through the high-speed interface 1230, for example, the DIMM interface. The storage device 100 may include nonvolatile memories such as a PRAM, an RRAM, an MRAM, an FeRAM, and the like. The storage device 100 may be configured to operate based on the specification of the DIMM, in detail, the specification of the RDIMM or the LRDIMM.

The chipset 1300 may be configured to arbitrate the connection between the processor 1100 and other devices in response to control of the processor 1100. For example, the chipset 1300 may include a South Bridge. Furthermore, the chipset 1300 may include various devices such as a sound processor, an Ethernet adapter, and the like.

The graphic processor 1400 may perform image processing and may display an image through the display device 1500. The graphic processor 1400 may be a graphic processing unit (GPU). In an embodiment, the graphic processor 1400 may be included in the chipset 1300.

The display device 1500 may output an image in response to control of the graphic processor 1400. For example, the display device 1500 may include a liquid crystal display (LCD) device, a light emitting diode (LED) display device, a beam projector, and the like.

The input/output device 1600 may include an input device receiving a signal from a user and an output device outputting a signal thereto. For example, the input/output device 1600 may include input devices such as a keyboard, a mouse, a microphone, a touch pad, a touch screen, and the like and output devices such as a speaker, a lamp, a printer, and the like.

The storage device 1700 may operate in response to control of the chipset 1300. The storage device 1700 may communicate with the chipset 1300 based on an interface such as a serial advanced technology attachment (SATA), a universal serial bus (USB), a universal flash storage (UFS), a peripheral component interconnect (PCI), an express PCI, an NVMexpress, a small computer system interface (SCSI), a serial attached SCSI (SAS), and the like.

A communication speed of the storage device 100 (e.g., a communication speed of the processor 1100) directly connected with the processor 1100 through the high-speed interface 1230 may be higher than that of the storage device 1700 (e.g., a communication speed of the chipset 1300) connected to the chipset 1300. Accordingly, the operating performance of the computing device 1000 may be improved if the storage device 100 connected with the processor through the high-speed interface 1230 is provided.

Figure 2:
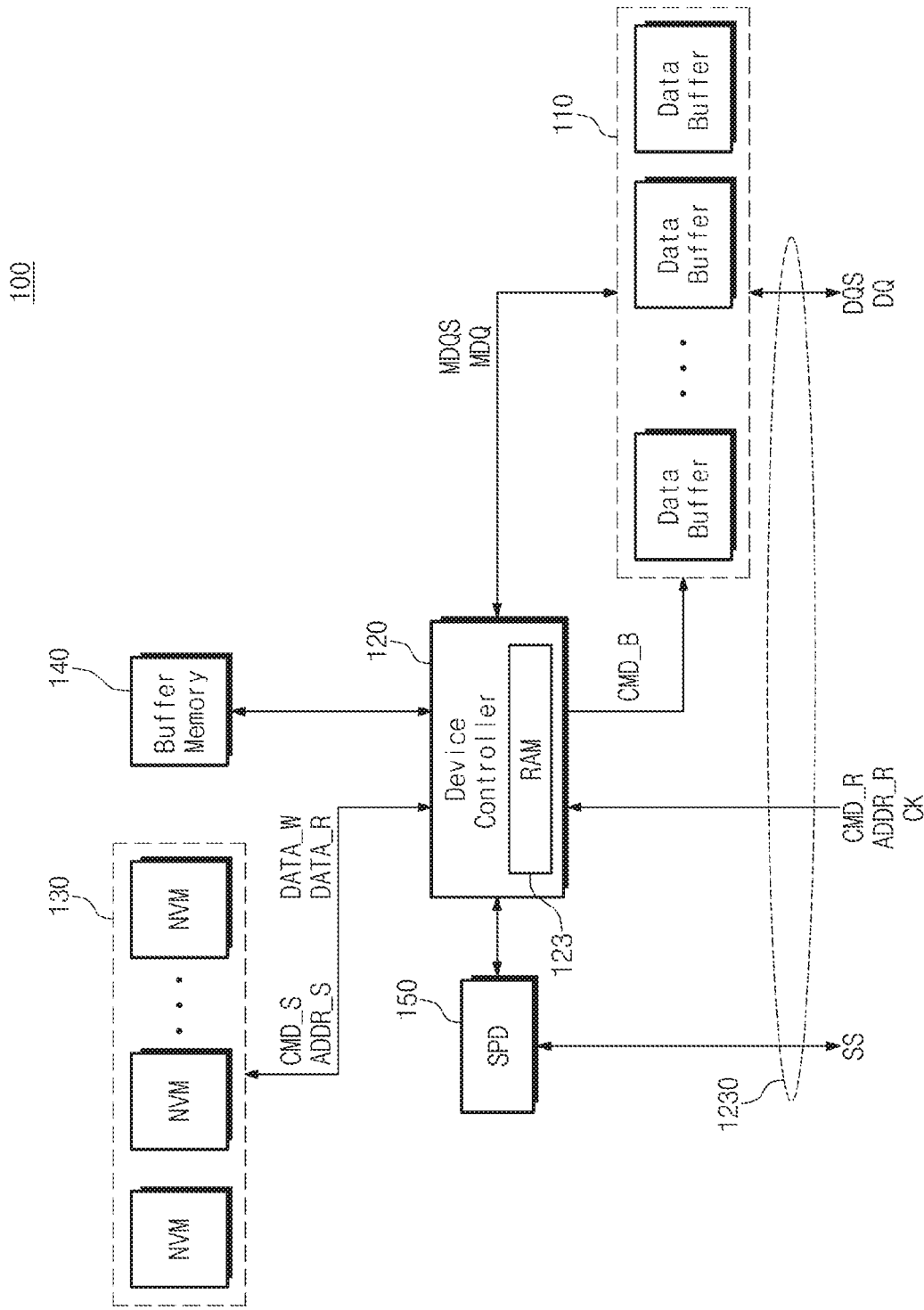
FIG. 2 is a block diagram schematically illustrating a storage device according to an embodiment of the disclosure.

FIG. 2 is a block diagram schematically illustrating a storage device 100 according to an embodiment of the disclosure. Referring to FIGS. 1 and 2, the storage device 100 may include data buffers 110, a device controller 120, nonvolatile memories (NVM) 130, a buffer memory 140, and a serial presence detect (SPD) 150.

The data buffers 110 may receive data signals DQ and data strobe signals DQS from the processor 1100 through the high-speed interface 1230. The data buffers 110 may be configured or installed according to a manner defined by the DDR4 LRDIMM specification. For example, the storage device 100 may include nine data buffers 110. Each of the data buffers 110 may transmit and receive eight data signals DQ and two data strobe signals DQS to and from an external device, for example, the processor 1100. Each of the data buffers 110 may transmit and receive eight data signals DQ and two data strobe signals DQS to and from a device controller 120.

For example, the data buffers 110 may receive the data signals DQ and the data strobe signals DQS from the processor 1100 and may convert and output the received data signals DQ and the received data strobe signals DQS into internal data signals MDQ and internal data strobe signals MDQS. The data buffers 110 may receive the internal data signals MDQ and the internal data strobe signals MDQS from the device controller 120 and may convert and output the received internal data signals MDQ and the internal data strobe signals MDQS into the data signals DQ and the data strobe signals DQS.

The device controller 120 may communicate the internal data signals MDQ and the internal data strobe signals MDQS with the data buffers 110. The device controller 120 may receive a RAM command CMD_R, a RAM address ADDR_R, a clock CK from the processor 1100 through the high-speed interface 1230.

The RAM command CMD_R may be a command for requesting an access about an internal RAM 123 of the device controller 120. The RAM address ADDR_R may be an address belonging to an address range of the RAM 123. The device controller 120 may write data, which is received as data signals DQ of the high-speed interface 1230 through the data buffers 110, in the RAM 123 in response to the RAM command CMD_R and the RAM address ADDR_R received through the high-speed interface 1230. The device controller 120 may output data, which is stored in the RAM 123, through the data buffers 110 as the data signals DQ of the high-speed interface 1230 in response to the RAM command CMD_R and the RAM address ADDR_R received through the high-speed interface 1230. That is, a physical layer of the processor 1100 may recognize the RAM 123 of the storage device 100 as being connected to the high-speed interface 1230. The physical layer of the processor 1100 may access the RAM 123 using the RAM command CMD_R and the RAM address ADDR_R.

The device controller 120 may detect a storage command CMD_S and a storage address ADDR_S of the nonvolatile memory 130 from data stored in the RAM 123. The device controller 120 may write, in the nonvolatile memories 130, write data DATA_W of data stored in the RAM 123 in response to the storage command CMD_S and the storage address ADDR_S. In response to the storage command CMD_S and the storage address ADDR_S, the device controller 120 may read data from the nonvolatile memories 130 and may store the read data DATA_R in the RAM 123. That is, an upper layer of the physical layer of the processor 1100, for example, a device driver of the processor 1100 may recognize the nonvolatile memories 130 as being connected to the high-speed interface through the RAM 123. The device driver of the processor 1100 may transact the storage command CMD_S, the storage address ADDR_S, and data about the nonvolatile memories 130 with the storage device 100 through the data signals DQ of the high-speed interface 1230. A method in which the processor 1100 accesses the storage device 100 will be described with reference to FIGS. 7 to 9.

The device controller 120 may transmit a buffer command CMD_B to the data buffers 110. For example, the device controller 120 may output the RAM command in response to the RAM command CMD_R or the RAM address ADDR_R or without the RAM command CMD_R or the RAM address ADDR_R. The buffer command CMD_B may be transmitted in common to the data buffers 110.

The device controller 120 may be configured to control the buffer memory 140 and to communicate with the buffer memory 140. The buffer memory 140 may include random access memories such as a DRAM, an SRAM, a PRAM, an MRAM, an RRAM, an FeRAM, and the like. The device controller 120 may load metadata for managing the nonvolatile memories 130 onto the buffer memory 140. For example, the device controller 120 may load, onto the buffer memory 140, a mapping table including mapping information between logical addresses, allocated to the nonvolatile memories 130 by the processor 1100, and physical addresses of the nonvolatile memories 130. The device controller 120 may read the mapping table from the nonvolatile memories and may load the read mapping table onto the buffer memory 140. In an embodiment, the buffer memory 140 may be included in the device controller 120.

The SPD 150 may be configured to communicate with the processor 1100 through supplemental signals SS of the high-speed interface 1230. Furthermore, the SPD 150 may be configured to communicate with the device controller 120 through the supplemental signals SS. The supplemental signals SS may include serial peripheral interface (SPI) signals, inter-integrated circuits (I2C) signals, universal asynchronous receiver/transmitter (UART) signals, and the like. For example, the SPD 150 may store information about physical, logical, and driving characteristics of the storage device 100. When power is supplied to the computing device 1000, information stored in the SPD 150 may be read through the supplemental signals SS of the high-speed interface 1230 by the power 1100.

As illustrated in FIG. 1, the storage device 100 according to an embodiment of the disclosure may be connected with the processor 1100 through the high-speed interface 1230. The processor 1100 may be connected with the storage device 100 and the main memory device 1210 through the high-speed interface 1230. The main memory device 1210 may be manufactured according to the RDIMM or LRDIMM specification. In the case where a device based on the RDIMM specification and a device based on the LRDIMM specification are connected to the high-speed interface 1230, collision may arise from the high-speed interface 1230 or an abnormal operation may occur.

To solve the above-described problems, the storage device 100 according to an embodiment of the disclosure may support a link training sequence according to the RDIMM specification even though including the data buffers 110 according to the LRDIMM specification. The link training sequence may include various setting or adjustment operations performed to improve communication quality between the processor 1100 and the storage device 100 when the computing device 1000 is powered and initialized. In the case where the storage device 100 supports the link training sequence of the RDIMM, the main memory device 1210 and the storage device 100 may be recognized as being devices based on the RDIMM specification. Accordingly, it may be possible to prevent collision arising from the high-speed interface 1230 and to improve the communication speed and flexibility of the storage device 100.

Figure 3:
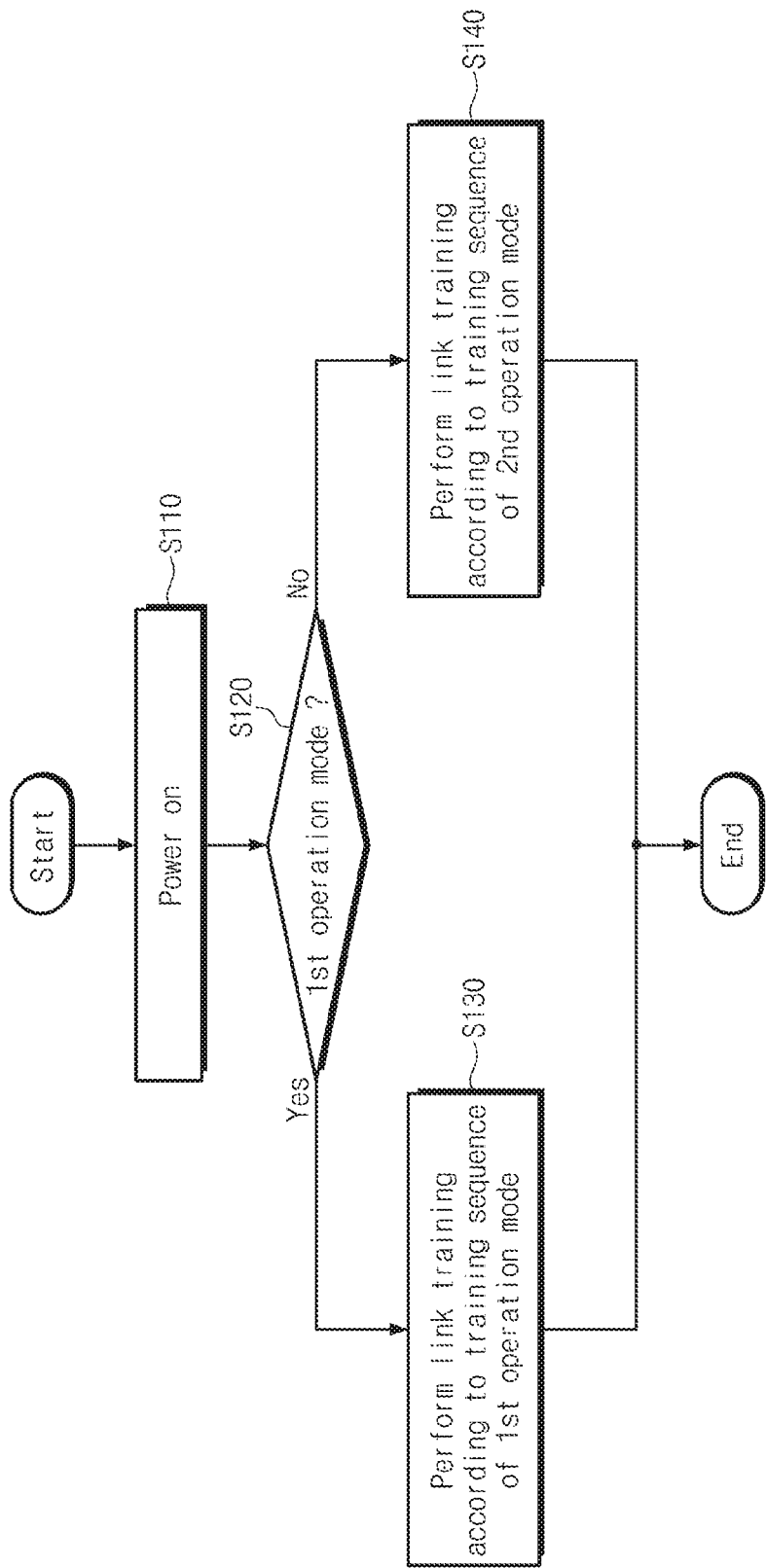
FIG. 3 is a flow chart schematically illustrating an operating method of a storage device according to an embodiment of the disclosure.

FIG. 3 is a flow chart schematically illustrating an operating method of a storage device 100 according to an embodiment of the disclosure. Referring to FIGS. 1 to 3, in step S110, the storage device 100 may be powered on. For example, the storage device 100 may be supplied with power when the computing device 1000 is powered on.

In step S120, the storage device 100 may determine whether a first operating mode is set or a second operating mode is set. For example, the first operating mode may be an RDIMM mode. The second operating mode may be an LRDIMM mode. For example, the storage device 100 may store information indicating that it is able to support the first operating mode and the second operating mode, in the SPD 150. Information stored in the SPD 150 may be transmitted to the processor 1100 if power is supplied to the computing device 1000 and the storage device 100. The processor 1100 may determine whether to set the storage device 100 to have the first operating mode or the second operating mode.

In the case of setting the storage device 100 to have the first operating mode, the processor 1100 may transmit information for setting the first operating mode to the storage device 100. In the case of setting the storage device 100 to have the second operating mode, the processor 1100 may transmit information for setting the second operating mode to the storage device 100. For example, information for setting the first operating mode or the second operating mode may be transmitted to the storage device 100 through the RAM command CMD_R or the RAM address ADDR_R associated with a mode register set (MRS). For example, information for setting the first operating mode or the second operating mode may be transmitted to the storage device 100 through the data signals DQ or supplemental signals SS.

In the case where the storage device 100 is set to have the first operating mode, in step S130, the storage device 100 may perform a link training based on a training sequence of the first operating mode. For example, the storage device 100 may perform the link training which satisfies the training sequence defined by the RDIMM specification.

In the case where the storage device 100 is set to have the second operating mode, in step S140, the storage device 100 may perform a link training based on a training sequence of the second operating mode. For example, the storage device 100 may perform the link training which satisfies the training sequence defined by the LRDIMM specification.

Figure 4:
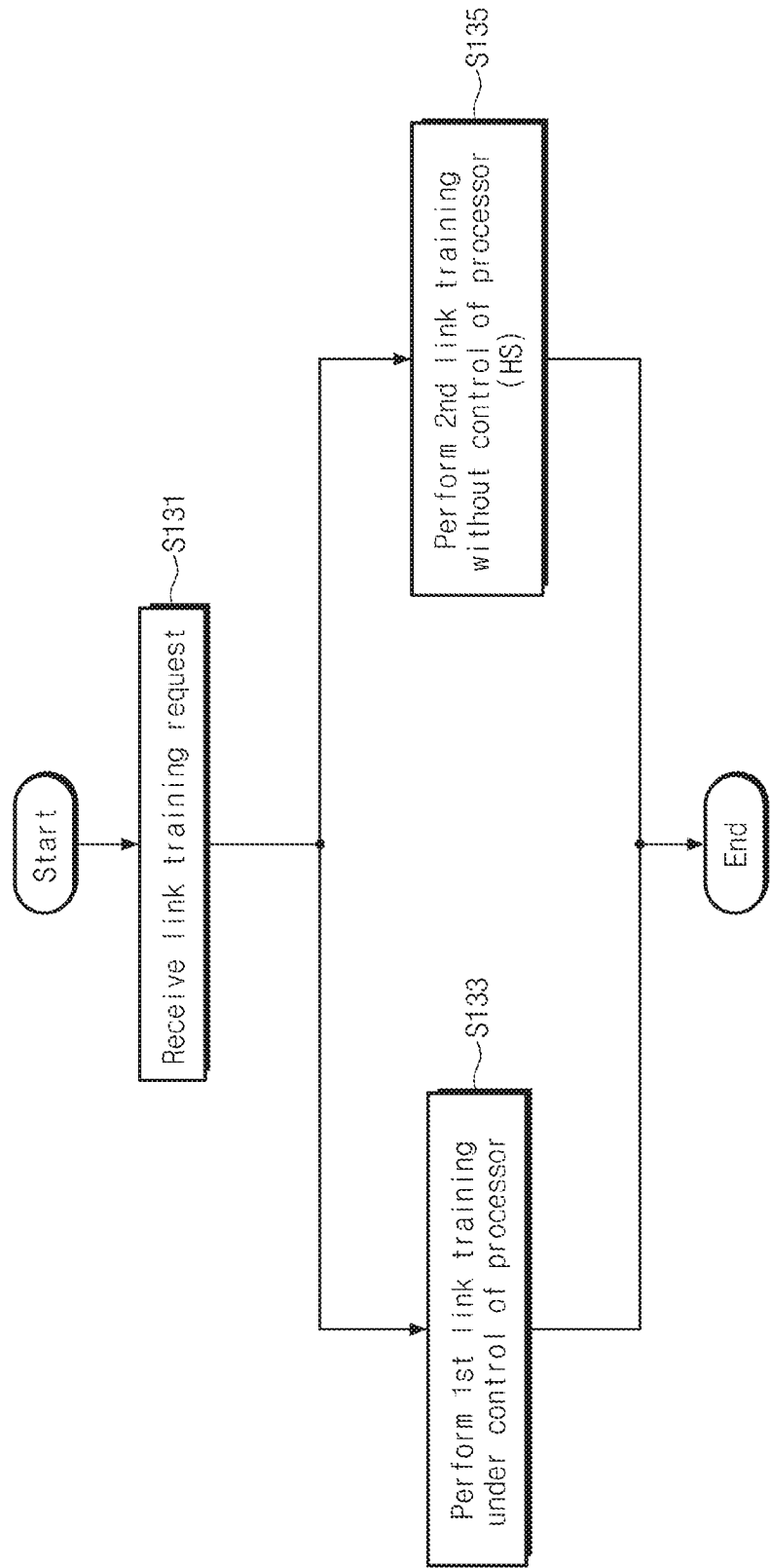
FIG. 4 is a flow chart schematically illustrating a link training performed according to a training sequence of a first operating mode.

FIG. 4 is a flow chart schematically illustrating a link training performed according to a training sequence of a first operating mode. Referring to FIGS. 1, 2, and 3, the storage device 100 may perform the link training which satisfies the training sequence defined by the RDIMM specification.

In step S131, the storage device 100 may receive a link training request from the processor 1100.

In step S133, the storage device 100 may perform the first link training with the processor 1100 in response to the link training request, which is performed under control of the processor 1100. For example, the storage device 100 may perform the link training between the data buffers 110 and the processor 1100 or between the device controller 120 and the processor 1100 through the high-speed interface 1230.

In step S135, the storage device 100 may receive a link training request without control of the processor 1100. For example, the storage device 100 may perform the link training between the data buffers 110 and the device controller 120.

The first link training and the second link training may be performed in parallel, sequentially, independently, or simultaneously. A part of the first link training or the second link training may be performed while the second link training or the first link training is being performed. The execution order and timing of the first link training and operations in the first link training and the execution order and timing of the second link training and operations in the second link training may not be limited. Since not identified by the processor 1100, the second link training may be a hidden sequence (HS).

Figure 5:
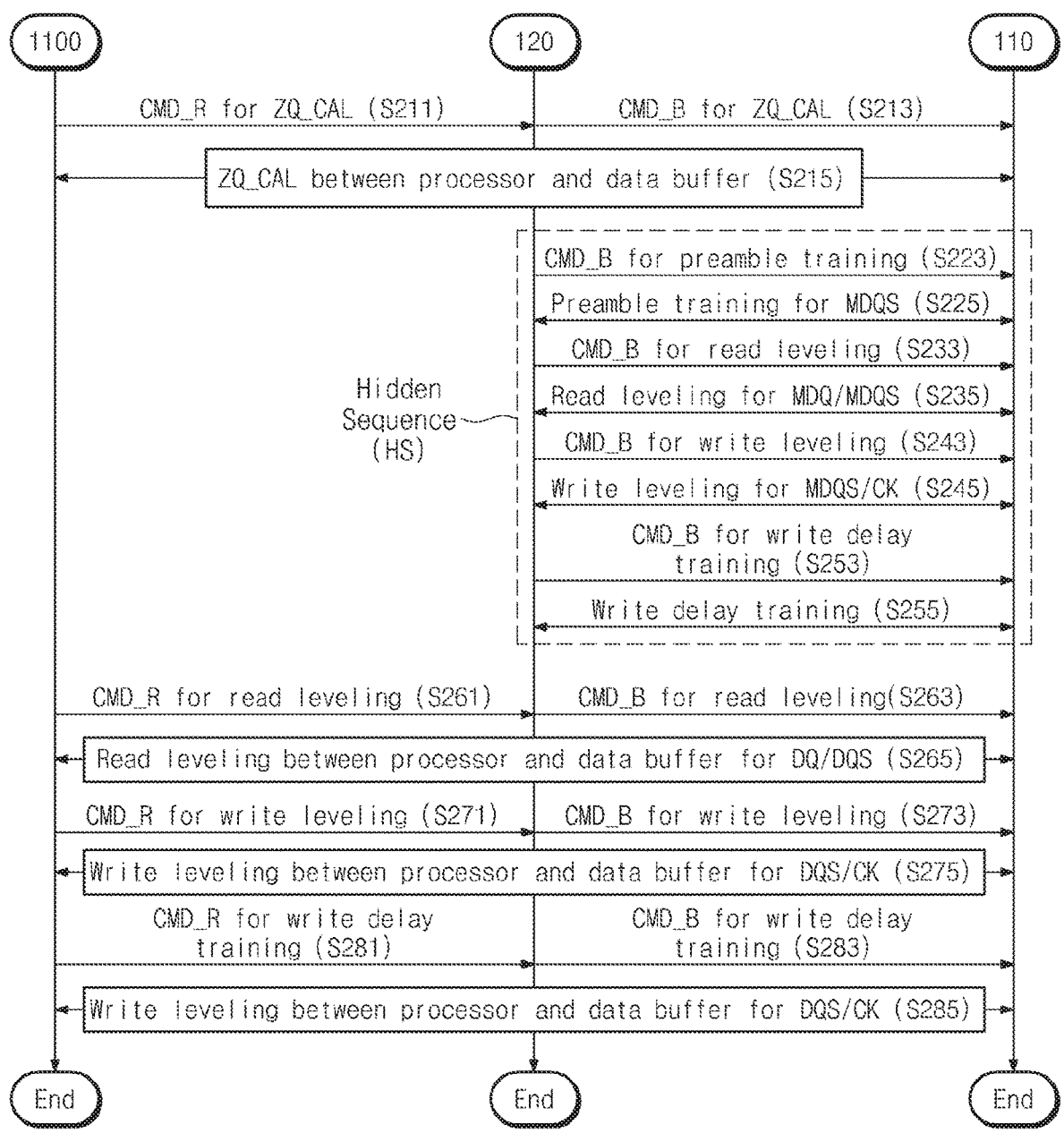
FIG. 5 is a flow chart illustrating a link training performed according to a training sequence of a first operating mode.

FIG. 5 is a flow chart illustrating a link training performed according to a training sequence of a first operating mode. Referring to FIGS. 1, 2, and 5, in step S211, the processor 1100 may transmit the RAM command CMD_R for requesting execution of ZQ-calibration ZQ_CAL, to the device controller 120. In step S213, the device controller 120 may transmit the buffer command CMD_B, requesting execution of the ZQ-calibration ZQ_CAL, to the data buffers 110 through the high-speed interface 1230. In step S215, the ZQ-calibration ZQ_CAL may be executed between the processor 1100 and the data buffers 110 through the high-speed interface 1230 under control of the processor 1100.

If the link training between the processor 1100 and the storage device 100 is initiated by the processor 1100, the storage device 100 may perform the second link training based on the hidden sequence HS. For example, if: (1) the RAM command indicates a start of the link training, (2) the RAM command requesting the ZQ-calibration, or (3) the RAM command associated with the link training is received from the processor 1100, the device controller 120 may determine that the link training with the processor 1100 starts. The device controller 120 may perform the first link training with the processor 1100 under control of the processor 1100 or the device controller 120 may perform the second link training with the data buffers 110 based on the hidden sequence HS, without control of the processor 1100.

In step S223, the device controller 120 may transmit the buffer command CMD_B requesting a preamble training to the data buffers 110. In step S225, the device controller 120 may perform the preamble training with the data buffers 110 and may detect, adjust, or align a preamble section of internal data strobe signals MDQS.

In step S233, the device controller 120 may transmit the buffer command CMD_B requesting read leveling to the data buffers 110. In step S235, the device controller 120 may perform the read leveling with the data buffers 110 and may detect, adjust, or align sync or delay between internal data signals MDQ and internal data strobe signals MDQS.

In step S243, the device controller 120 may transmit the buffer command CMD_B requesting write leveling to the data buffers 110. In step S245, the device controller 120 may perform the write leveling with the data buffers 110 and may detect, adjust, or align sync or delay between internal data strobe signals MDQS and a clock CK.

In step S253, the device controller 120 may transmit the buffer command CMD_B requesting write delay training to the data buffers 110. In step S255, the device controller 120 may perform the write delay training with the data buffers 110. For example, the device controller 120 may write data with a specific pattern in the data buffers 110 and may read data written in the data buffers 110.

As described above, the device controller 120 may perform the second link training with the data buffers 110 based on the hidden sequence HS. The second link training may include at least one of the preamble training, the read leveling, the write leveling, and the write delay training between the device controller 120 and the data buffers 110. In an embodiment, at least one of the preamble training, the read leveling, the write leveling, and the write delay training between the device controller 120 and the data buffers 110 may be performed according to two or more steps including a course step and a fine step.

In steps S261 to S285, the storage device 100 may perform the first link training under control of the processor 1100.

In step S261, the processor 1100 may transmit the RAM command CMD_R requesting the read leveling to the device controller 120 through the high-speed interface 1230. In step S263, the device controller 120 may transmit the buffer command CMD_B, requesting read leveling through the high-speed interface 1230, to the data buffers 110 in response to the RAM command CMD_R. In step S265, the read leveling may be executed between the processor 1100 and the data buffers 110 through the high-speed interface 1230 under control of the processor 1100. If the read leveling is executed, sync or delay between the data signals DQ and the data strobe signals DQS which are exchanged between the processor 1100 and the data buffers 110 may be detected, adjusted, or aligned.

In step S271, the processor 1100 may transmit the RAM command CMD_R requesting the write leveling to the device controller 120 through the high-speed interface 1230. In step S273, the device controller 120 may transmit the buffer command CMD_B, requesting write leveling using the high-speed interface 1230, to the data buffers 110 in response to the RAM command CMD_R. In step S275, the write leveling using the high-speed interface 1230 may be executed between the processor 1100 and the data buffers 110 under control of the processor 1100. If the write leveling is executed, sync or delay between the data strobe signals DQS and the clock CK which are exchanged between the processor 1100 and the data buffers 110 may be detected, adjusted, or aligned.

In step S281, the processor 1100 may transmit the RAM command CMD_R requesting the write delay training to the device controller 120 through the high-speed interface 1230. In step S283, the device controller 120 may transmit the buffer command CMD_B, requesting the write delay training using the high-speed interface 1230, to the data buffers 110 in response to the RAM command CMD_R. In step S285, the write delay training using the high-speed interface 1230 may be executed between the processor 1100 and the data buffers 110 under control of the processor 1100. For example, the processor 1100 may write data with a specific pattern in the data buffers 110 as the data signals DQ and may read data written in the data buffers 110.

If the write leveling is executed, sync or delay between the data strobe signals DQS and the clock CK which are exchanged between the processor 1100 and the data buffers 110 may be detected, adjusted, or aligned.

In an embodiment, the processor 1100 may further perform the preamble training with the data buffers 110. The processor 1100 may transmit the RAM command CMD_R requesting the preamble training to the device controller 120 and may perform the preamble training with the data buffers 110.

As described above, the device controller 120 may perform the first link training with the processor 1100 under control of the processor 1100. The first link training may include at least one of the preamble training, the read leveling, the write leveling, and the write delay training between the device controller 120 or the data buffers 110 and the processor 1100. In an embodiment, at least one of the preamble training, the read leveling, the write leveling, and the write delay training between the device controller 120 or the data buffers 110 and the processor 1100 may be performed according to two or more steps including a course step and a fine step.

In an embodiment, an order of steps S211, S213, and S261 to S285 of the first link training and an order of steps S223 to S255 of the second link training may be variously modified or changed, not limited thereto. Furthermore, at least one of steps S223 to S255 of the second link training may be executed between at least two of steps S211, S213, and S261 to S285 of the first link training. Furthermore, at least one of steps S211, S213, and S261 to S285 of the first link training may be executed between at least two of steps S261 to S285 of the second link training. An order of steps S211 to S285 may be variously modified or changed.

As described with reference to FIGS. 4 and 5, the storage device 100 may perform the first link training with the processor 1100 based on the training sequence of the first operating mode. Accordingly, the storage device 100 may support the first operating mode, that is, the link training defined by the RDIMM specification and may be recognized as the first operating mode, for example, the RDIMM. Furthermore, the storage device 100 may perform the second link training between the device controller 120 and the data buffers 110 based on the hidden sequence HS, and thus the storage device 100 may have reliability according to the second link training and the flexibility of supporting the first operating mode.

Figure 6:
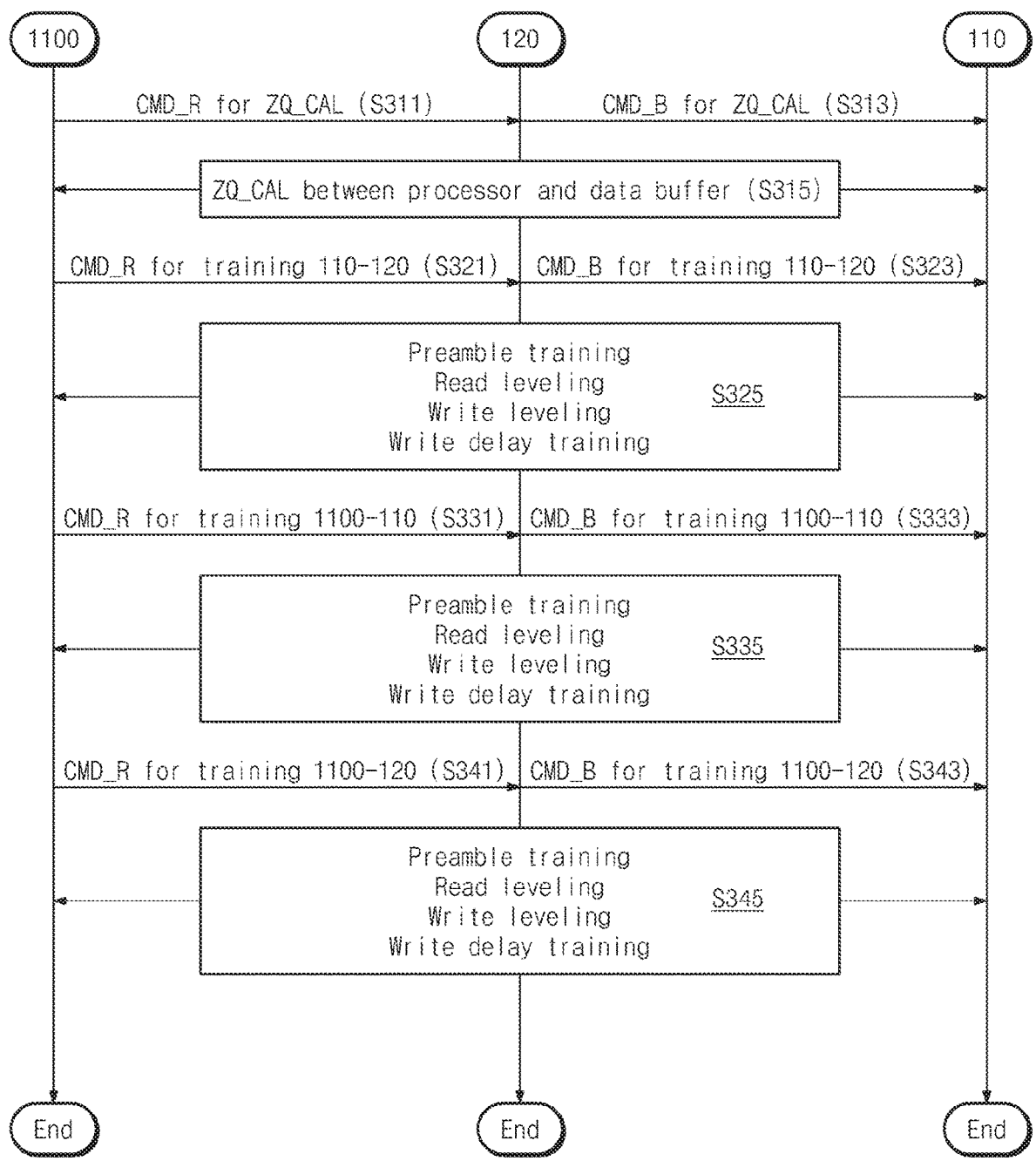
FIG. 6 is a flow chart schematically illustrating a link training performed according to a training sequence of a second operating mode.

FIG. 6 is a flow chart schematically illustrating a link training performed according to a training sequence of a second operating mode. Referring to FIGS. 1, 2, and 6, the storage device 100 may perform the link training under control of the processor 1100.

In step S311, the processor 1100 may transmit the RAM command CMD_R for requesting execution of ZQ-calibration ZQ_CAL, to the device controller 120. In step S313, the device controller 120 may transmit the buffer command CMD_B, requesting execution of the ZQ-calibration ZQ_CAL, to the data buffers 110 through the high-speed interface 1230. In step S315, the ZQ-calibration ZQ_CAL using the high-speed interface 1230 may be executed between the processor 1100 and the data buffers 110 under control of the processor 1100.

In step S321, the processor 1100 may transmit the RAM command CMD_R requesting training between the data buffers 110 and the device controller 120, to the device controller 120. In step S323, the device controller 120 may transmit the buffer command CMD_B requesting training between the data buffers 110 and the device controller 120, to the data buffers 110. In step S325, a link training between the data buffers 110 and the device controller 120 may be performed under control of the processor 1100. For example, a preamble training, a read leveling, a write leveling, and a write delay training may be executed between the data buffers 110 and the device controller 120 under control of the processor 1100. The processor 1100 may perform steps S321 to 325 with respect to each of the preamble training, the read leveling the write leveling and the write delay training.

In steps S321 to S325, sync or delay between the clock CK, supplied to the device controller 120, and the internal data signals MDQ and internal data strobe signals MDQS exchanged between the data buffers 110 and the device controller 120 may be detected, adjusted, or aligned.

In step S331, the processor 1100 may transmit the RAM command CMD_R requesting training between the processor 1100 and the data buffers 110, to the device controller 120. In step S333, the device controller 120 may transmit the buffer command CMB_B requesting training between the processor 1100 and the data buffers 110, to the data buffers 110. In step S335, a link training between the processor 1100 and the data buffers 110 may be performed under control of the processor 1100. For example, the preamble training, the read leveling, the write leveling, and the write delay training may be executed between the processor 1100 and the data buffers 110 under control of the processor 1100. The processor 1100 may perform steps S331 to 335 with respect to each of the preamble training, the read leveling the write leveling and the write delay training.

In steps S331 to S335, sync or delay between the clock CK, supplied to the device controller 120, and the data signals DQ and data strobe signals DQS exchanged between the data buffers 110 and the processor 1100 may be detected, adjusted, or aligned.

In step S341, the processor 1100 may transmit the RAM command CMD_R requesting training between the processor 1100 and the device controller 120, to the device controller 120. In step S343, the device controller 120 may transmit the buffer command CMD_B requesting training between the processor 1100 and the device controller 120, to the data buffers 110. In step S345, a link training between the processor 1100 and the device controller 120 may be performed under control of the processor 1100. For example, the preamble training, the read leveling, the write leveling, and the write delay training may be executed between the processor 1100 and the device controller 120 under control of the processor 1100. The processor 1100 may perform steps S341 to 345 with respect to each of the preamble training, the read leveling the write leveling and the write delay training.

In steps S341 to S345, sync or delay between the clock CK, supplied to the device controller 120, and the data signals DQ and data strobe signals DQS exchanged between the data buffers 110 and the processor 1100 may be detected, adjusted, or aligned.

Figure 7:
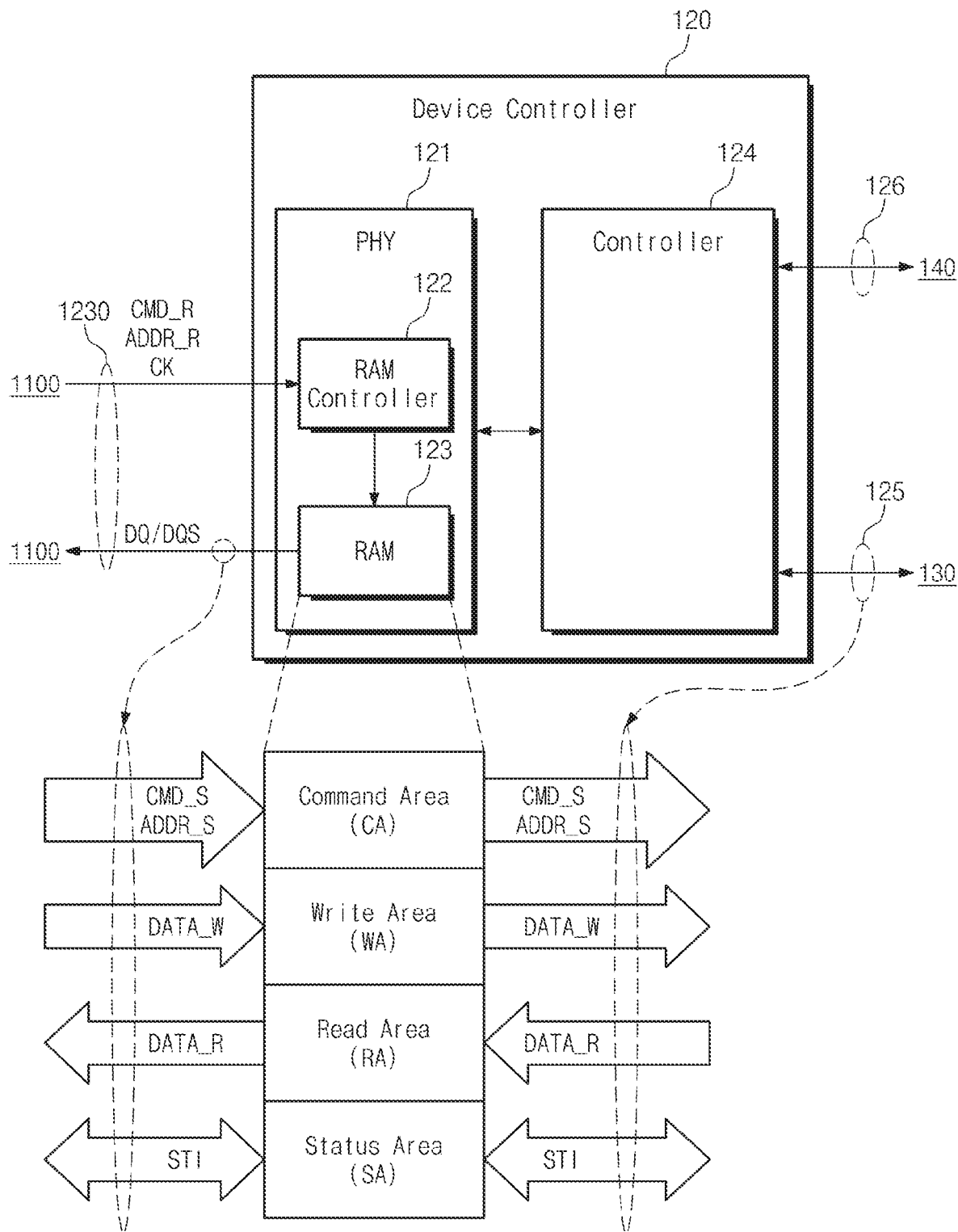
FIG. 7 is a block diagram illustrating a device controller according to an embodiment of the disclosure.

FIG. 7 is a block diagram illustrating a device controller 120 according to an embodiment of the disclosure. Referring to FIGS. 1, 2, and 7, the device controller 120 may include a physical layer circuit (PHY) 121 and a controller 124.

The physical layer circuit 121 may be configured to support a communication method defined by the specification of the high-speed interface 1230. For example, the physical layer circuit 121 may be configured to support a communication method defined by the specification of the DIMM, in more detail, the RDIMM or LRDIMM. The physical layer circuit 121 may include a RAM controller 122 and a RAM 123.

The RAM controller 122 may be configured to receive a RAM command CMD_R, a RAM address ADDR_R, and a clock CK through the high-speed interface 1230. The RAM controller 122 may control the RAM 123 based on the RAM command CMD_R, the RAM address ADDR_R, and the clock CK. For example, the RAM controller 122 may parse a request of the processor 1100, based on the RAM command CMD_R and the RAM address ADDR_R. Based on the parsing result, the RAM controller 122 may perform control such that the RAM 123 transacts data signals DQ and data strobe signals DQS to the processor 1100.

The RAM 123 may transact the data signals DQ and the data strobe signals DQS with the processor 1100 through the high-speed interface 1230 under control of the RAM controller 122. In an embodiment, the high-speed interface 1230 may have a signal system which is based on a first-type memory, for example, SDRAM. The RAM 123 may have a signal system which is based on a second-type memory, for example, SRAM. Accordingly, the RAM 123 may not directly receive the RAM command CMD_R, the RAM address ADDR_R, and the clock CK from the processor 1100 through the high-speed interface 1230, but the RAM 123 may transact the data signals DQ and the data strobe signals DQS with the processor 1100.

In an embodiment, a storage space of the RAM 123 may be divided into a command area CA, a write area WA, a read area RA, and a status area SA.

A storage command CMD_S and a storage address ADDR_S which are stored in the RAM 123 using the data signals DQ from the processor 1100 may be written in the command area CA. Write data DATA_W which is stored in the RAM 123 using the data signals DQ from the processor 1100 may be written in the write area WA. Read data DATA_R which is read from the RAM 123 as the data signals DQ by the processor 1100 may be read from the read area RA. Status information STI which is transacted with the RAM 123 as the data signals DQ by the processor 1100 may be conveyed from the status area SA. The status information STI may indicate information about an operating state of the processor 1100 or the storage device 100.

A controller 124 may communicate with the nonvolatile memories 130 through a first interface 125 and may communicate with the buffer memory 140 through a second interface 126. For example, the first interface 125 may include a communication interface of NAND flash memory, PRAM, MRAM, RRAM, or FeRAM. The second interface 126 may include a communication interface of SDRAM.

The controller 124 may transmit a storage command CMD_S and a storage address ADDR_S, which are stored in a command area CA of the RAM 123, to the nonvolatile memories 130 through the first interface 125. The controller 124 may transmit write data DATA_W, which is stored in a write area WA of the RAM 123, to the nonvolatile memories 130 through the first interface 125. The controller 124 may write data DATA_R read from the nonvolatile memories 130 in a read area RA of the RAM 123. The controller 124 may write various information such as processing information of a write or read operation about the nonvolatile memories 130 and information about an operating state of the storage device 100, in the status area SA of the RAM 123 as status information STI. Furthermore, the controller 124 may read various status information STI written in the status area SA through the high-speed interface 1230 and may operate based on the status information STI.

The physical layer circuit 121 may be configured to output a buffer command CMD_B to the data buffers 110. For example, the physical layer circuit 121 may be configured to output the buffer command CMD_B based on the RAM command CMD_R or the RAM address ADDR_R.

In an embodiment, the controller 124 may transact the storage command CMD_S, the storage address ADDR_S, the write data DATA_W, the read data DATA_R with the nonvolatile memories 1230 as input/output signals of the first interface 125. The storage command CMD_S, the storage address ADDR_S, the write data DATA_W, and the read data DATA_R may be conveyed through common input/output lines. The controller 124 may further exchange control signals, which are used to control the nonvolatile memories 130, with the nonvolatile memories 130 through the first interface 125. The control signals may be conveyed through control lines separated from input/output lines.

For example, the controller 124 may transmit, to the nonvolatile memories 130, at least one of a chip enable signal /CE for selecting at least one nonvolatile memory chip of the nonvolatile memories 130, a command latch enable signal CLE indicating that a signal transmitted through input/output signals is the storage command CMD_S, an address latch enable signal ALE indicating that a signal transmitted through input/output signals is the storage address ADDR_S, a read enable signal /RE periodically toggled at reading and used to tune timing, a write enable signal /WE activated when a command or an address is transmitted, a write protection signal /WP activated to prevent unintended writing or erasing when a power changes, and a data strobe signal DQS used to adjust synchronization about write data DATA_W and periodically toggled at writing. Furthermore, the controller 124 may receive, from the nonvolatile memories 130, a ready/busy signal R/nB indicating whether the nonvolatile memories 130 are performing a program, erase or read operation and a data strobe signal DQS used to adjust synchronization about read data DATA_R and generated from the read enable signal /RE by the nonvolatile memories 130 so as to be periodically toggled.

Figure 8:
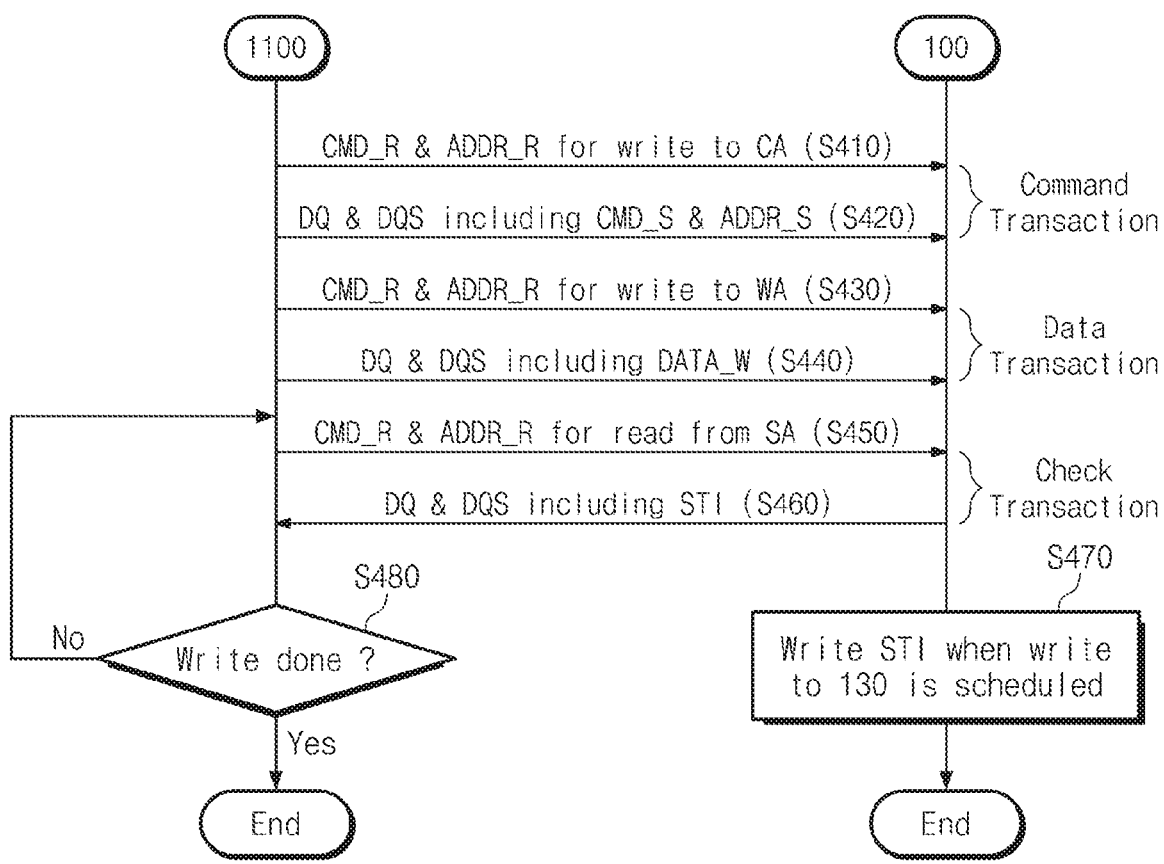
FIG. 8 is a flow chart illustrating a method in which a processor writes data in a storage device, according to an embodiment of the disclosure.

FIG. 8 is a flow chart illustrating a method in which a processor 1100 writes data in a storage device 100, according to an embodiment of the disclosure. In an embodiment, a method in which the processor 1100 writes data in the nonvolatile memories 130 is illustrated in FIG. 8.

Referring to FIGS. 1, 2, 7, and 8, in step S410, the processor 1100 may transmit the RAM command CMD_R requesting a write operation and the RAM address ADDR_R selecting a command area CA of the RAM 123, to the storage device 100. In step S420, the processor 1100 may transmit the storage command CMD_S requesting a write operation and the storage address ADDR_S selecting a write target of a storage space of the nonvolatile memories 130, to the storage device 100 through the data signals DQ and the data strobe signals DQS.

Steps S410 and S420 may form a command transaction conveying a write command about the nonvolatile memories 130 to the storage device 100. If steps S410 and S420 are performed, the storage command CMD_S and the storage address ADDR_S may be written in the command area CA of the RAM 123.

In step S430, the processor 1100 may transmit the RAM command CMD_R requesting a write operation and the RAM address ADDR_R selecting a write area WA of the RAM 123, to the storage device 100. In step S440, the processor 1100 may transmit the write data DATA_W to the storage device 100 through the data strobe signals DQS.

Steps S430 and S440 may form a data transaction conveying the write data DATA_W about the nonvolatile memories 130 to the storage device 100. If steps S430 and S440 are performed, the write data DATA_W may be written in the write area WA of the RAM 123.

As the storage command CMD_S, the storage address ADDR_S, and the write data DATA_W are stored in the RAM 123, the controller 124 may start writing the write data DATA_W in the nonvolatile memories 130 in response to the storage command CMD_S and the storage address ADDR_S.

In step S450, the processor 1100 may transmit the RAM command CMD_R requesting a read operation and the RAM address ADDR_R selecting a status area SA, to the storage device 100. In step S460, the processor 1100 may read the status information from the storage device 100 as the data signals DQ and the data strobe signals DQS. Steps S450 and S460 may form a check transaction checking whether writing is processed.

If writing about the nonvolatile memories 130 is completed in the storage device 100 or if writing is scheduled (or enqueued), the storage device 100 may write the status information STI informing that writing is processed, in the status area SA (S470). The processor 1100 may repeat steps S450 and S460 periodically until the status information STI informing that writing is processed is read from the status area SA. If the status information STI is read from the storage device 100 (S480), the processor 1100 may recognize the write operation of the storage device 100 as being processed and may perform a next access of the storage device 100.

Figure 9:
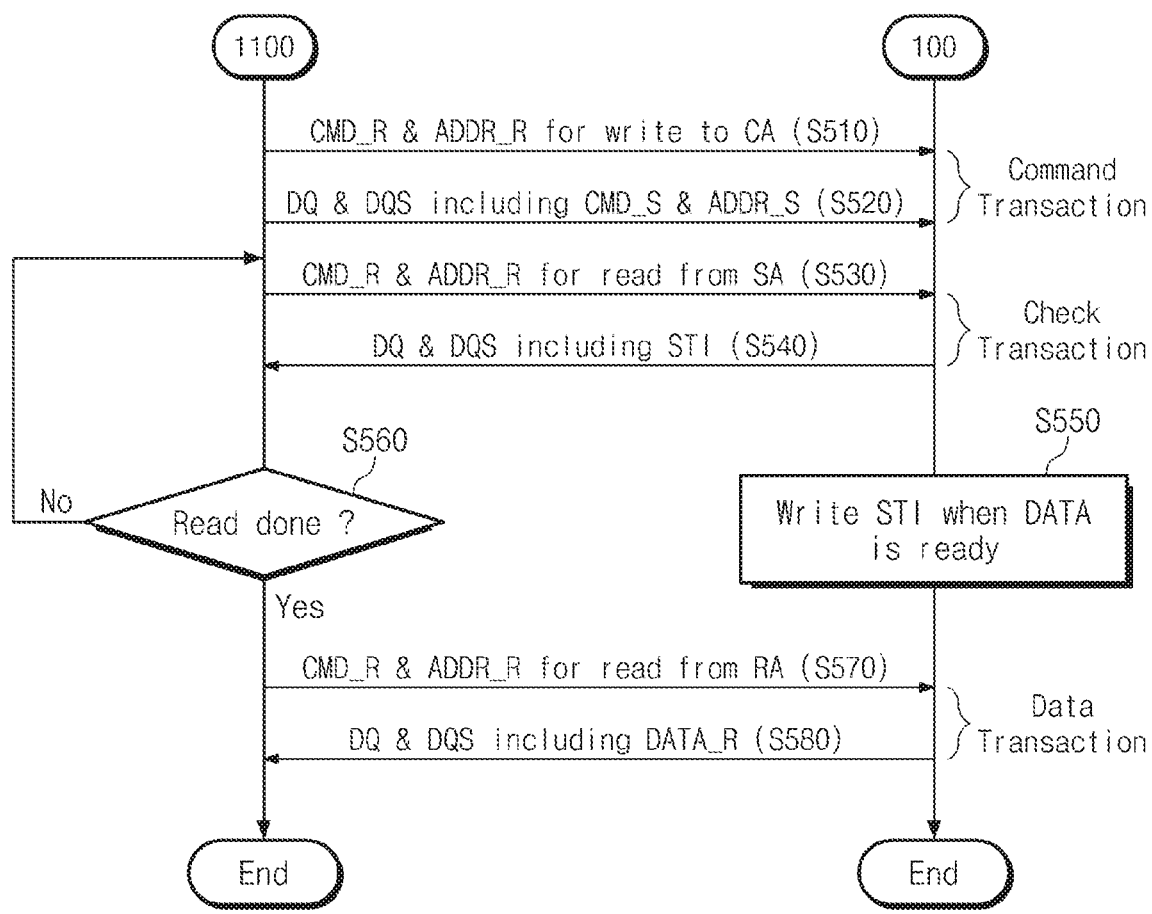
FIG. 9 is a flow chart illustrating a method in which a processor reads data from a storage device, according to an embodiment of the disclosure.

FIG. 9 is a flow chart illustrating a method in which a processor 1100 reads data from a storage device 100, according to an embodiment of the disclosure. In an embodiment, a method in which the processor 1100 reads data from the nonvolatile memories 130 is illustrated in FIG. 9.

Referring to FIGS. 1, 2, 7, and 9, in step S510, the processor 1100 may transmit the RAM command CMD_R requesting a write operation and the RAM address ADDR_R selecting a command area CA of the RAM 123, to the storage device 100. In step S520, the processor 1100 may transmit the storage command CMD_S requesting a read operation and the storage address ADDR_S selecting a read target of a storage space of the nonvolatile memories 130, to the storage device 100 through the data signals DQ and the data strobe signals DQS.

Steps S510 and S520 may form a command transaction transmitting a read command about the nonvolatile memories 130 to the storage device 100. If steps S510 and S520 are performed, the storage command CMD_S and the storage address ADDR_S may be written in the command area CA of the RAM 123.

As the storage command CMD_S and the storage address ADDR_S are stored in the RAM 123, the controller 124 may start reading the read data DATA_R from the nonvolatile memories 130 in response to the storage command CMD_S and the storage address ADDR_S. For example, the controller 124 may store the read data DATA_R in a read area RA of the RAM 123.

In step S530, the processor 1100 may transmit the RAM command CMD_R requesting a read operation and the RAM address ADDR_R selecting a status area SA, to the storage device 100. In step S540, the processor 1100 may read the status information STI from the storage device 100 as the data signals DQ and the data strobe signals DQS. Steps S530 and S540 may form a check transaction checking whether reading is processed.

If reading about the nonvolatile memories 130 is completed in the storage device 100, the storage device 100 may write the status information STI informing that reading is completed, in the status area SA (S550). The processor 1100 may repeat steps S530 and S540 periodically until the status information STI informing that reading is completed is read from the status area SA.

If the status information STI is read from the storage device 100, the processor 1100 may recognize a read operation of the storage device 100 as being completed (S560). In step S570, the processor 1100 may transmit the RAM command CMD_R requesting a read operation and the RAM address ADDR_R selecting a read area RA of the RAM 123, to the storage device 100. In step S580, the processor 1100 may receive the read data DATA_R from the storage device 100 as the data signals DQ and the data strobe signals DQS.

Steps S570 and S580 may form a data transaction transmitting the data DATA_R read from the nonvolatile memories 130.

As described above, the processor 1100 may recognize the RAM 123 as a memory connected to the high-speed interface 1230 and may perform read and write operations of the RAM 123 based on the specification of the high-speed interface 1230. Data written in or read from the RAM 123 may include the storage command CMD_S requesting an access to the nonvolatile memories 130, the storage address ADDR_S, and the write data DATA_W and the read data DATA_R transacted with the nonvolatile memories 130.

The storage device 100 may support a transaction between the RAM 123 and the processor 1100 based on the specification of the high-speed interface 1230. The device controller 100 may extract the storage command CMD_S and the storage address ADDR_S from data stored in the RAM 123. Furthermore, the storage device 100 may write the write data DATA_W stored in the RAM 123 in the nonvolatile memories 130 and may store data DATA_R read from the nonvolatile memories 130 in the RAM 123.

A transaction between the processor 1100 and the storage device 100 may be performed according to the specification of the high-speed interface 1230, and data transacted according to the specification of the high-speed interface 1230 may be organized according to a protocol for accessing the nonvolatile memories 130.

Figure 10:
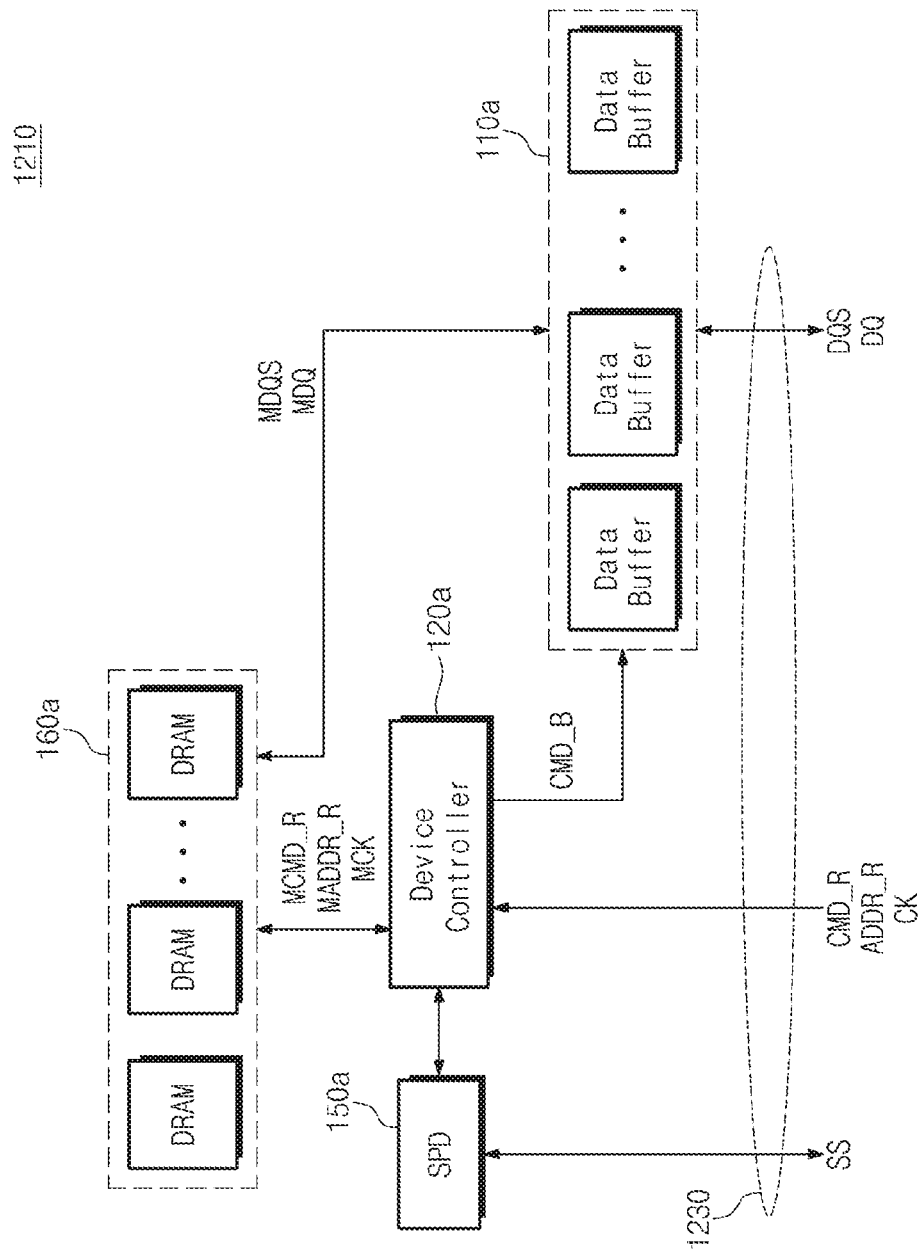
FIG. 10 is a block diagram schematically illustrating a main memory device according to an embodiment of the disclosure.

FIG. 10 is a block diagram schematically illustrating a main memory device 1210 according to an embodiment of the disclosure. Referring to FIGS. 1 and 10, the main memory device 1210 may include data buffers 110a, a device controller 120a, an SPD 150a, and random access memories (or DRAM) 160a.

The data buffers 110a may transact a data signal DQ and a data strobe signal DQS, transacted with the processor 1100, with the random access memories 160a as an internal data signal MDQ and an internal data strobe signal MDQS.

The data buffers 110a may correspond to the data buffers 110 described with reference to FIG. 2.

The device controller 120a may receive a RAM command CMD_R, a RAM address ADDR_R, and a clock CK from the processor 1100. The device controller 120a may transmit the received RAM command CMD_R, RAM address ADDR_R, and clock CK to the random access memories 160a as an internal RAM command MCMD_R, an internal RAM address MADDR_R, and an internal clock MCK.

The SPD 150a may correspond to the SPD 150 described with reference to FIG. 2.

As described with reference to FIGS. 3 to 6, the main memory device 1210 according to an embodiment of the disclosure may support a link training according to the first operating mode (e.g., RDIMM) and a link training according to the second operating mode (e.g., LRDIMM).

In an embodiment, in the first operating mode, the main memory device 1210 may perform the first link training in response to a request of the processor 1100. For example, at the first link training, sync or delay between the data buffers 110a and the processor 1100, between the device controller 120a and the processor 1100, or between the device controller 120a and the random access memories 160a may be detected, adjusted, or aligned. Furthermore, the main memory device 1210 may internally perform the second link training without a request of the processor 1100. For example, at the second link training, sync or delay between the data buffers 110a and the random access memories 160a or between the device controller 120a and the random access memories 160a may be detected, adjusted, or aligned.

In the second operating mode, the main memory device 1210 may perform a link training in response to a request of the processor 1100.

As described above, the main memory device 1210 may support the first operating mode (e.g., RDIMM) and the second operating mode (e.g., LRDIMM). Accordingly, the flexibility of the main memory device 1210 may be improved.

Figure 11:
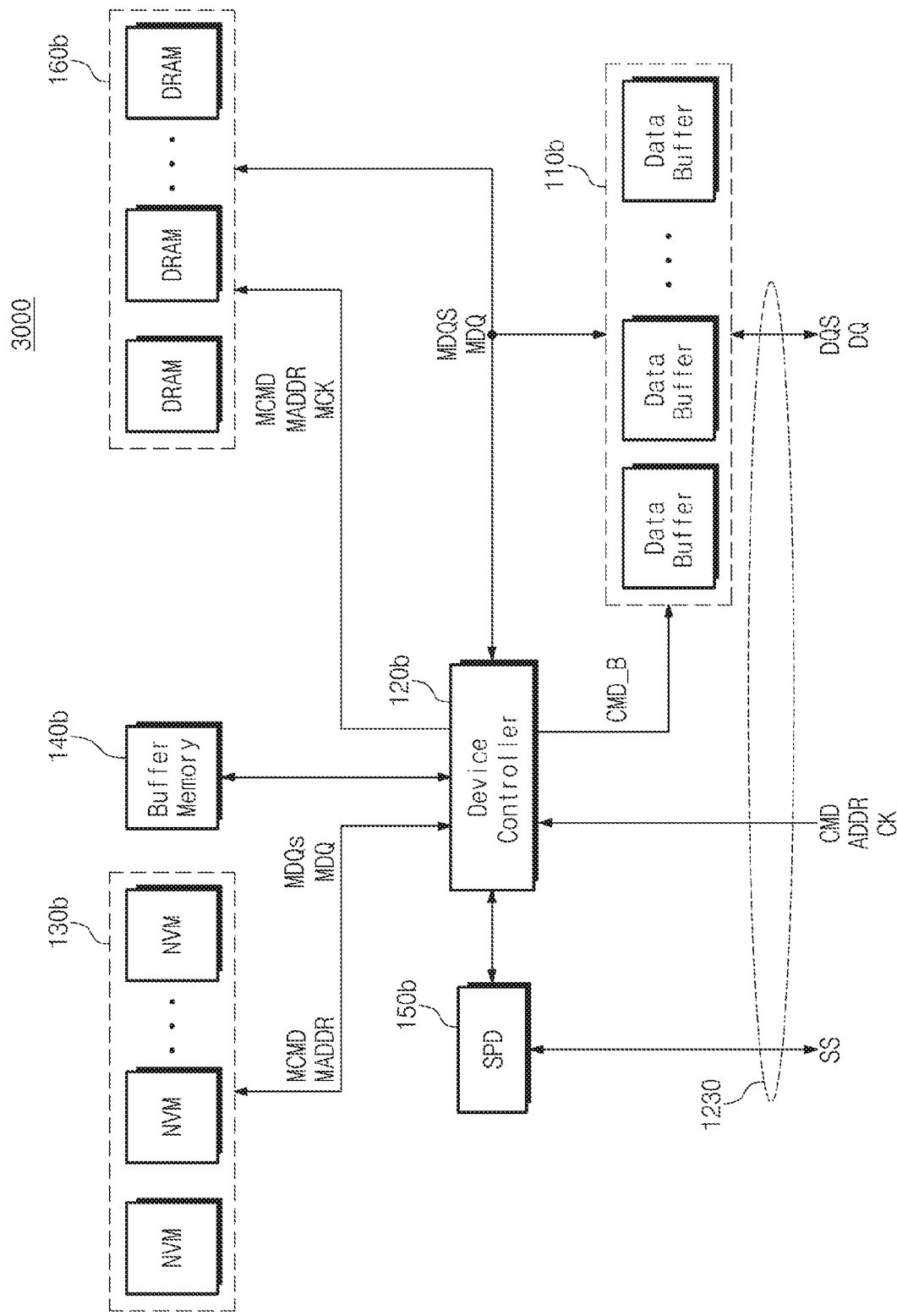
FIG. 11 is a block diagram schematically illustrating a hybrid device according to an embodiment of the disclosure.

FIG. 11 is a block diagram schematically illustrating a hybrid device 3000 according to an embodiment of the disclosure. Referring to FIGS. 1 and 11, a hybrid device 3000 may include data buffers 110b, a device controller 120b, nonvolatile memories 130b, a buffer memory 140b, an SPD 150b, and random access memories 160b. The hybrid device 3000 may be connected with the processor 1100 through the high-speed interface 1230, for example, a DIMM, an RDIMM or an LRDIMM interface.

The nonvolatile memories 130b and the random access memories 160b of the hybrid device 3000 may be identified on a physical layer of the processor 1100. In the case where the processor 1100 accesses the nonvolatile memories 130b, the processor 1100 may directly transmit a command CMD of the nonvolatile memories 130b and an address ADDR, indicating a storage space of the nonvolatile memories 130b, to the device controller 120b through the high-speed interface 1230. The processor 1100 may transact data to be written in the nonvolatile memories 130b or data read from the nonvolatile memories 130b with the data buffers 110b as a data signal DQ.

In the case where the processor 1100 accesses the random access memories 160b, the processor 1100 may directly transmit a command CMD of the random access memories 160b and an address ADDR, indicating a storage space of the random access memories 160b, to the device controller 120b through the high-speed interface 1230. The processor 1100 may transact data to be written in the random access memories 160b or data read from the random access memories 160b with the data buffers 110b as a data signal DQ.

The data buffers 110b may operate in response to a buffer command CMD_B. The data buffers 110b may transact the data signal DQ and the data strobe signal DQS with the processor 1100 through the high-speed interface 1230. The data buffers 110a may output the data signal DQ and the data strobe signal DQS received from the processor 1100, as the internal data signal MDQ or the internal data strobe signal MDQS. The data buffers 110b may transmit the received internal data signal MDQ and internal data strobe signal MDQS to the processor 1100 through the high-speed interface 1230 as the data signal DQ and the data strobe signal DQS.

The data buffers 110b may select a target for transaction of the internal data signal MDQ and the internal data strobe signal MDQS in response to control of the device controller 120b. For example, the data buffers 110b may transact the internal data signal MDQ and the internal data strobe signal MDQS with the device controller 120b in response to control of the device controller 120b. Alternatively, the data buffers 110b may transact the internal data signal MDQ and the internal data strobe signal MDQS with the random access memories 160b in response to control of the device controller 120b.

The device controller 120b may receive a command CMD, an address ADDR, and a clock CK from the processor 1100 through the high-speed interface 1230. The device controller 120b may be configured to control the data buffers 110b through the buffer command CMD_B.

In response to the command CMD, the address ADDR, or a control signal received through the high-speed interface 1230, the device controller 120b may determine whether a target that the processor 1100 accesses is the nonvolatile memories 130b or the random access memories 160b.

In the case where a target that the processor 1100 accesses is the nonvolatile memories 130b, the device controller 120b may control the data buffers 110b so as to transact the internal data signal MDQ and the internal data strobe signal MDQS with the device controller 120b. The device controller 120b may output the command CMD and the address ADDR received through the high-speed interface 1230 to the nonvolatile memories 130b as the internal data signal MDQ and the internal data strobe signal MDQS. The device controller 120b may transmit the internal data strobe signal MDQS received from the data buffers 110b to the nonvolatile memories 130b. In an embodiment, the device controller 120b may include an internal buffer which buffers data of the internal data signals MDQ to be transmitted to the nonvolatile memories 130b or data of the internal data signals MDQ read from the nonvolatile memories 130b. In other embodiments, the device controller 120b may buffer data of the internal data signals MDQ to be transmitted to the nonvolatile memories 130b or data of the internal data signals MDQ read from the nonvolatile memories 130b, in the buffer memory 140b.

In the case where a target that the processor 1100 accesses is the random access memories 160b, the device controller 120b may control the data buffers 110b so as to transact the internal data signal MDQ and the internal data strobe signal MDQS with the random access memories 160b. The device controller 120b may output the command CMD, the address ADDR, and the clock CK received through the high-speed interface 1230 to the random access memories 160b as the internal command MCMD, the internal address MADDR, and the internal clock MCK.

The nonvolatile memories 130b may write data transmitted as the internal data signal MDQ in response to the internal command MCMD and the internal address MADDR. The nonvolatile memories 130b may read data in response to the internal command MCMD and the internal address MADDR and may output the read data as the internal data signal MDQ.

The buffer memory 140b may correspond to the buffer memory 140 of FIG. 2. The buffer memory 140b may load metadata for managing the nonvolatile memories 130b.

The SPD 150b may correspond to the SPD 150 of FIG. 2. The SPD 150b may transact a supplementary signal SS through the high-speed interface 1230.

The random access memories 160b may write data transmitted as the internal data signal MDQ in response to the internal command MCMD, the internal address MADDR, and the internal clock MCK. The random access memories 160b may read data in response to the internal command MCMD, the internal address MADDR, and the internal clock MCK and may output the read data as the internal data signal MDQ.

In an embodiment, the device controller 120b may transact the internal command MCMD, the internal address MADDR, and the internal data signal MDQ with the nonvolatile memories 130b as input/output signals. For example, the internal command MCMD, the internal address MADDR, and the internal data signal MDQ may be transacted through common input/output lines. The device controller 120b may further transact control signals, which are used to control the nonvolatile memories 130b, with the nonvolatile memories 130b. The control signals may be conveyed through control lines separated from input/output lines.

For example, the device controller 120b may transmit, to the nonvolatile memories 130b, at least one of a chip enable signal /CE for selecting at least one of at least one nonvolatile memory chip of the nonvolatile memories 130b, a command latch enable signal CLE indicating that a signal transmitted with input/output signals is the storage command CMD_S, an address latch enable signal ALE indicating that a signal transmitted with input/output signals is the storage address ADDR_S, a read enable signal /RE periodically toggled at reading and used to tune timing, a write enable signal /WE activated when a command or an address is transmitted, a write protection signal /WP activated to prevent unintended writing or erasing when power changes, and a data strobe signal DQS used to adjust synchronization of write data DATA_W and periodically toggled at writing. Furthermore, the device controller 120b may receive, from the nonvolatile memories 130b, a ready/busy signal R/nB indicating that the nonvolatile memories 130b are performing a program, erase, or read operation and a data strobe signal DQS used to adjust data synchronization and generated from the read enable signal /RE so as to be periodically toggled.

As described with reference to FIGS. 3 to 6, the hybrid device 3000 according to an embodiment of the disclosure may support a link training according to the first operating mode (e.g., RDIMM) and a link training according to the second link training (e.g., LRDIMM).

In an embodiment, in the first operating mode, the hybrid device 3000 may perform the first link training in response to a request of the processor 1100. For example, at the first link training, sync or delay between the data buffers 110b and the processor 1100, between the device controller 120b and the processor 1100, or between the device controller 120b and the random access memories 160b may be detected, adjusted, or aligned. Furthermore, the hybrid device 3000 may perform the second link training internally without a request of the processor 1100. For example, at the second link training, sync or delay between the data buffers 110b and the random access memories 160b or between the device controller 120b and the random access memories 160b may be detected, adjusted, or aligned.

In the second link training, the hybrid device 3000 may perform the link training in response to a request of the processor 1100.

As described above, the hybrid device 3000 may support the first operating mode (e.g., RDIMM) and the second operating mode (e.g., LRDIMM). Accordingly, the flexibility of the hybrid device 3000 may be improved.

Figure 12:
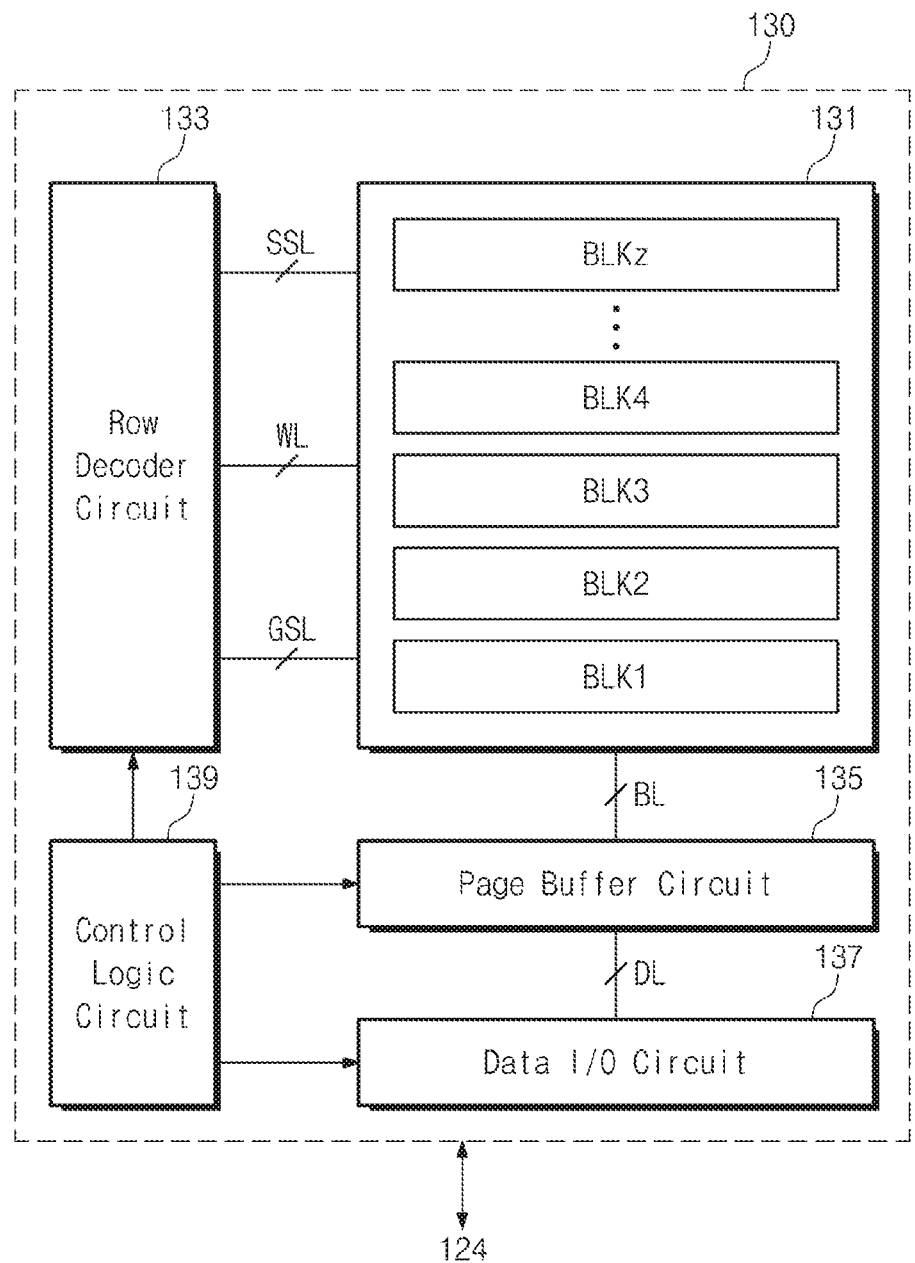
FIG. 12 is a block diagram schematically illustrating one of nonvolatile memories according to an embodiment of the disclosure.

FIG. 12 is a block diagram schematically illustrating one of nonvolatile memories 130 according to an embodiment of the disclosure. Referring to FIGS. 2 and 12, a nonvolatile memory 130 may include a memory cell array 131, a row decoder circuit 133, a page buffer circuit 135, a data input/output circuit 137, and a control logic circuit 139.

The memory cell array 131 may include a plurality of memory blocks BLK1 through BLKz, each of which has a plurality of memory cells. Each memory block may be connected to the row decoder circuit 133 through at least one string selection line SSL, a plurality of word lines WL, and at least one ground selection line GSL. Each memory block may be connected to the page buffer circuit 135 through a plurality of bit lines BL. The memory blocks BLK1 through BLKz may be connected in common to the plurality of bit lines BL. Memory cells in the memory blocks BLK1 through BLKz may have the same structure. In an embodiment, each of the memory blocks BLK1 through BLKz may be a unit of an erase operation. An erase operation may be carried out by the memory block. Memory cells in a memory block may be erased at the same time. In other embodiments, each memory block may be divided into a plurality of sub-blocks. Erasing may be made by the sub-block.

The row decoder circuit 133 may be connected to the memory cell array 131 through a plurality of ground selection lines GSL, the plurality of word lines WL, and a plurality of string selection lines SSL. The row decoder circuit 133 may operate in response to control of the control logic circuit 139. The row decoder circuit 133 may decode an address received from the controller 120 through an input/output channel and may control voltages to be applied to the string selection lines SSL, the word lines WL, and the ground selection lines GSL based on the decoded address.

For example, at programming, the row decoder circuit 133 may apply a program voltage to a selected word line in a memory block selected by an address. The row decoder circuit 133 may also apply a pass voltage to unselected word lines in the selected memory block. At reading, the row decoder circuit 133 may apply a selection read voltage to the selected word line in the selected memory block. The row decoder circuit 133 may also apply a non-selection read voltage to unselected word lines in the selected memory block. At erasing, the row decoder circuit 133 may apply an erase voltage (e.g., a ground voltage or a low voltage of which the level is similar to that of the ground voltage) to word lines in the selected memory block.

The page buffer circuit 135 may be connected to the memory cell array 131 through the bit lines BL. The page buffer circuit 135 may be connected to the data input/output circuit 137 through a plurality of data lines DL. The page buffer circuit 135 may operate in response to control of the control logic circuit 139.

During programming, the page buffer circuit 135 may store data to be programmed in memory cells. The page buffer circuit 135 may apply voltages to the bit lines BL based on the stored data. For example, the page buffer circuit 135 may function as a write driver. During reading, the page buffer circuit 135 may sense voltages on the bit lines BL and may store the sensed results. For example, the page buffer circuit 135 may function as a sense amplifier.

The data input/output circuit 137 may be connected to the page buffer circuit 135 through the data lines DL. The data input/output circuit 137 may output data, which is read by the page buffer circuit 135, to the controller 124 through the input/output channel and may transfer data, which is received from the controller 124 through the input/output channel, to the page buffer circuit 135.

The control logic circuit 139 may receive a command from the controller 124 through the input/output channel and may receive a control signal therefrom through a control channel. The control logic circuit 139 may receive a command, which is received through the input/output channel, in response to the control signal, may route an address, which is received through the input/output channel, to the row decoder circuit 133, and may route data, which is received through the input/output channel, to the data input/output circuit 137. The control logic circuit 139 may decode the received command and may control the nonvolatile memory device 130 based on the decoded command.

In an embodiment, the control logic circuit 139 may generate a data strobe signal DQS based on a read enable signal /RE received from the controller 124 through the input/output channel. The data strobe signal DQS thus generated may be outputted to the controller 124 through the control channel. At writing, the control logic circuit 139 may receive the data strobe signal DQS from the controller 124 through the control channel.

Figure 13:
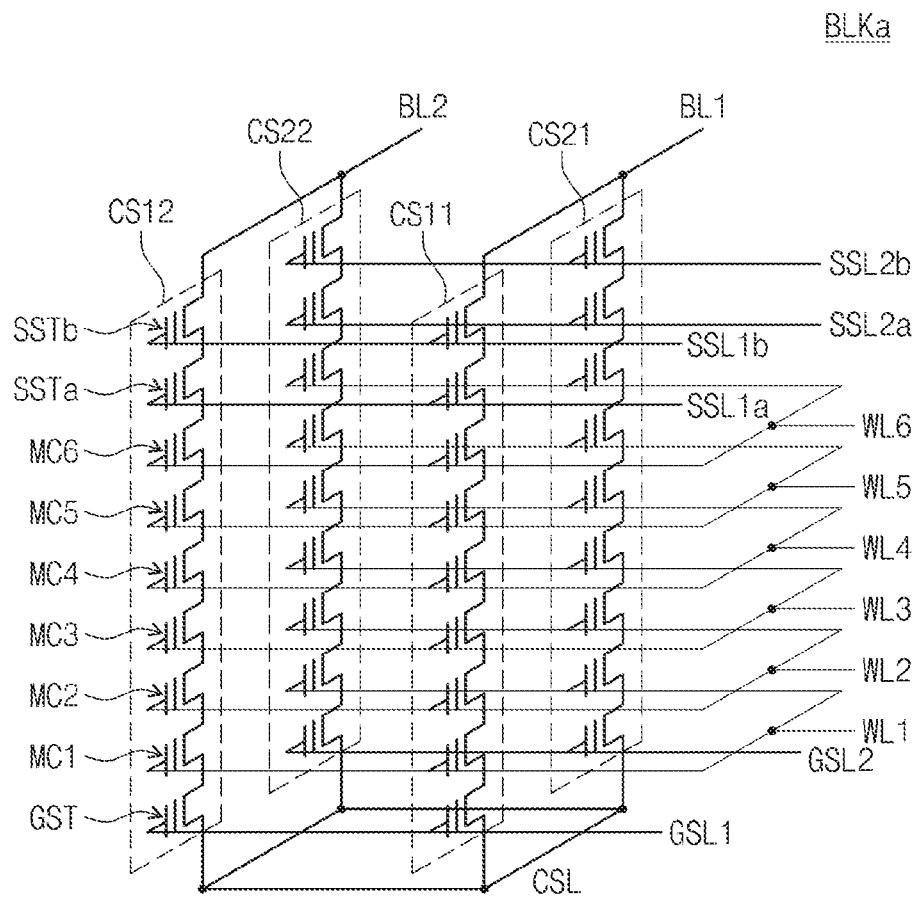
FIG. 13 is a circuit diagram schematically illustrating a memory block according to an exemplary embodiment of the disclosure.
Figure 13:
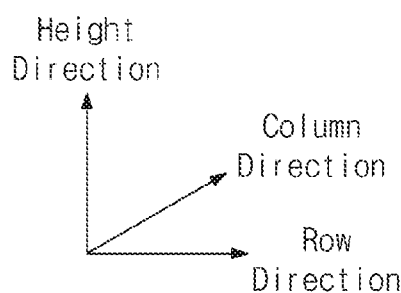

FIG. 13 is a circuit diagram schematically illustrating a memory block BLKa according to an exemplary embodiment of the disclosure. Referring to FIG. 13, a memory block BLKa may include a plurality of cell strings CS11 to CS21 and CS12 to CS22. The plurality of cell strings CS11 to CS21 and CS12 to CS22 may be arranged in a matrix of rows and columns.

For example, the cell strings CS11 and CS12 arranged along a row direction may constitute a first row, and the cell strings CS21 and CS22 arranged along the row direction may constitute a second row. The cell strings CS11 and CS21 arranged along a column direction may constitute a first column, and the cell strings CS12 and CS22 arranged along the column direction may constitute a second column.

Each cell string may contain a plurality of cell transistors. The cell transistors may include ground selection transistors GST, memory cells MC1 through MC6, and string selection transistors SSTa and SSTb. The ground selection transistors GST, memory cells MC1 through MC6, and string selection transistors SSTa and SSTb in each cell string may be stacked in a height direction perpendicular to a plane (e.g., a plane on a substrate of the memory block BLKa) on which the cell strings CS11 to CS21 and CS12 to CS22 are arranged along the rows and the columns.

Each cell transistor may be a charge trap type cell transistor of which the threshold voltage changes according to the amount of charges trapped in an insulating layer thereof.

Lowermost ground selection transistors GST may be connected in common to a common source line CSL.

Control gates of ground selection transistors GST of the cell strings CS11 to CS21 and CS12 to CS22 may be connected to ground selection lines GSL1 and GSL2, respectively. In an embodiment, ground selection transistors in the same row may be connected to the same ground selection line, and ground selection transistors of different rows may be connected to different ground selection lines. For example, the ground selection transistors GST in the first row may be connected to the first ground selection line GSL1, and the ground selection transistors GST of the cell strings CS21 and CS22 in the second row may be connected to the second ground selection line GSL2.

Connected in common to a word line are control gates of memory cells that are placed at the same height (or, order) from the substrate (or, the ground selection transistors GST). Connected to different word lines WL1 to WL6 are control gates of memory cells that are placed at different heights (or, orders). For example, the memory cells MC1 may be connected in common to the word line WL1, the memory cells MC2 may be connected in common to the word line WL2, and the memory cells MC3 may be connected in common to the word line WL3. The memory cells MC4 may be connected in common to the word line WL4, the memory cells MC5 may be connected in common to the word line WL5, and the memory cells MC6 may be connected in common to the word line WL6.

In first string selection transistors SSTa, having the same height (or, order), of the cell strings CS11 to CS21 and CS12 to CS22, control gates of the first string selection transistors SSTa in different rows may be connected to different string selection lines SSL1a and SSL2a, respectively. For example, the first string selection transistors SSTa of the cell strings CS11 and CS12 may be connected in common to the string selection line SSL1a, and the first string selection transistors SSTa of the cell strings CS21 and CS22 may be connected in common to the string selection line SSL2a.

In second string selection transistors SSTb, having the same height (or, order), of the cell strings CS11 to CS21 and CS12 to CS22, control gates of the second string selection transistors SSTb in different rows may be connected to the different string selection lines SSL1b and SSL2b. For example, the second string selection transistors SSTb of the cell strings CS11 and CS12 may be connected in common to the string selection line SSL1b, and the second string selection transistors SSTb of the cell strings CS21 and CS22 may be connected in common to the string selection line SSL2b.

That is, cell strings in different rows may be connected to different string selection lines. String selection transistors, having the same height (or, order), of cell strings in the same row may be connected to the same string selection line. String selection transistors, having different heights (or, orders), of cell strings in the same row may be connected to different string selection lines.

In an embodiment, string selection transistors of cell strings in the same row may be connected in common to a string selection line. For example, the string selection transistors SSTa and SSTb of the cell strings CS11 and CS12 in the first row may be connected in common to a string selection line, and the string selection transistors SSTa and SSTb of the cell strings CS21 and CS22 in the second row may be connected in common to a string selection line.

Columns of the cell strings CS11 through CS21 and CS12 through CS22 may be connected to different bit lines BL1 and BL2, respectively. For example, the string selection transistors SSTb of the cell strings CS11 and CS21 in the first column may be connected in common to the bit line BL1, and the string selection transistors SSTb of the cell strings CS12 and CS22 in the second column may be connected in common to the bit line BL2.

The cell strings CS11 and CS12 may compose a first plane, and the cell strings CS21 and CS22 may compose a second plane.

In the memory block BLKa, memory cells of each plane placed at the same height may compose a physical page. A physical page may be a unit of writing and reading the memory cells MC1 to MC6. One plane of the memory block BLKa may be selected by the string selection lines SSL1a, SSL1b, SSL2a, and SSL2b. The cell strings CS11 and CS12 in a first plane may be connected to the bit lines BL1 and BL2 when a turn-on voltage is supplied to the string selection lines SSL1a and SSL1b and a turn-off voltage is supplied to the string selection lines SSL2a and SSL2b. That is, the first plane may be selected. The cell strings CS21 and CS22 in a second plane may be connected to the bit lines BL1 and BL2 when the turn-on voltage is supplied to the string selection lines SSL2a and SSL2b and the turn-off voltage is supplied to the string selection lines SSL1a and SSL1b. That is, the second plane may be selected. In a selected plane, a row of memory cells MC may be selected by the word lines WL1 to WL6. In the selected row, a selection voltage may be applied to the second word line WL2, and a non-selection voltage may be applied to the remaining word lines WL1 and WL3 to WL6. That is, a physical page which corresponds to the second word line WL2 of the second plane may be selected by adjusting voltages on the string selection lines SSL1a, SSL1b, SSL2a, and SSL2b and the word lines WL1 to WL6. A write or read operation may be performed with respect to memory cells MC2 in the selected physical page.

In the memory block BLKa, the memory cells MC1 to MC6 may be erased by the memory block or by the sub-block. When erasing is performed by the memory block, all memory cells MC in the memory block BLKa may be simultaneously erased according to an erase request (e.g., an erase request from an external memory controller). When erasing is performed by the sub-block, a portion of memory cells MC in the memory block BLKa may be simultaneously erased according to an erase request (e.g., an erase request from an external memory controller), and the other thereof may be erase-inhibited. A low voltage (e.g., a ground voltage or a low voltage of which the level is similar to that of the ground voltage) may be supplied to a word line connected to erased memory cells MC, and a word line connected to erase-inhibited memory cells MC may be floated.

The memory block BLKa shown in FIG. 13 is exemplary. However, the scope and spirit of the disclosure may not be limited thereto. For example, the number of rows of cell strings may increase or decrease. As the number of rows of cell strings is changed, the number of string or ground selection lines and the number of cell strings connected to a bit line may also be changed.

The number of columns of cell strings may increase or decrease. If the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In an embodiment, memory cells MC in a physical page may correspond to at least three logical pages. For example, k bits (k being an integer of 2 or more) may be programmed in a memory cell MC. In memory cells MC of one physical page, k logical pages may be implemented with k bits programmed in each memory cell MC.

In an embodiment of the disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the disclosure, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

As described above, the storage device according to an embodiment of the disclosure may include data buffers configured to convey data from an external device, a device controller configured to receive a command and an address from the external device, to control the data buffers, and to transact data with the data buffers, and nonvolatile memories configured to communicate with the device controller and to perform write, read, and erase operations under control of the device controller. When a first link training between the external device and the data buffers is performed by the external device, the device controller may be configured to perform the second link training between the device controller and a data buffer internally without control of the external device.

The first link training may be performed between the external device and the data buffer. The storage device may be configured to perform the first link training with the external device based on a sequence of the link training of the RDIMM. At the first link training, the device controller may control the data buffers such that ZQ-calibration is performed between the external device and the data buffers based on a ZQ-calibration request from the external device.

At the first link training, the device controller may control the data buffers such that a read leveling is performed between the external device and the data buffers based on a read leveling request from the external device. At the first link training, the device controller may control the data buffers such that a write leveling is performed between the external device and the data buffers based on a write leveling request from the external device. At the first link training, the device controller may control the data buffers such that a write delay training is performed between the external device and the data buffers based on a write delay training request from the external device. At the second link training, the device controller may be configured to perform a preamble training with respect to the data buffers.

At the second link training, the device controller may be configured to perform a read leveling with respect to the data buffers. At the second link training, the device controller may be configured to perform a write leveling with respect to the data buffers. At the second link training, the device controller may be configured to perform a write delay training with respect to the data buffers. In a second mode, the device controller may be configured to perform a third link training between the external device and the data buffers, a fourth link training between the data buffers and the device controller, and a fifth link training between the external device and the device controller, based on control of the external device. Each of the third to fifth link trainings may include a read leveling, a write leveling and a write delay training. The third link training, the fourth link training, or the fifth link training may include a preamble training. The third to fifth link trainings may be performed according to a sequence of a link training of a load reduced DIMM (LRDIMM).

A storage device according to an embodiment of the disclosure may include data buffers configured to convey data from an external device, a device controller configured to receive a command and an address from an external device, to control the data buffers, and to transact data with the data buffers, and nonvolatile memories configured to perform write, read, and erase operations under control of the device controller. The device controller may select one of a first link training sequence and a second link training sequence and may perform a link training with the external device based on the selected link training sequence.

The first link training sequence may be a link training sequence of an RDIMM, and the second link training sequence may be a link training sequence of an LRDIMM. If the first link training sequence is selected, the device controller may be configured to perform a link training under control of the external device. If the second link training sequence is selected, the device controller may perform a first portion of the link training under control of the external device and may perform a second portion of the link training internally without control of the external device.

An operating method of a storage device which includes data buffers, a device controller, and nonvolatile memories may include performing a first link training between the external device and the data buffers under control of the external device and performing a second link training between the device controller and the data buffers on the device controller without control of the external device.

Figure 14:
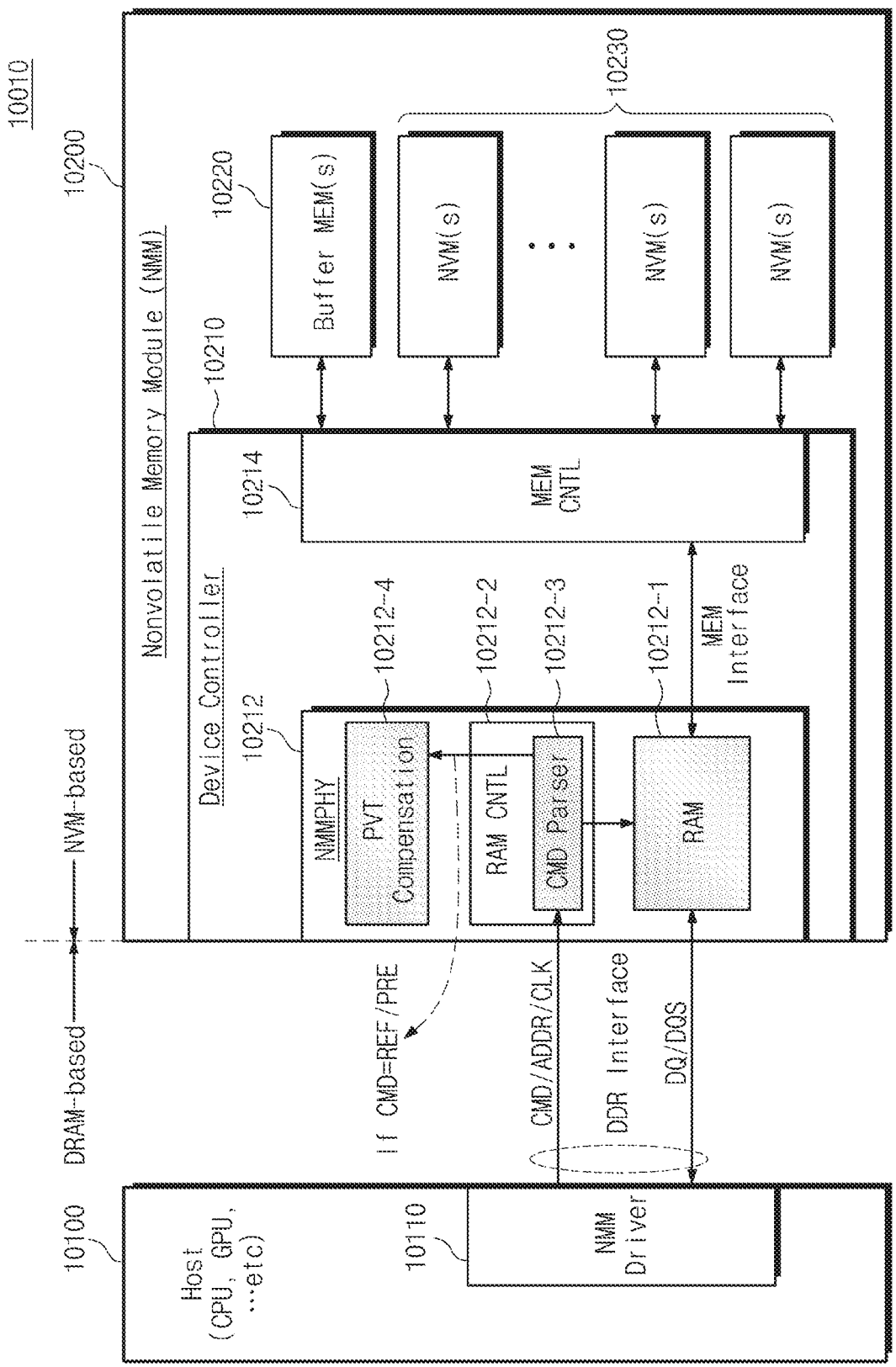
FIG. 14 is a block diagram illustrating a computing system according to an embodiment of the disclosure.

FIG. 14 is a block diagram illustrating a computing system according to an embodiment of the disclosure. Referring to FIG. 14, a computing system 10010 may include a host 10100 and a nonvolatile memory module (NMM) 10200.

In an embodiment, the computing system 10010 may be used as a computer, a portable computer, an ultra-mobile personal computer (UMPS), a workstation, a data server, a net book, a personal data assistant (PDA), a portable multimedia player (PMP), a digital camera, a digital audio recorder/player, a digital camera/video recorder/player, a portable game machine, a navigation system, a black box, a 3D television, a device capable of transmitting and receiving information in a wireless environment, one of various electronic devices constituting a home network, one of various electronic devices constituting a computer network, one of various electronic devices constituting a telematics network, radio-frequency identification (RFID), or one of various electronic devices constituting a computing system.

The host 10100 may perform an access operation of the nonvolatile memory module 10200 such as a read request and a write request, based on an NMM driver 10110. In an embodiment, the NMM driver 10110 may be implemented to access the NMM 10200 using a DRAM-based DDR interface, an RDIMM interface or an LRDIMM interface. The NMM driver 10110 may be implemented with hardware/software/firmware. To write or read data in or from the NMM 10200, the host 10100 may access a physical layer (NMMPHY) 10212 of a device controller 10210.

For example, the host 10100 may be at least one processor, CPU or GPU.

The nonvolatile memory module 10200 may include the device controller 10210, at least one buffer memory 10220, and a plurality of nonvolatile memories 10230.

The device controller 10210 may include a physical layer 10212 for low-level interfacing with the host 10100 and a memory controller 10214 performing data communication with the physical layer 10212 or with the buffer memory 10220 and the nonvolatile memory 10230.

The physical layer 10212 may include a RAM 10212-1, a RAM controller (RAM CNTL) 10212-2, and a PVT (process, voltage, temperature) compensation unit 10212-4. In an embodiment, the physical layer 10212 may include a part or all of a DIMM physical layer.

The RAM 10212-1 may be implemented to exchange data with the host 10100 using data DQ and a data strobe signal DQS based on a DDR interface or to exchange packet-type data with the buffer memory 10220 and/or the nonvolatile memories 10230 based on a memory interface. In an embodiment, the RAM 10212-1 may be implemented with a volatile/nonvolatile memory device which is able to be randomly accessed at a high speed. For example, the RAM 10212-1 may be a dual port SRAM. In an embodiment, a memory interface (MEM interface) may be implemented with a SoC-dedicated interface such as AXI (Advanced eXtensible Interface, AXI3, AXI4, and the like), AMBA (Advanced Microcontroller Bus Architecture), OCP (open core protocol), and the like.

In an embodiment, to write or read data in or from the nonvolatile memory module 10200, specific areas of the RAM 10212-1 may be accessed by a host, the nonvolatile memory 10230 or the buffer memory 10220.

According to an interfacing protocol defined between the host 10100 and the physical layer 10212 of the nonvolatile memory module 10200, the host 10100 may transfer data by a basic transfer unit when writing data in the RAM 10212-1. That is, at a write operation, the host 10100 may write data of a basic transfer unit (e.g., 512 bytes) in the RAM 10212-1 of the nonvolatile memory module 10200. In this case, even though a small size of data (e.g., 16 bytes) is written, 16-byte data and 496-byte data may be respectively written in the RAM 10212-1 as meaningful data and invalid dummy data.

The RAM controller 10212-2 may receive a RAM command CMD, a RAM address ADDR, a clock CLK, and the like from the host 10100 and may control the RAM 10212-1 based on the received RAM command CMD, RAM address ADDR, and clock CLK. The RAM controller 10212-2 may include a command parser 10212-3 which receives and parses the RAM command CMD. In an embodiment, the RAM command CMD may include a command for a normal DIMM.

The PVT compensation unit 10212-4 may perform a PVT compensation operation in the physical layer 10212 in response to a refresh command REF/a precharge command PRE parsed by the command parser 10212-3. However, the scope and spirit of the disclosure may not be limited thereto. The PVT compensation unit 10212-4 may perform a PVT compensation of any device in the nonvolatile memory module 10200.

In an embodiment, the PVT compensation operation may include a PVT variation detecting operation. The PVT compensation operation may be performed based on the detected PVT variation information. In another embodiment, the PVT compensation operation may be performed based on previously stored PVT variation information. In an embodiment, the PVT compensation unit 10212-4 may be implemented with hardware/software/firmware. The PVT compensation unit 10212-4 may include a separate core for performing the PVT compensation operation.

At least one buffer memory 10220 may store data for managing/controlling the nonvolatile memories 10230 or may temporarily store data associated with data inputted/outputted to/from the nonvolatile memories 10230. In an embodiment, the buffer memory 10220 may include a random access memory such as DRAM, SRAM, PRAM, MRAM, RRAM, FeRAM, or the like.

The nonvolatile memories 10230 may store data requested from the host 10100. The nonvolatile memory may be a NAND flash memory, a vertical NAND flash memory (VNAND), a NOR flash memory, an RRAM, a PRAM, an MRAM, an FRAM, a spin transfer toque random access memory (STT-RAM), or the like. Furthermore, the nonvolatile memory may be implemented to have a three-dimensional array structure.

The nonvolatile memory module 10200 of the disclosure may perform an effective PVT compensation operation when receiving a command (e.g., a refresh/precharge command) needed for a DRAM-based memory module and not needed for a NVM-based memory module, thereby improving the performance overall.

Figure 15:
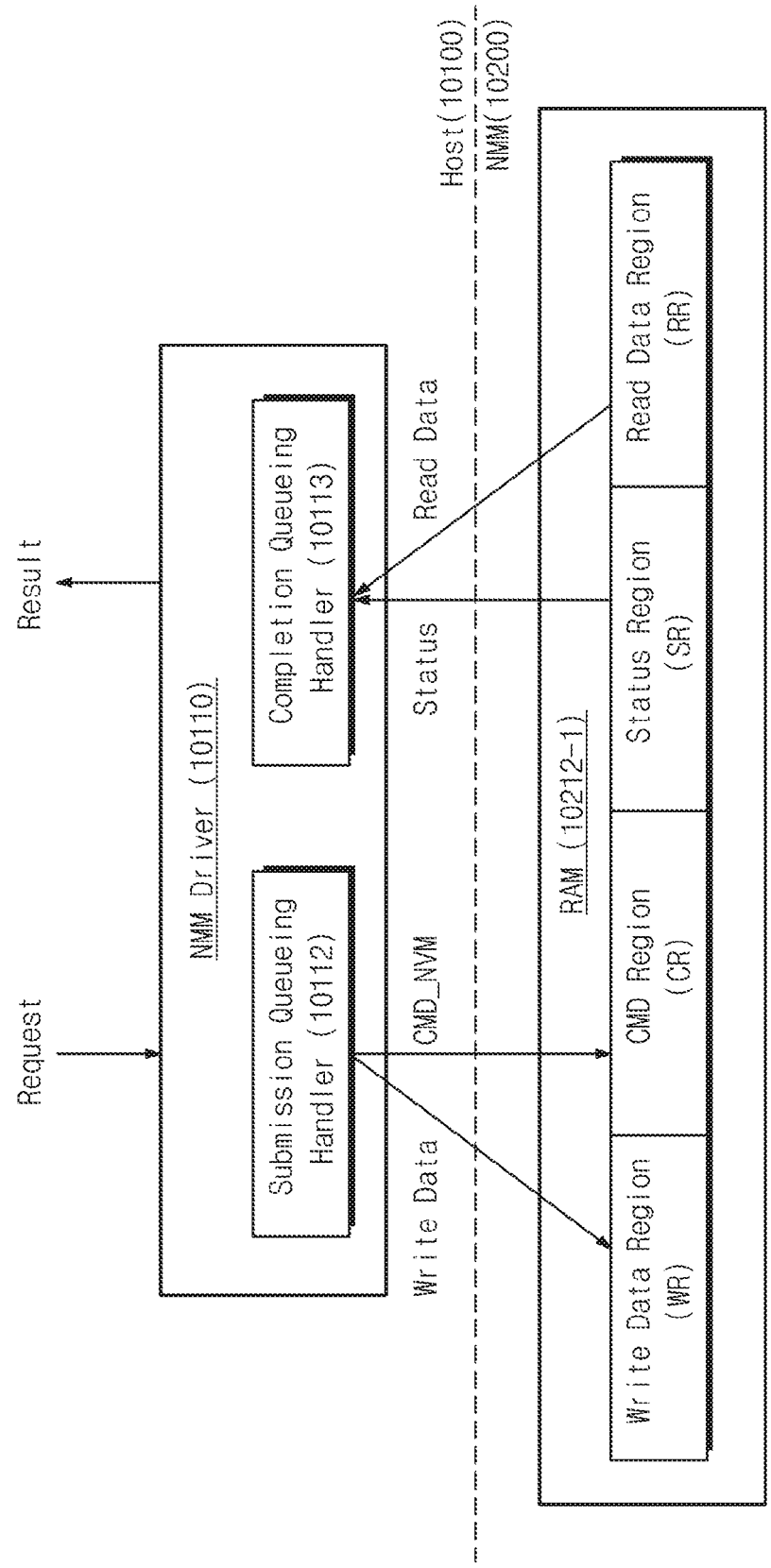
FIG. 15 is a diagram schematically illustrating a data communication method of a host and a nonvolatile memory module, according to an embodiment of the disclosure.

FIG. 15 is a diagram schematically illustrating a data communication method of a host 10100 and a nonvolatile memory module 10200, according to an embodiment of the disclosure. Referring to FIG. 15, the host 10100 and the nonvolatile memory module (NMM) 10200 may transmit and receive data through a queuing manner.

An NMM driver 10110 of the host 10100 may include a submission queuing handler 10112 and a completion queuing handler 10113. In response to an access request of the nonvolatile memory module 10200 from the host 10100, the submission queuing handler 10112 may transmit a nonvolatile command CMD_NVM, associated with an operation of a nonvolatile memory in the nonvolatile memory module 10200, to a command region CR of the RAM 10212-1. In the case where the access request is a write operation, the submission queuing handler 10112 may transmit data to be written in a write data region WR of the RAM 10212-1 and may transmit a command about the write request to the command region CR. In the case where the access request is a read operation, the submission queuing handler 10112 may transmit a command about the read request to the command region CR of the RAM 10212-1. In an embodiment, the submission queuing handler 10112 may first check, from a status region SR of the RAM 10212-1, whether an empty space exists in a write data region WR.

The completion queuing handler 10113 may read status information, indicating whether a command is processed, from the status region SR of the RAM 10212-1 and may read data, corresponding to a read request, from the read data area RR of the RAM 10212-1. The completion queuing handler 10113 may transmit the read status information and/or read data to an upper layer as a result value.

Figure 16:
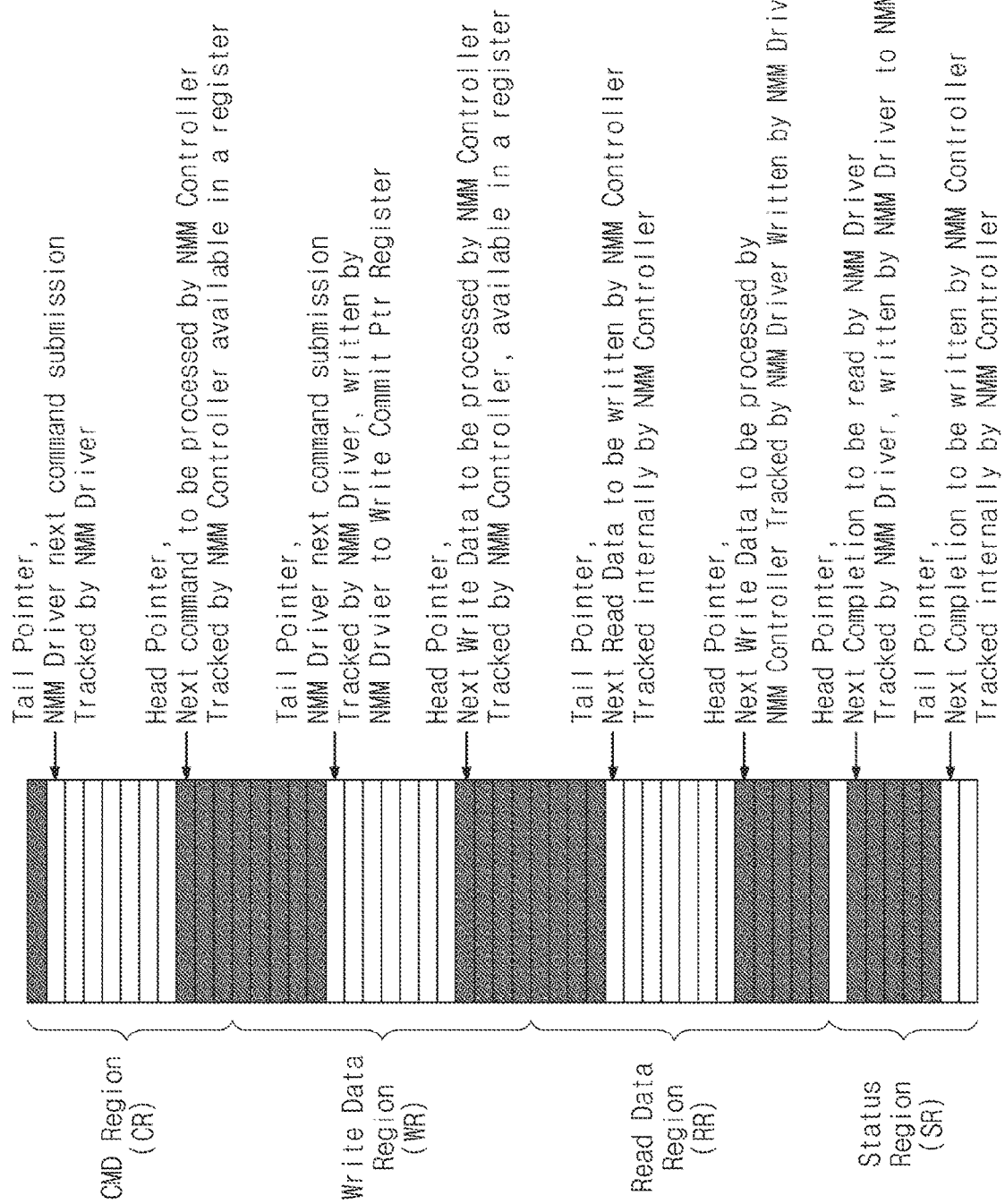
FIG. 16 is a block diagram schematically illustrating pointers of a RAM according to an embodiment of the disclosure.

FIG. 16 is a block diagram schematically illustrating pointers of a RAM 10212-1 according to an embodiment of the disclosure. Referring to FIG. 16, pointers of the RAM 10212-1 may include a head pointer and a tail pointer corresponding to each of the regions CR, WR, RR, and SR.

The size of each of the regions CR, WR, RR, and SR may be fixed or varied according to the number of registers. For example, the size of a command region CR may be 32 bytes, the size of each of the write data region WR and the read data region RR may be 64 bytes, and the size of the status region SR may be 16 bytes.

In an embodiment, a circumstance in which a location to which the head pointer of the region CR/WR/RR/SR points is the same as a location to which the tail pointer thereof points may mean that the region CR/WR/RR/SR is empty. In an embodiment, a circumstance in which a value, obtained by subtracting "1" from a value of a location to which the head pointer of the region CR/WR/RR/SR points, is the same as a value of a location to which the tail pointer thereof points may mean that the region CR/WR/RR/SR is full.

The head pointer of the command region CR may indicate a region where a next command to be processed by the NMM controller 10210 is stored. The NMM controller 10210 may track the head pointer of the command region CR. The head pointer of the command region CR may be usable through one register. The tail pointer of the command region CR may indicate a region informing that a next or subsequent command submission is received from the NMM driver 10110. The NMM driver 10110 may track the tail pointer of the command region CR.

The head pointer of the write data region WR may indicate a region where next write data to be processed by the NMM controller 10210 is stored. The NMM controller 10210 may track the head pointer of the write data region WR. The head pointer of the write data region WR may be usable through one register. The tail pointer of the command region CR may indicate a region informing that a next or subsequent command submission is received from the NMM driver 10110. The NMM driver 10110 may track the tail pointer of the write data region WR. The tail pointer may be written in a write commit pointer register by the NMM driver 10110.

The head pointer of the read data region RR may indicate a region where next read data to be read by the NMM driver 10110 is stored. The NMM driver 10110 may track the head pointer of the read data region RR. The head pointer of the read data region RR may be written in a register of the NMM controller 10210 by the NMM driver 10110. The tail pointer of the read data region RR may indicate a region where next or subsequent read data to be written by the NMM controller 10210 is stored. The NMM controller 10210 may internally track the tail pointer of the read data region RR.

The head pointer of the status region SR may indicate a region where a next completion read by the NMM driver 10110 is stored. The NMM driver 10110 may track the head pointer of the status region SR. The head pointer of the status region SR may be written in a register of the NMM controller 10210 by the NMM driver 10110. The tail pointer of the status region SR may indicate a region where a next or subsequent completion to be written by the NMM controller 10210 is stored. The NMM controller 10210 may internally track the tail pointer of the status region SR.

Figure 17:
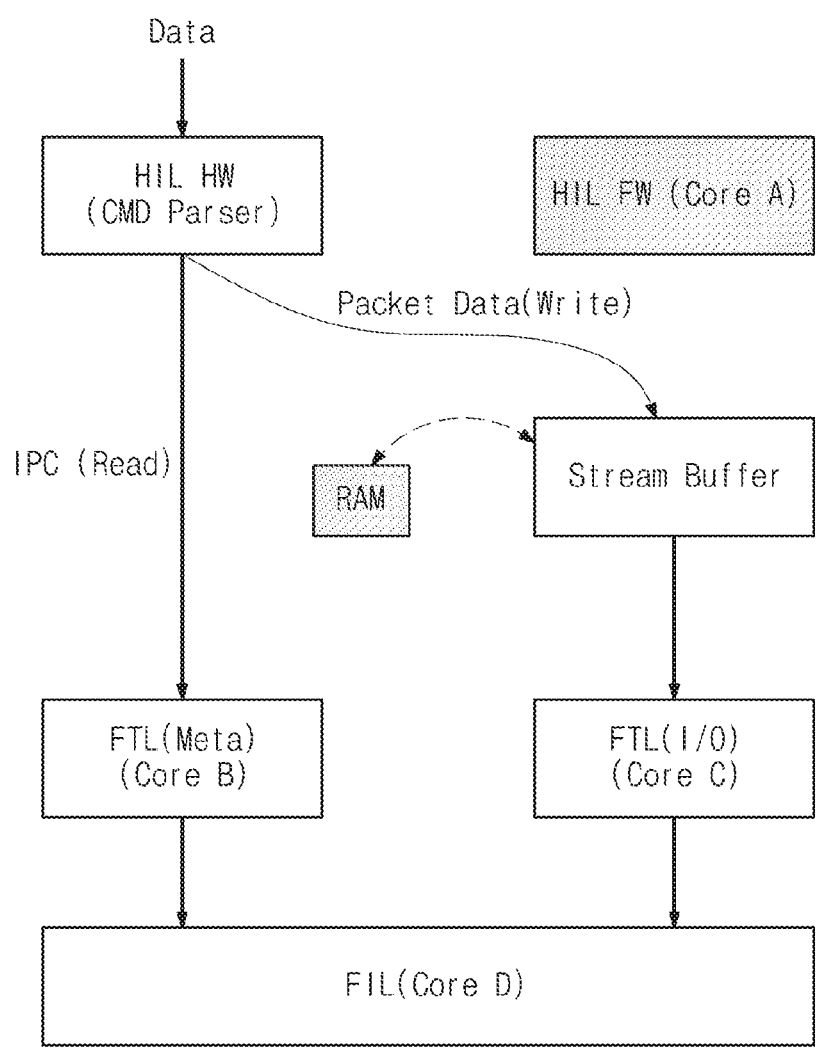
FIG. 17 is a diagram schematically illustrating firmware architecture of a nonvolatile memory module according to an embodiment of the disclosure.

FIG. 17 is a diagram schematically illustrating firmware architecture of a nonvolatile memory module 10200 according to an embodiment of the disclosure. Referring to FIG. 17, a read path and a write path may be independent of each other in the firmware architecture of the nonvolatile memory module (NMM) 10200.

The read path may be configured as follows. Hardware corresponding to a host interface layer (HIL), for example, the command parser 10212-3 of FIG. 14 may parse an input command (write command/read command) In the case where the input command is a read command, information IPC corresponding to a read operation may be transmitted to a meta-dedicated flash translation layer (FTL). A core Core B may convert a logical address into a physical address based on the information IPC and may transmit it to the flash interface layer (FIL). A core Core D may access a nonvolatile memory device corresponding to the physical address converted for a read operation.

The write path may be configured as follows. Hardware corresponding to the host interface layer (HIL), for example, the command parser 10212-3 of FIG. 14 may parse an input command (write command/read command) In the case where the input command is a write command, a stream packet corresponding to the write operation may be formed, and the stream packet may be transmitted to a stream buffer. In an embodiment, the stream buffer may exchange data with the RAM 10212-1 of FIG. 14. In an embodiment, the size of the stream packet may be 512 KB.

A core Core C may convert a logical address into a physical address based on an input/output-dedicated file translation layer (FTL) and may transmit it to the flash interface layer (FIL). The core Core D may access a nonvolatile memory device corresponding to the physical address converted for a write operation.

The host interface layer firmware (HIL FW) may decode a transferred packet (a command packet) and may perform a command operation corresponding thereto. The host interface layer firmware may be executed on the core Core A.

Figure 18:
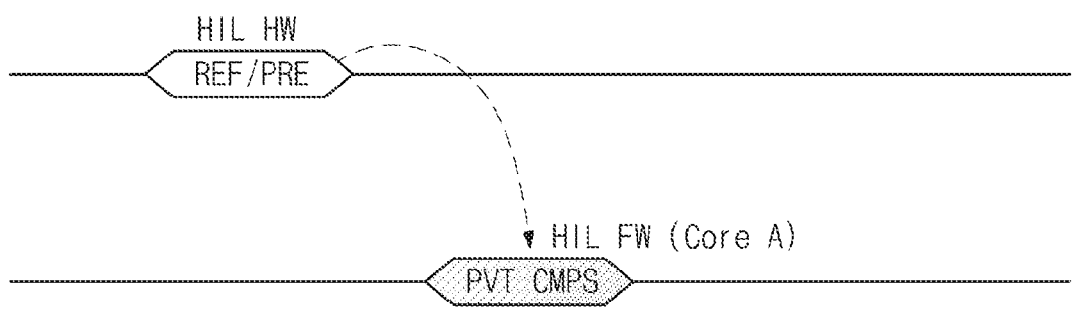
FIG. 18 is a diagram schematically illustrating a firmware operation of a nonvolatile memory module according to an embodiment of the disclosure.

FIG. 18 is a diagram schematically illustrating a firmware operation of a nonvolatile memory module 10200 according to an embodiment of the disclosure. Referring to FIG. 18, host interface layer hardware, that is, the command parser 10212-3 may recognize a refresh command or a precharge command REF/PRE from the host 100 (refer to FIG. 14), and host interface layer firmware (HIL FW) driven on the core Core A may generate at least one control signal PVT CMPS for a PVT compensation operation in response to the refresh command or precharge command REF/PRE.

Figure 19:
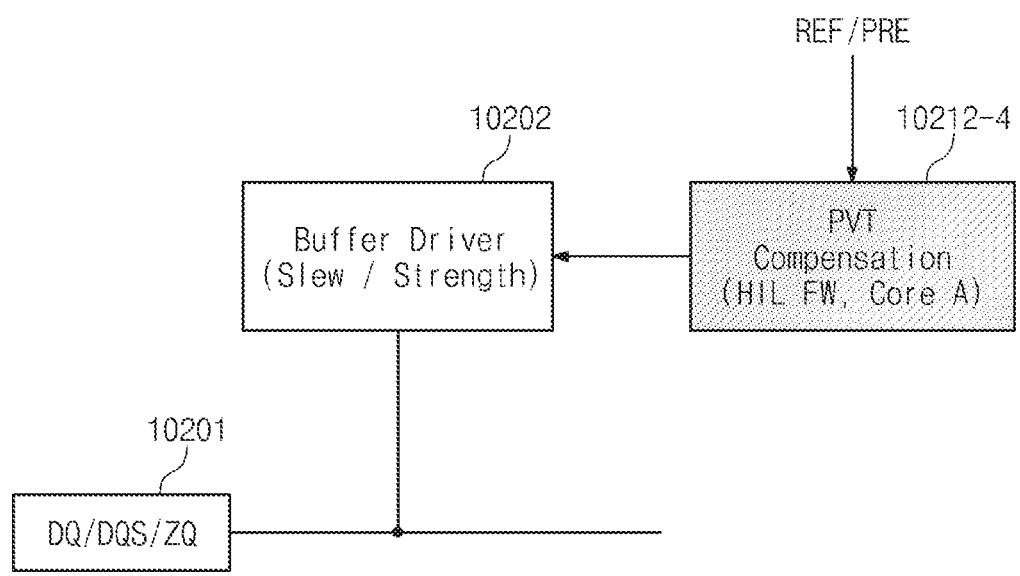
FIG. 19 is a block diagram illustrating a PVT compensation method according to an embodiment of the disclosure.

FIG. 19 is a block diagram illustrating a PVT compensation method according to an embodiment of the disclosure. Referring to FIGS. 14 to 19, the PVT compensation unit 10212-4 may adjust a slew and/or a strength of the buffer driver 10202 connected to a data pad/data strobe pad/ZQ pad (DQ/DQS/ZQ) 10201 in response to the refresh/precharge command REF/PRE.

Figure 20:
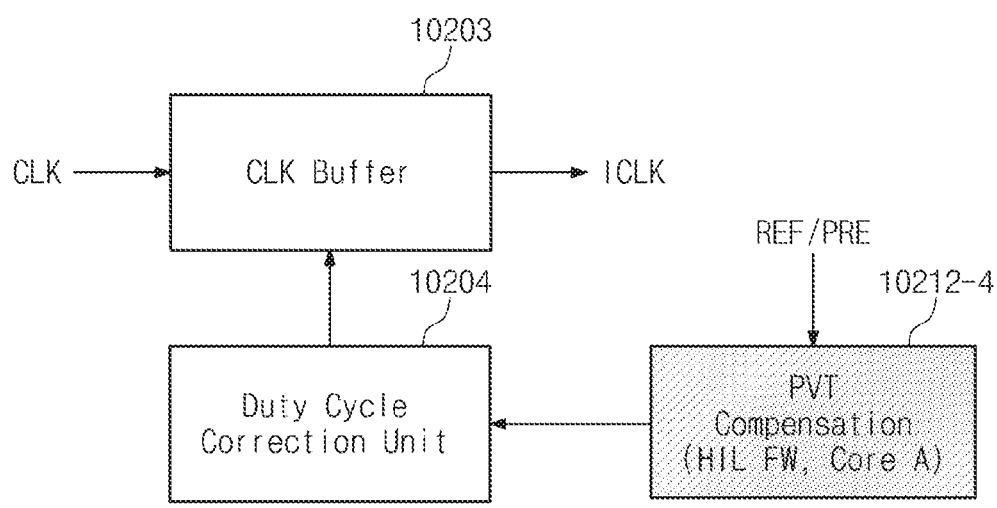
FIG. 20 is a block diagram illustrating a PVT compensation method according to another embodiment of the disclosure.

FIG. 20 is a block diagram illustrating a PVT compensation method according to another embodiment of the disclosure. Referring to FIGS. 14 to 18 and 20, the PVT compensation unit 10212-4 may control a duty cycle correction unit 10204 connected to the clock buffer 10203 in response to a refresh/precharge command REF/PRE. In this case, an optimal internal clock ICLK may be generated by adjusting a duty of the clock CLK.

Figure 21:
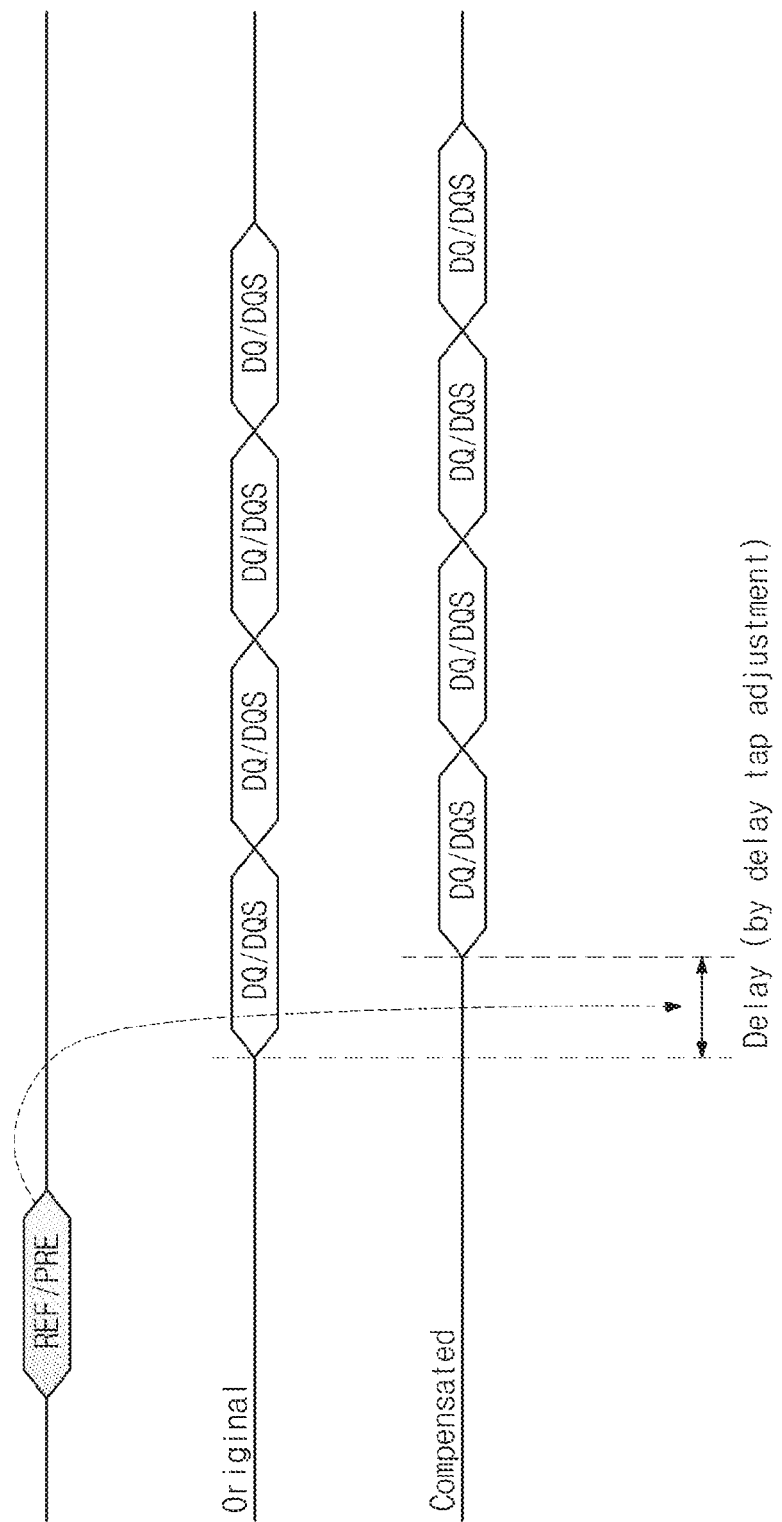
FIG. 21 is a block diagram illustrating a PVT compensation method according to still another embodiment of the disclosure.

FIG. 21 is a block diagram illustrating a PVT compensation method according to still another embodiment of the disclosure. Referring to FIGS. 14 to 18 and 21, the PVT compensation unit 10212-4 may adjust a delay of an inputted/outputted data signal/data strobe signal DQ/DQS in response to a refresh/precharge command REF/PRE. Here, the delay may be made through delay tap adjustment.

Meanwhile, the NMM 10200 illustrated in FIG. 14 may directly store inputted/outputted data DQ/DQS in the RAM 10212-1. However, the scope and spirit of the disclosure may not be limited thereto. The NMM of the disclosure may store the input/output data DQ/DQS in RAM through a data buffer.

Figure 22:
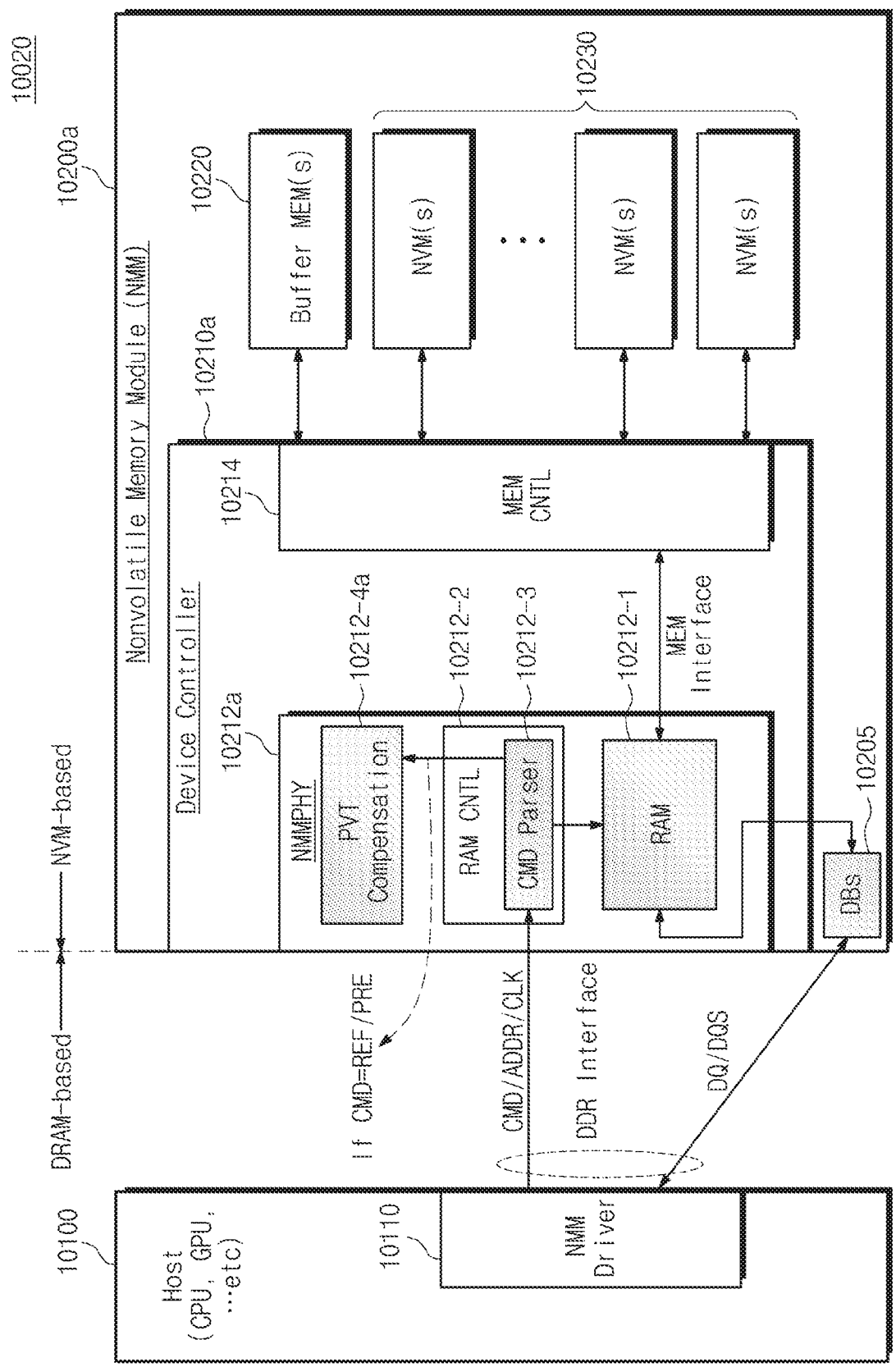
FIG. 22 is a block diagram illustrating a computing system according to another embodiment of the disclosure.

FIG. 22 is a block diagram illustrating a computing system according to another embodiment of the disclosure. Referring to FIG. 22, the computing system 10020 may include a host 10100 and a nonvolatile memory module (NMM) 10200a. Compared with the nonvolatile memory module 10200 illustrated in FIG. 14, the nonvolatile memory module 10200a may further include data buffers 10205 inputting and outputting input/output data DQ/DQS. An operation of the NMM controller 10210a including an NMM physical layer 10212a to control the data buffers 10205 may be different from that of the NMM controller 10210 of FIG. 14.

Figure 23:
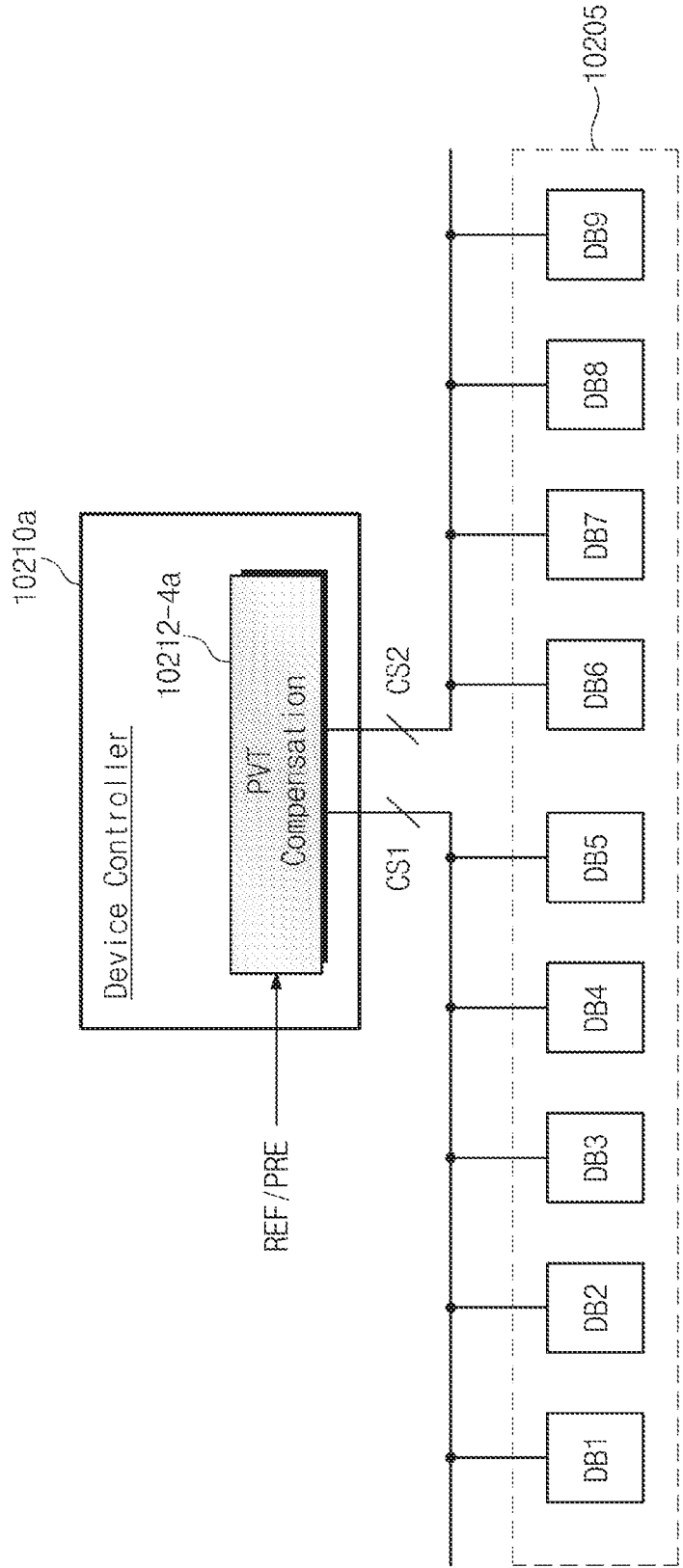
FIG. 23 is a diagram illustrating a PVT compensation method according to still another embodiment of the disclosure.

FIG. 23 is a diagram illustrating a PVT compensation method according to still another embodiment of the disclosure. Referring to FIGS. 14 to 23, a PVT compensation unit 10212-4a may perform a PVT compensation operation with respect to each of data buffers DB1 to DB9 10205 in response to a refresh/precharge command REF/PRE. In an embodiment, the PVT compensation operation may be performed with respect to a first group of data buffers DB1 to DB5 connected to first control signal lines CS1 and a second group of data buffers DB6 to DB9 connected to second control signal lines CS2, for a group.

Figure 24:
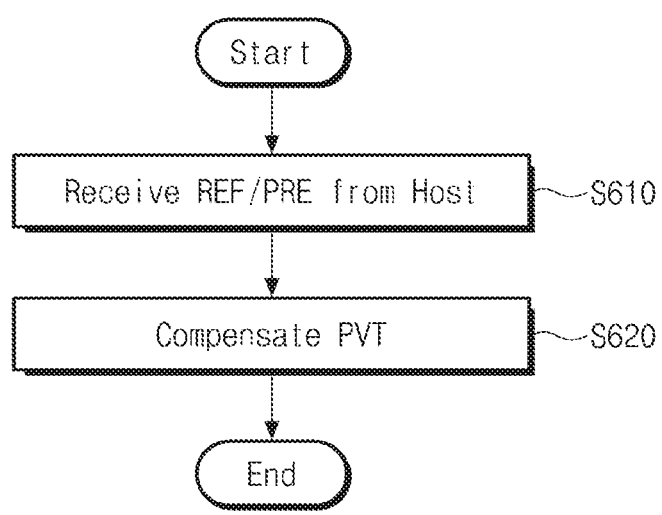
FIG. 24 is a flow chart schematically illustrating a PVT compensation method of a nonvolatile memory module according to an embodiment of the disclosure.

FIG. 24 is a flow chart schematically illustrating a PVT compensation method of a nonvolatile memory module according to an embodiment of the disclosure. A PVT compensation method of an NMM 10200/10200a will be described with reference to FIGS. 14 to 24. A refresh command or a precharge command may be received from the host 10100 (S610). When the command parser 10212-3 of the NMM 10200/10200a recognizes the refresh command/precharge command, the host interface layer firmware (HIL FW) of the NMM controller 10210/10210a may perform a PVT compensation operation (S620).

The PVT compensation method according to an embodiment of the disclosure may perform the PVT compensation operation in response to a refresh command or a precharge command.

Figure 25:
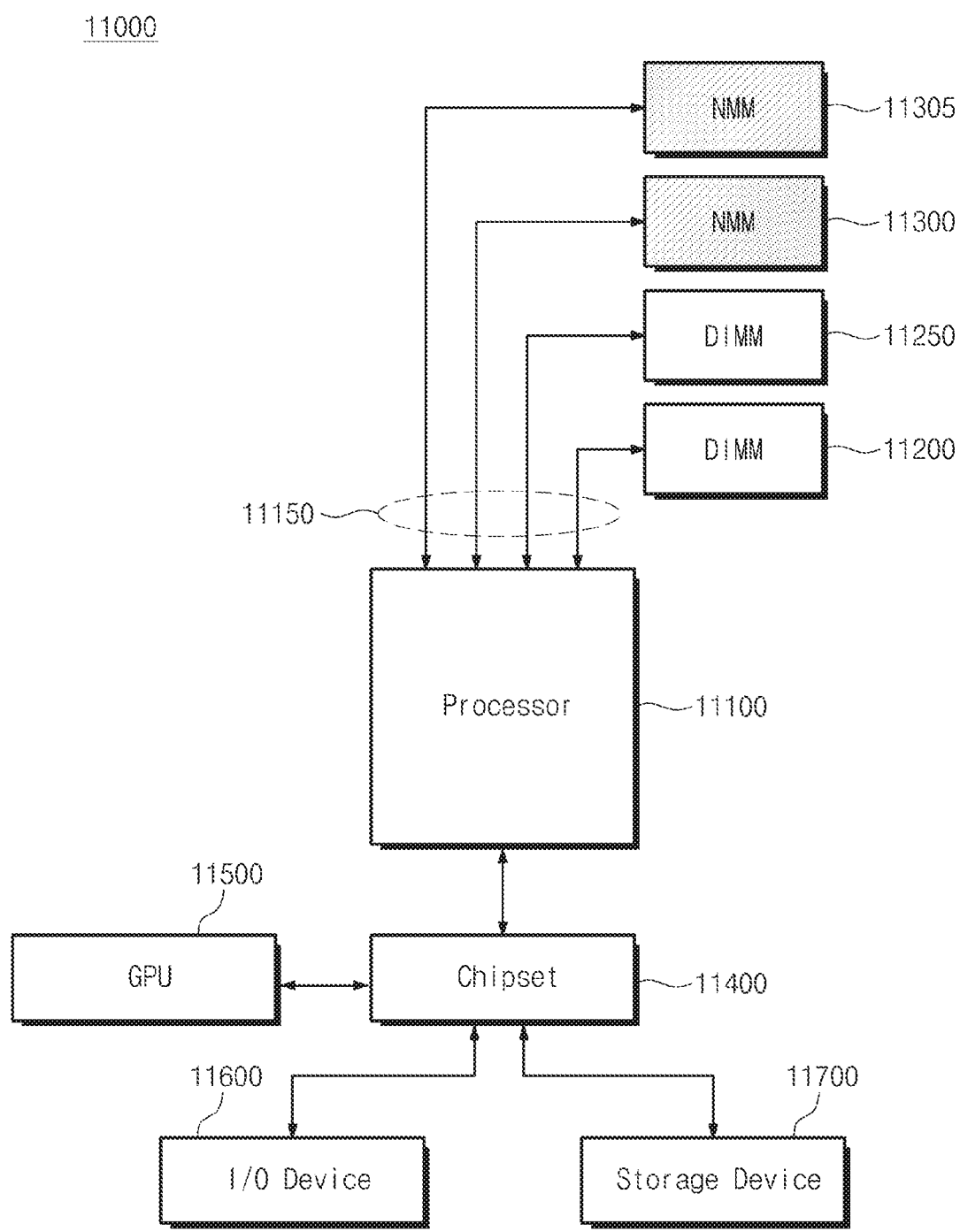
FIG. 25 is a block diagram schematically illustrating a computing system to which a nonvolatile memory module according to an embodiment of the disclosure is applied.

FIG. 25 is a block diagram schematically illustrating a computing system to which a nonvolatile memory module according to an embodiment of the disclosure is applied. Referring to FIG. 25, a computing device 11000 may include a processor 11100, RAM modules 11200 and 11250, a chipset 11400, a GPU 11500, an input/output device 11600, and a storage device 11700.

The processor 11100 may control an overall operation of the computing device 11000. The processor 11100 may perform various operations to be executed on the computing system 11000.

The RAM modules 11200 and 11250 and the nonvolatile memory modules 11300 and 11305 may be directly connected with the processor 11100. For example, each of the RAM modules 11200 and 11250 and the nonvolatile memory modules 11300 and 11305 may have a DIMM shape. Alternatively, each of the RAM modules 11200 and 11250 and the nonvolatile memory modules 11300 and 11305 may be mounted on a DIMM socket directly connected with the processor 11100 and may communicate with the processor 11100. Each of the nonvolatile memory modules 11300 and 11305 may be the nonvolatile memory module 10200 or 10200a described with reference to FIGS. 14 to 24.

The RAM modules 11200 and 11250 and the nonvolatile memory modules 11300 and 11305 may communicate with the processor 11100 through the same interface 11150. For example, the RAM modules 11200 and 11250 and the nonvolatile memory modules 11300 and 11305 may communicate with each other through the DDR interface 11150. In an embodiment, the processor 11100 may use the RAM modules 11200 and 11250 as a working memory, a buffer memory, or a cache memory of the computing system 11000.

The chipset 11400 may be electrically connected with the processor 11100 and may control hardware of the computing system 11000 in response to control of the processor 11100. For example, the chipset 11400 may be connected to each of the GPU 11500, the input/output device 11600, and the storage device 11700 through main buses and may perform a bridge operation with respect to the main buses.

The GPU 11500 may perform a set of operations for outputting image data of the computing system 11000. In an embodiment, the GPU 11500 may be embedded in the processor 11100 in the form of a system on chip.

The input/output device 11600 may include various devices which input data or commands in the computing system 11000 or output data to an external device. For example, the input/output device 11600 may include user input devices such as a keyboard, a keypad, a button, a touch panel, a touch screen, a touch pad, a touch ball, a microphone, a gyroscope sensor, a vibration sensor, a piezoelectric sensor, and the like and user output devices such as a liquid crystal display (LCD), an organic light emitting diode (OLED) display device, an active matrix OLED (AMOLED) display device, a light emitting diode, a speaker, a motor, and the like.

The storage device 11700 may be used as a storage medium of the computing system 11000. The storage device 11700 may include mass storage media such as a hard disk drive (HDD), a solid state drive (SSD), a memory card, a memory stick, and the like.

In an embodiment, the nonvolatile memory modules 11300 and 11305 may be used as a storage medium of the computing system 11000 through the processor 11100. An interface 11150 between the nonvolatile memory module 11300 and 11305 and the processor 11100 may be faster in speed than that between the storage device 11700 and the processor 11100. That is, the processor 11100 may use the nonvolatile memory module 11300 and 11305 as a storage medium, thereby improving the performance of the computing system.

Figure 26:
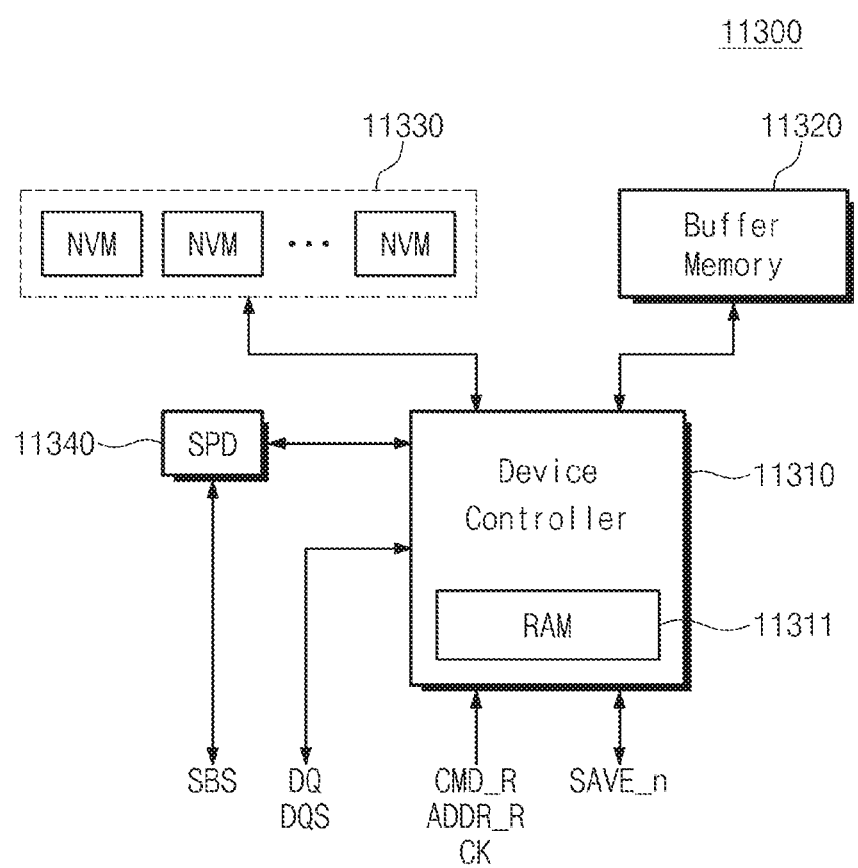
FIG. 26 is a block diagram schematically illustrating one of nonvolatile memory modules of FIG. 25, according to an embodiment of the disclosure.

FIG. 26 is a block diagram schematically illustrating one of the nonvolatile memory modules of FIG. 25, according to an embodiment of the disclosure. In an embodiment, FIG. 26 shows the nonvolatile memory module 11300 with a load reduced DIMM (LRDIMM) form. In an embodiment, the nonvolatile memory module 11300 illustrated in FIG. 26 may be of the form of a dual in-line memory module (DIMM) and may be mounted on a DIMM socket so as to communicate with the processor 11100.

Referring to FIG. 26, the nonvolatile memory module 11300 may include a device controller 11310, a buffer memory 11320, a nonvolatile memory device 11330, and a serial presence detect chip (SPD) 11340. The device controller 11310 may include a RAM 11311. In an embodiment, the nonvolatile memory device 11330 may include a plurality of nonvolatile memories NVM. Each of the nonvolatile memories included in the nonvolatile memory device 11330 may be implemented with a chip, a package, a device, or a module. Alternatively, the nonvolatile memory device 11330 may be implemented with a chip or a package.

In an embodiment, the device controller 11310, the RAM 11311, the buffer memory 11320, and the nonvolatile memory device 11330 may be the same as or equal to the device controller 10210, the RAM 213, the buffer memory 10220, and the nonvolatile memories 10230 described with reference to FIGS. 14 to 24.

In an embodiment, the device controller 11310 may transmit and receive a plurality of data signals DQ and a plurality of data strobe signals DQS to and from the processor 11100 and may receive a RAM command CMD_R, a RAM address ADDR_R, and a clock CK through separate signal lines. The device controller 11310 may transmit a save signal SAVE_n to the processor 11100. The save signal SAVE_n may notify at least one of various information or states of the nonvolatile memory module 11300. For example, the save signal SAVE_n may notify that an operation performed by the nonvolatile memory module 11300 has been completed to the processor 11100 such as a backup, a flush, a transfer preparation, etc.

The SPD 11340 may be a programmable read only memory device (e.g., EEPROM). The SPD 11340 may include initial information or device information of the nonvolatile memory module 11300. In an embodiment, the SPD 11340 may include initial information or device information such as a module type, a module configuration, a storage capacity, a module kind, an execution environment, and the like of the nonvolatile memory module 11300. When a computing system including the nonvolatile memory module 11300 is booted up, the processor 11100 of the computing system may read the SPD 11340 and may recognize the nonvolatile memory module 11300 based on the read result. The processor 11100 may use the nonvolatile memory module 11300 as a storage medium based on the SPD 11340.

In an embodiment, the SPD 11340 may communicate with the processor 11100 through a side-band communication channel. The processor 11100 may exchange a side-band signal SBS with the SPD 11340 through the side-band communication channel. In an embodiment, the SPD 11340 may communicate with the device controller 11310 through the side-band communication channel. In an embodiment, the side-band communication channel may be based on I2C communication. In an embodiment, the SPD 11340, the device controller 11310, and the processor 11100 may communicate with each other or may exchange data with each other, based on the I2C communication.

Figure 27:
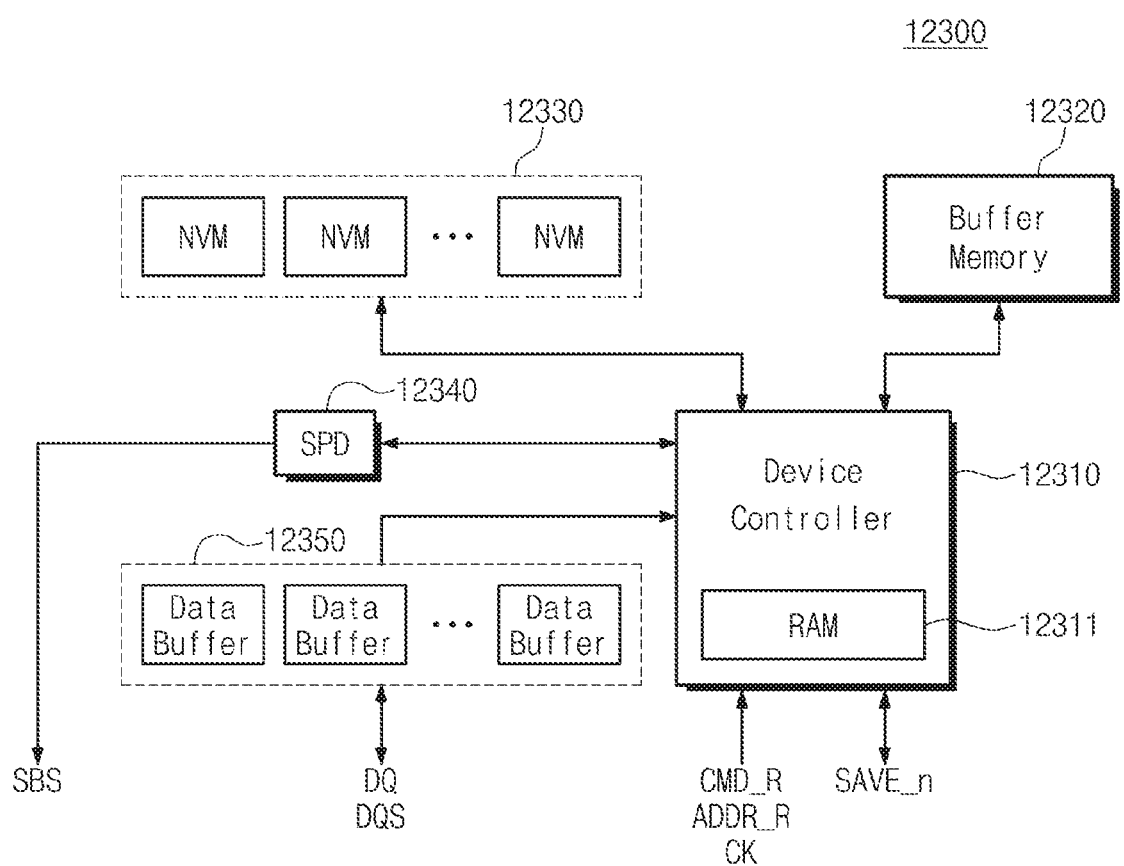
FIG. 27 is a block diagram schematically illustrating one of nonvolatile memory modules of FIG. 25.

FIG. 27 is a block diagram schematically illustrating one of the nonvolatile memory modules of FIG. 25. In an embodiment, FIG. 27 shows a nonvolatile memory module 12300 with a registered DIMM (RDIMM) form. In an embodiment, the nonvolatile memory module 12300 illustrated in FIG. 27 may be of the form of a dual in-line memory module (DIMM) and may be mounted on a DIMM socket so as to communicate with the processor 11100.

Referring to FIG. 27, the nonvolatile memory module 12300 may include a device controller 12310, a buffer memory 12320, a nonvolatile memory device 12330, a serial presence detect chip (SPD) 12340, and a data buffer circuit 12350. The device controller 12310 may include a RAM 12311. The device controller 12310, the RAM 12311, the nonvolatile memory device 12330 and the SPD 12340 are described with reference to FIGS. 14 to 25, and a detailed description thereof is thus omitted.

The data buffer circuit 12350 may receive information or data from the processor 11100 (refer to FIG. 25) through a data signal DQ and a data strobe signal DQS and may transfer the received information or data to the device controller 12310. Alternatively, the data buffer circuit 12350 may receive information or data from the device controller 12310 and may transfer the received information or data to the processor 11100 through a data signal DQ and a data strobe signal DQS.

In an embodiment, the data buffer circuit 12350 may include a plurality of data buffers. Each of the data buffers may exchange the data signal DQ and the data strobe signal DQS with the processor 11100. Alternatively, each of the data buffers may exchange a signal with the device controller 12310. In an embodiment, each of the data buffers may operate according to control of the device controller 12310.

In an embodiment, the device controller 12310 may perform a PVT compensation operation in response to an operating method described with reference to FIGS. 14 to 24. The device controller 12310 may transmit a save signal SAVE_n to the processor 11100.

Figure 28:
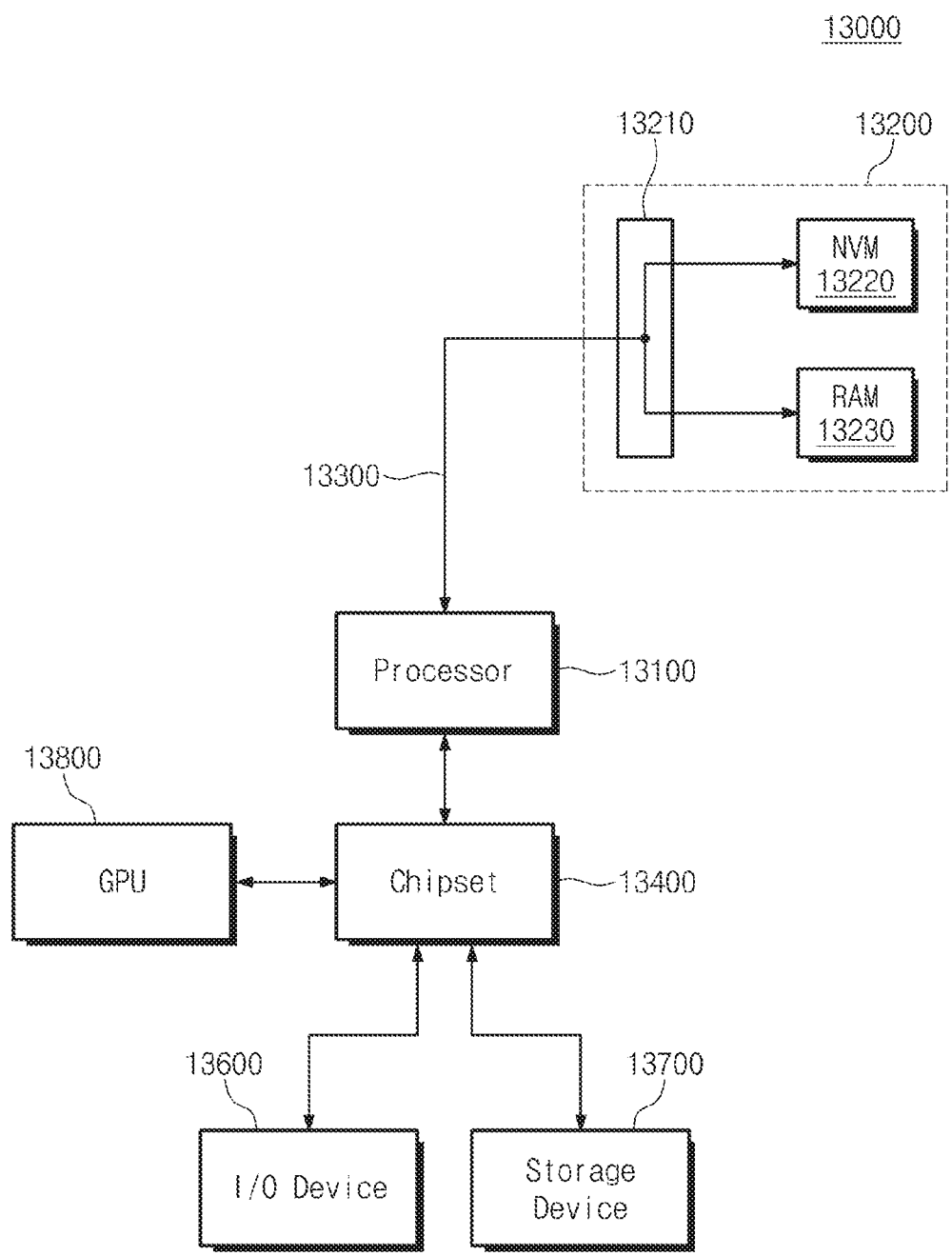
FIG. 28 is a block diagram schematically illustrating a computing system to which a nonvolatile memory module according to another embodiment of the disclosure is applied.

FIG. 28 is a block diagram schematically illustrating a computing system to which a nonvolatile memory module according to another embodiment of the disclosure is applied. For descriptive convenience, detailed descriptions about above-described components may be omitted. Referring to FIG. 28, a computing system 13000 may include a processor 13100, a nonvolatile memory module 13200, a chipset 13400, a graphic processing unit (GPU) 13800, an input/output device 13600, and a storage device 13700. The processor 13100, the chipset 13400, the GPU 13800, the input/output device 13600, and the storage device 137000 are substantially the same as the corresponding components disclosed with respect to FIG. 25, and a detailed description thereof is thus omitted.

The nonvolatile memory module 13200 may be directly connected to the processor 13100. For example, the nonvolatile memory module 13200 may be of the form of a dual in-line memory module (DIMM) and may be mounted on a DIMM socket so as to communicate with the processor 13100.

The nonvolatile memory module 13200 may include a control circuit 13210, a nonvolatile memory device 13220, and a RAM device 13230. Unlike the nonvolatile memory module 11300 and 12300 of FIGS. 25 to 27, the processor 13100 may access the nonvolatile memory device 13220 and the RAM device 13230 of the nonvolatile memory module 13200, respectively. In more detail, the control circuit 13210 may store received data in the nonvolatile memory device 13220 or the RAM device 13230 in response to control of the processor 13100. Alternatively, under control of the processor 13100, the control circuit 13210 may transmit data stored in the nonvolatile memory device 13220 to the processor 13100 or data stored in the RAM device 13230 to the processor 13100. That is, the processor 13100 may respectively recognize the nonvolatile memory device 13220 and the RAM device 13230 included in the nonvolatile memory module 13200. The processor 13100 may store data in the nonvolatile memory device 13220 of the nonvolatile memory module 13200 or may read data therefrom. Alternatively, the processor 13100 may store data in the RAM device 13230 or may read data therefrom.

In an embodiment, the processor 13100 may use the nonvolatile memory device 13220 of the nonvolatile memory module 13200 as a storage medium of the computing system 13000 and may use the RAM device 13230 of the nonvolatile memory module 13200 as a main memory of the computing system 13000. That is, the processor 13100 may selectively access the nonvolatile memory device 13220 or the RAM device 13230 included in a memory module which is mounted on a DIMM socket.

In an embodiment, the processor 13100 may communicate with the nonvolatile memory module 13200 through a DDR interface 13300.

Figure 29:
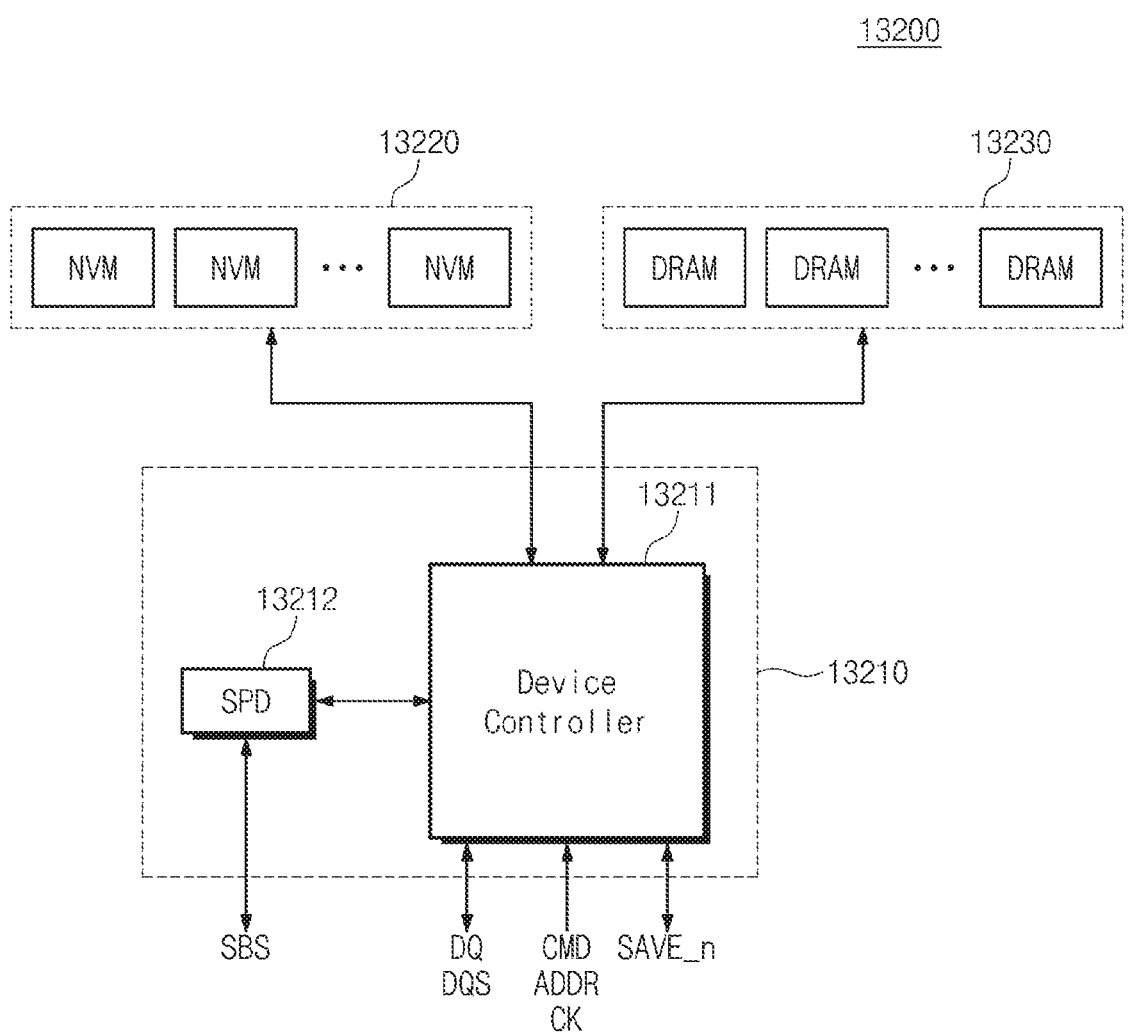
FIG. 29 is a block diagram schematically illustrating a nonvolatile memory module illustrated in FIG. 28.

FIG. 29 is a block diagram schematically illustrating a nonvolatile memory module illustrated in FIG. 28. Referring to FIG. 29, a nonvolatile memory module 13200 may include a control circuit 13210, a nonvolatile memory device 13220, and a RAM device 13230. In an embodiment, the nonvolatile memory device 13220 may include a plurality of nonvolatile memories, and the RAM device 13230 may include a plurality of DRAMs. In an embodiment, the nonvolatile memories may be used as storage of the computing system 13000 through the processor 13100. In an embodiment, each of the nonvolatile memories may include nonvolatile memory elements such as EEPROM, NAND flash memory, PRAM, resistive RAM (ReRAM), FRAM, STT-MRAM, and the like.

The DRAMs may be used as a main memory of the computing system 13000 through the processor 13100. In an embodiment, the RAM device 13230 may include random access memory elements such as DRAM, SRAM, SDRAM, PRAM, ReRAM, FRAM, MRAM, and the like.

The control circuit 13210 may include a device controller 13211 and an SPD 13212. The device controller 13211 may receive a command CMD, an address ADDR, and a clock CK from the processor 13100. The device controller 13211 may selectively store data, received through the data signal DQ and the data strobe signal DQS, in the nonvolatile memory device 13220 or the RAM device 13230 in response to signals received from the processor 13100. Alternatively, the device controller 13211 may selectively transfer data, stored in the nonvolatile memory device 13220 or the RAM device 13230, to the processor 13100 through the data signal DQ and the data strobe signal DQS in response to signals received from the processor 13100. The device controller 13211 may transfer a save signal SAVE_n to the processor 13100.

In an embodiment, the processor 13100 may selectively access the nonvolatile memory device 13220 or the RAM device 13230 through a command CMD, an address ADDR, or a separate signal or separate information. That is, the processor 13100 may selectively access the nonvolatile memory device 13220 or the RAM device 13230 included in the nonvolatile memory module 13200.

Figure 30:
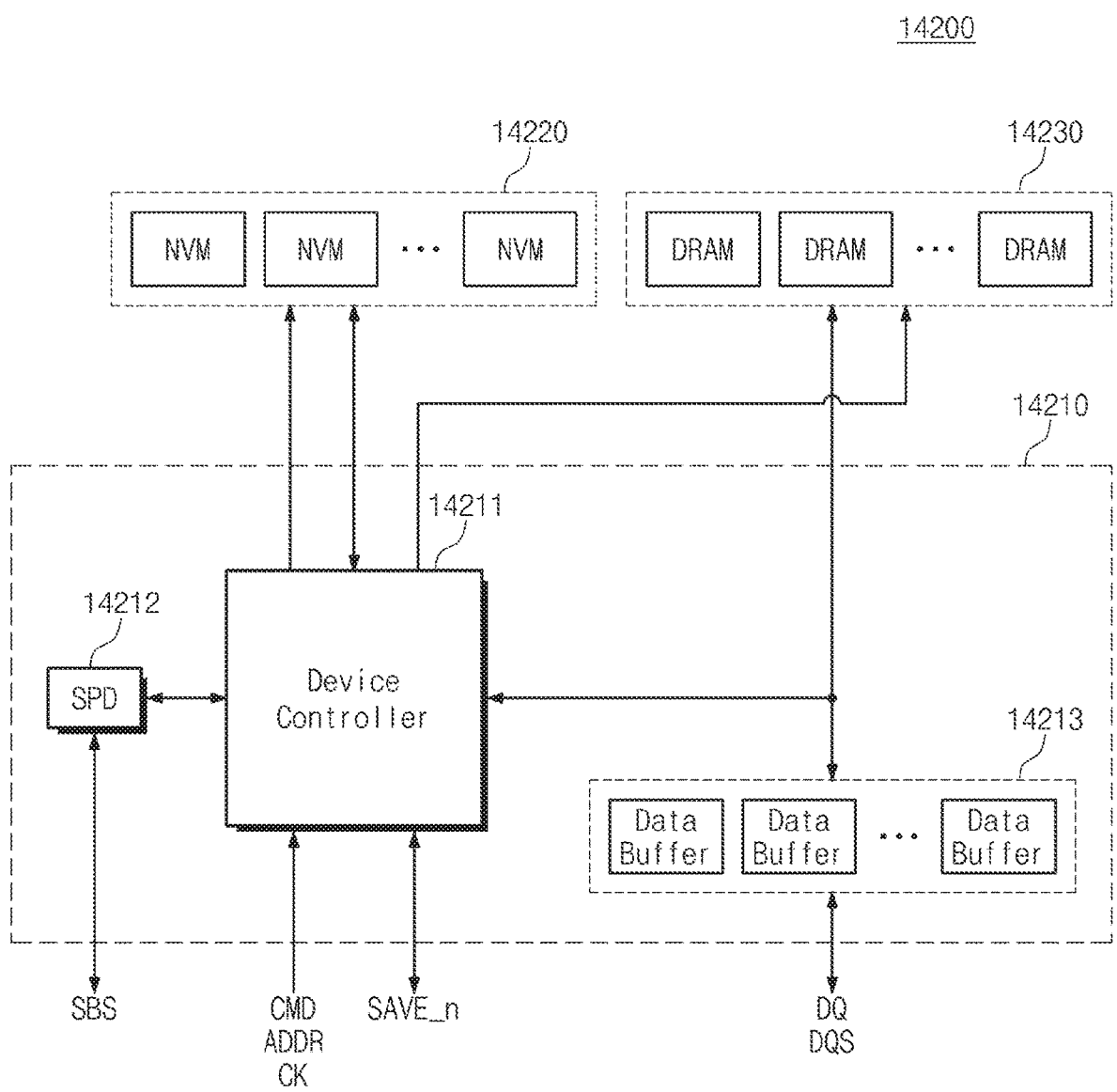
FIG. 30 is a block diagram schematically illustrating a nonvolatile memory module illustrated in FIG. 28.

FIG. 30 is a block diagram schematically illustrating a nonvolatile memory module illustrated in FIG. 28. In an embodiment, a nonvolatile memory module 14200 illustrated in FIG. 30 may be of the form of a dual in-line memory module (DIMM) and may be mounted on a DIMM socket so as to communicate with the processor 13100.

Referring to FIGS. 28 and 30, the nonvolatile memory module 14200 may include a control circuit 14210, a nonvolatile memory device 14220, and a RAM device 14230. The control circuit 14210 may include a device controller 14211, an SPD 14212, and a data buffer circuit 14213.

The device controller 14211 may receive a command CMD, an address ADDR, and a clock CK from the processor 13100. The device controller 14211 may control the nonvolatile memory device 14220 or the RAM device 14230 in response to received signals. For example, the processor 13100 may selectively access the nonvolatile memory device 14220 or the RAM device 14230. The device controller 14211 may control the nonvolatile memory device 14220 or the RAM device 14230 in response to control of the processor 13100. The device controller 14211 may transfer a save signal SAVE_n to the processor 13100.

The data buffer circuit 14213 may receive the data signal DQ and the data strobe signal DQS from the processor 13100 and may provide the received signals to the device controller 14211 and the RAM device 14230. Alternatively, the data buffer circuit 14213 may provide data, received from the device controller 14211 or the RAM device 14230, to the processor 13100 through the data signal DQ and the data strobe signal DQS.

In an embodiment, in the case where the processor 13100 stores data in the nonvolatile memory device 14220, data received through the data signal DQ and the data strobe signal DQS may be provided to the device controller 14211, and the device controller 14211 may process the received data and may provide the processed data to the nonvolatile memory device 14220. Alternatively, in the case where the processor 13100 reads data stored in the nonvolatile memory device 14220, the data buffer circuit 14213 may provide data provided from the device controller 14211 to the processor 13100 through the data signal DQ and the data strobe signal DQS. In the case where the processor 13100 stores data in the RAM device 14230, data provided to the data buffer circuit 14213 may be provided to the RAM device 14230, and the device controller 14211 may transfer the received command CMD, addresses ADDR, and clock CK to the RAM device 14230. When the processor 13100 reads data stored in the RAM device 14230, the device controller 14211 may transfer the received command CMD, addresses ADDR, and clock CK to the RAM device 14230 and the RAM device 14230 may provide data to the data buffer circuit 14213 in response to the transferred signals. At this time, the data buffer circuit 14213 may provide data to the processor 13100 through the data signal DQ and the data strobe signal DQS. In an embodiment, the device controller 14211 may improve the performance based on an operating method described with reference to FIGS. 14 to 24.

Figure 31:
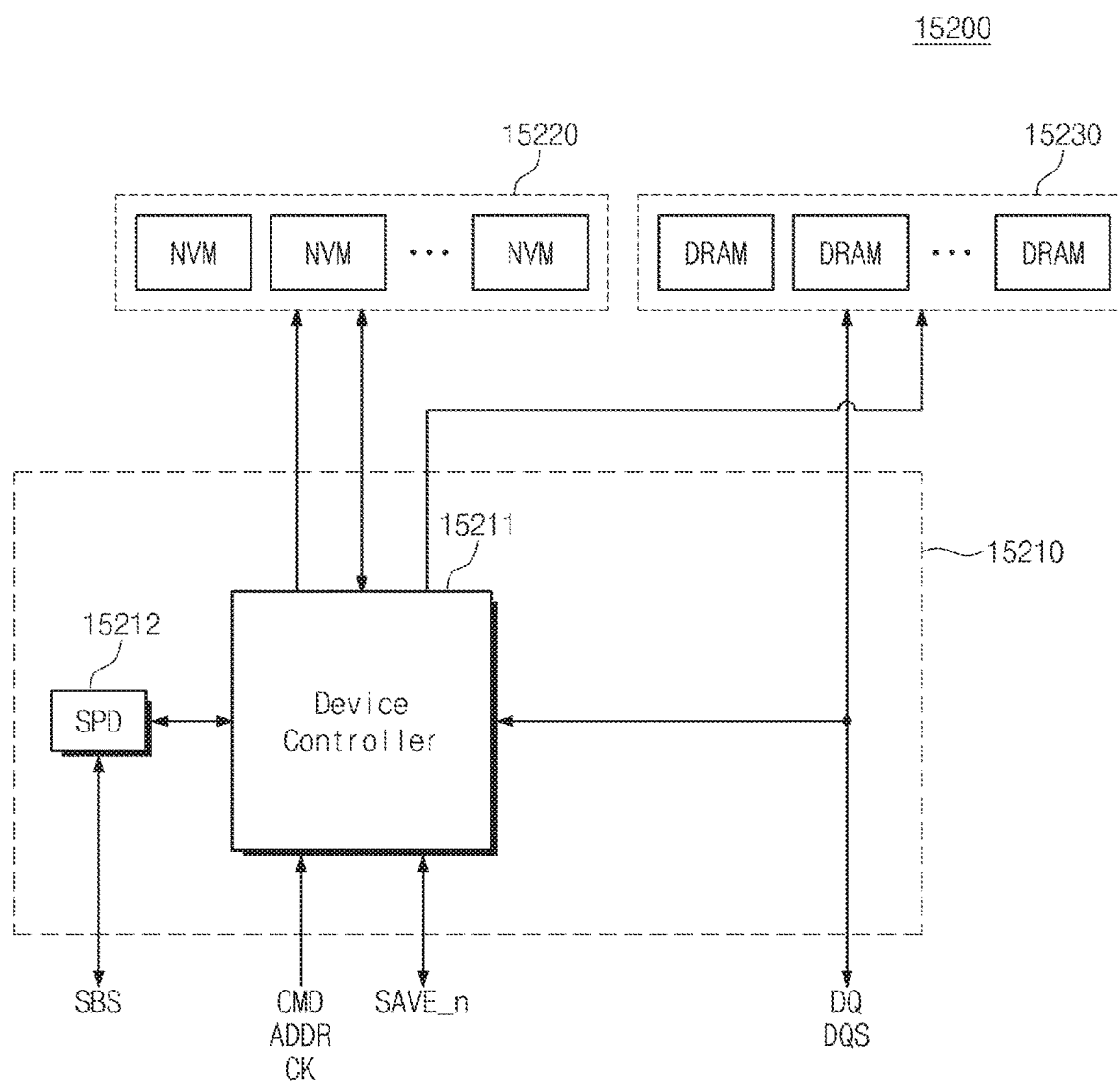
FIG. 31 is a block diagram schematically illustrating a nonvolatile memory module illustrated in FIG. 28.

FIG. 31 is a block diagram schematically illustrating a nonvolatile memory module illustrated in FIG. 28. Referring to FIG. 31, a nonvolatile memory module 15200 may include a control circuit 15210, a nonvolatile memory device 15220, and a RAM device 15230. The control circuit 15210 may include a device controller 15211 and an SPD 15212. The nonvolatile memory module 15200 may operate to be similar to the nonvolatile memory module 14200 of FIG. 30. However, the nonvolatile memory module 15200 may not include the data buffer circuit 14213 unlike the nonvolatile memory module 14200 of FIG. 30. That is, the nonvolatile memory module 15200 of FIG. 31 may directly provide data, received from the processor 13100 through the data signal DQ and the data strobe signal DQS, to the device controller 15211 or the RAM device 15230. Alternatively, data from the device controller 15211 of the nonvolatile memory module 15200 or data from the RAM device 15230 may be directly provided to the processor 13100 through the data signal DQ and the data strobe signal DQS. The device controller 15211 may transfer a save signal SAVE_n to the processor 13100.

In an embodiment, the nonvolatile memory module 14200 of FIG. 30 may be a memory module of an LRDIMM shape, and the nonvolatile memory module 15200 of FIG. 31 may be a memory module of an RDIMM shape.

In an embodiment, the device controller 15211 may accumulate sub-data (not illustrated) based on an operating method described with reference to FIGS. 14 to 31 and may program the accumulated result in the nonvolatile memory device 15220 based on a command of the processor 13100.

Figure 32:
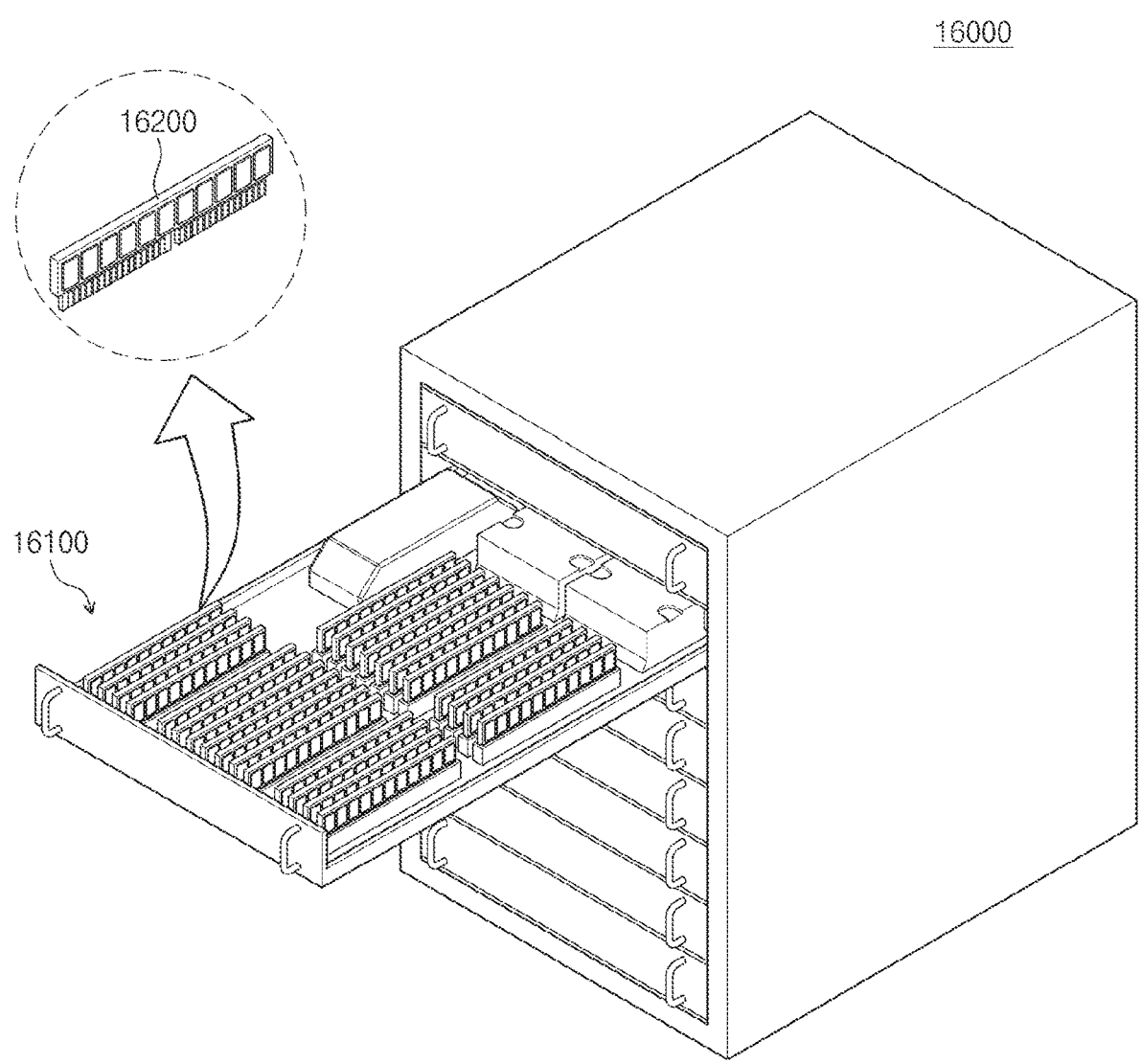
FIG. 32 is a diagram schematically illustrating a server system to which a nonvolatile memory system according to an embodiment of the disclosure is applied.

FIG. 32 is a diagram schematically illustrating a server system to which a nonvolatile memory system according to an embodiment of the disclosure is applied. Referring to FIG. 32, a server system 16000 may include a plurality of server racks 16100. Each of the server racks 16100 may include a plurality of nonvolatile memory modules 16200. The nonvolatile memory modules 16200 may be directly connected with processors respectively included in the server racks 16100. For example, the nonvolatile memory modules 16200 may have the form of a dual in-line memory module and may be mounted on a DIMM socket electrically connected with a processor so as to communicate with the processor. In an embodiment, the nonvolatile memory modules 16200 may be used as storage of the server system 16000. In an embodiment, the device controller 16200 may perform a PVT compensation operation based on an operating method described with reference to FIGS. 14 to 24.

Figure 33:
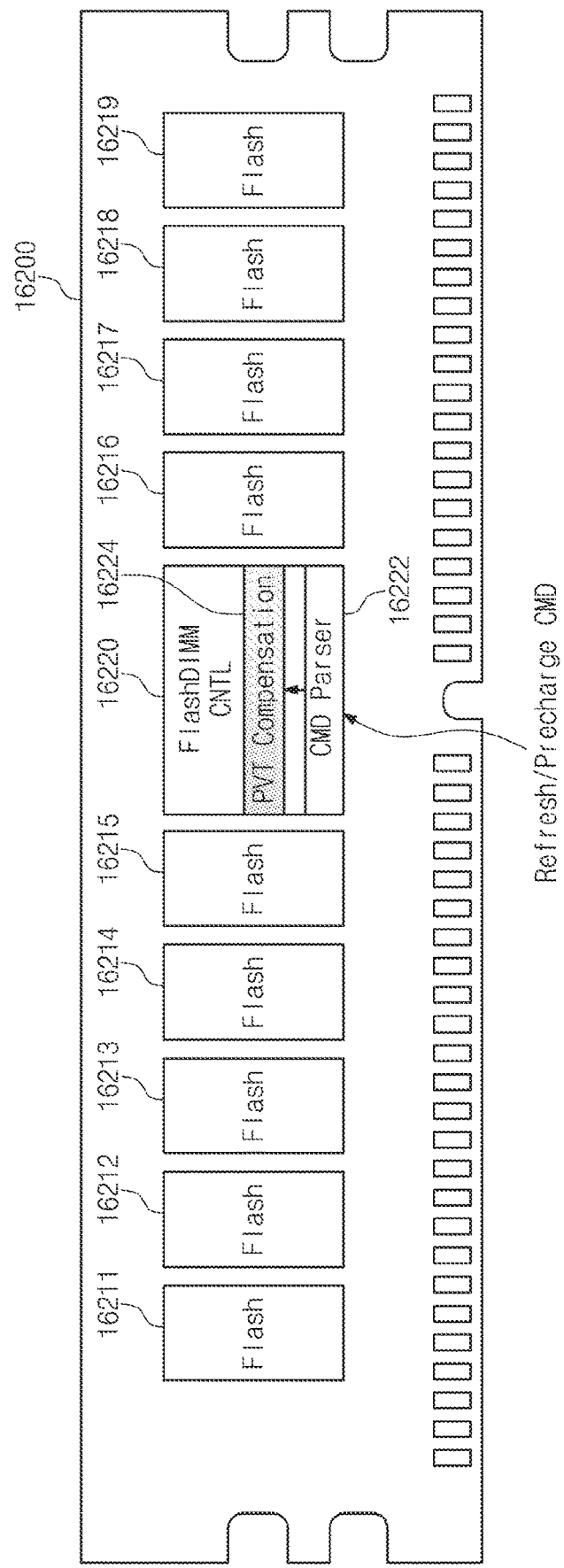
FIG. 33 is a diagram schematically illustrating a FlashDIMM according to an embodiment of the disclosure.

FIG. 33 is a diagram schematically illustrating a FlashDIMM 16200 according to an embodiment of the disclosure. Referring to FIG. 33, a FlashDIMM 16200 may be inserted in a DIMM slot in appearance and may include a plurality of flash memory devices 16211 to 16219 and a FlashDIMM controller 16220 controlling the flash memory devices 16211 to 16219. The FlashDIMM controller 16220 may include a command parser 16222 parsing a command and a PVT compensation unit 16224. When an input of a refresh/precharge command is directed by the command parser 16222, the PVT compensation unit 16224 may perform at least one PVT compensation operation in the FlashDIMM 16220.

A nonvolatile memory and/or a device controller according to the disclosure may be packaged according to any of a variety of different packaging technologies. Examples of such packaging technologies may include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

Meanwhile, an embodiment of the disclosure is exemplified by a nonvolatile memory module that performs a PVT compensation operation in response to a refresh command/precharge command. However, the scope and spirit of the disclosure may not be limited thereto. The nonvolatile memory module of the disclosure should be understood as performing various operations (ZQ calibration, leveling, skew adjustment, and the like) for improving reliability of data/clock, as well as the PVT compensation operation in response to the refresh command/precharge command.

As described above, a nonvolatile memory module according to an embodiment of the disclosure may include a plurality of nonvolatile memories and a device controller controlling the nonvolatile memories. The device controller may include a RAM inputting and outputting data, a command parser receiving and recognizing a command, and a PVT compensation unit performing a PVT compensation operation in response to a refresh command or a precharge command recognized by the command parser.

Each of the nonvolatile memories may be a vertical NAND flash memory (VNAND). The RAM may include a write data area storing data to be written in the nonvolatile memories, a command area receiving a nonvolatile memory command for controlling the nonvolatile memories, a status area storing information indicating a state of the RAM, and a read data area storing data read from the nonvolatile memories. The RAM may be a static random access memory (SRAM). The nonvolatile memory module may further include a buffer memory temporarily storing input/output data. The device controller may further include a buffer memory and a memory controller controlling the nonvolatile memories, and data inputted/outputted between the RAM and the memory controller may be of a packet form. The nonvolatile memory module may communicate with an external device using a double data rate (DDR) interface, and the RAM and the memory controller may communicate with each other using an advance extensible interface (AXI) interface.

The PVT compensation unit may include host interface layer firmware, outputting at least one control signal for performing a PVT compensation operation in response to a refresh command or a precharge command, and a core driving the host interface layer firmware. The nonvolatile memory module may further include a buffer driver connected to at least one of a data pad, a data strobe signal pad and a ZQ pad, and the PVT compensation unit may adjust a slew or a strength in response to the refresh command or the precharge command.

A nonvolatile memory module according to an embodiment of the disclosure may further include a clock buffer generating an internal clock based on a received clock and a duty cycle correction unit controlling a duty cycle of the clock buffer. The PVT compensation unit may control the duty cycle correction unit in response to the refresh command or the precharge command. The PVT compensation unit may determine a delay of the data signal or the data strobe signal by adjusting delay-tap delay cells in response to the refresh command or the precharge command. The nonvolatile memory module may further include data buffers buffering data of the RAM and exchanging data with an external device. The PVT compensation unit may perform a PVT compensation operation of each of the data buffers in response to the refresh command or the precharge command. The data buffers may include first data buffers connected to the device controller by at least one first control line and second data buffers connected to the device controller by at least one second control line.

A computing system according to an embodiment of the disclosure may include a processor, at least one dual in-line memory module connected to the processor through a first DDR slot, and at least one nonvolatile memory module connected to the processor through a second DDR slot. The at least one nonvolatile memory module may perform a PVT compensation operation in response to a refresh command or a precharge command received from the processor.

The at least one nonvolatile memory module may include at least one buffer memory, a plurality of nonvolatile memories, and a device controller controlling the at least one buffer memory and the nonvolatile memories. The device controller may include a physical layer, receiving and outputting data through a DDR interface from and to the processor and performing a PVT compensation operation, and a memory controller receiving and outputting data of the physical layer through the memory interface. The at least one nonvolatile memory module may include at least one buffer memory, a plurality of nonvolatile memories, and a device controller controlling the at least one buffer memory and the nonvolatile memories. The device controller may include a physical layer, receiving and outputting data from and to the processor through the DDR interface and performing a PVT compensation operation, data buffers buffering data received from the processor to transmit the buffered data to the physical layer or buffering data read from the physical layer to output the buffered read data to the processor, and a memory controller receiving and outputting data of the physical layer through the memory interface.

The at least one nonvolatile memory module may include at least one buffer memory, a plurality of volatile memories receiving and outputting data from and to the processor through the DDR interface, and a device controller controlling the at least one buffer memory and the nonvolatile memories. The device controller may include a physical layer receiving and outputting data from and to the processor through the DDR interface and performing a PVT compensation operation and a memory controller receiving and outputting data of the physical layer through the memory interface.

The processor and the at least one dual in-line memory module may communicate with each other through a DDR4 interface, and the processor and the at least one nonvolatile memory module may communicate with each other through the DDR4 interface.

A PVT compensation method of a nonvolatile memory module according to an embodiment of the disclosure may include receiving a refresh command or a precharge command and performing a PVT compensation operation in response to the refresh command or the precharge command.

The PVT compensation operation may be performed by adjusting input/output control signals internally.

Figure 34:
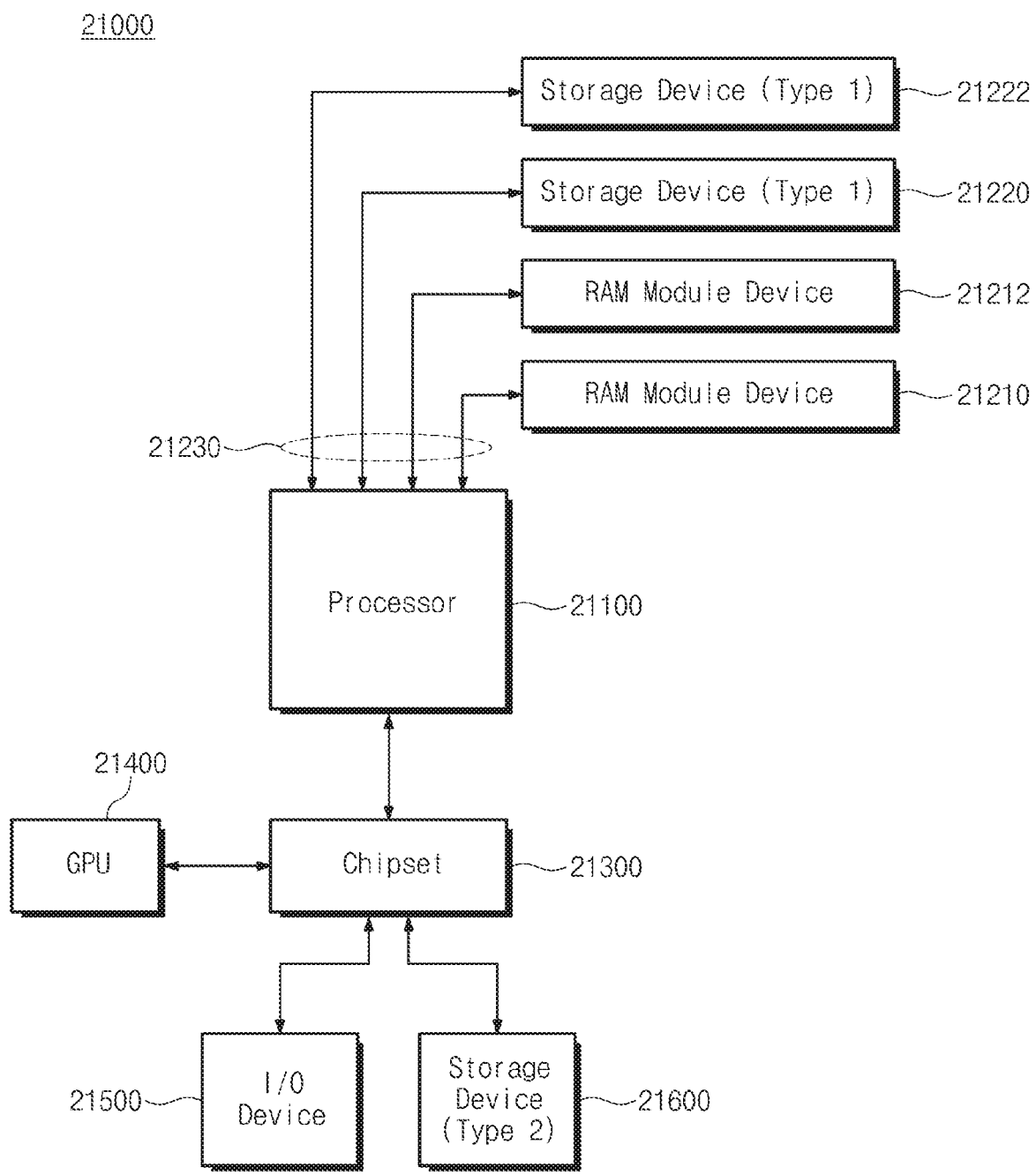
FIG. 34 is a block diagram schematically illustrating a computing system including a storage device according to an embodiment of the disclosure.

FIG. 34 is a block diagram schematically illustrating a computing system including a storage device according to an embodiment of the disclosure. Referring to FIG. 34, a computing system 21000 may include a processor 21100, one or more RAM module devices 21210 and 21212, one or more first-type storage devices 21220 and 21222, a chipset 21300, a GPU 21400, an input/output device 21500, and a second-type storage device 21600.

For example, the computing system 21000 may include at least one of, but not limited to, various computing devices such as a personal computer, a notebook, a tablet, a workstation, a blade server, network storage, and the like.

The processor 21100 may perform various operations of the computing system 21000. The processor 21100 may perform various arithmetic and/or logic operations for operating the computing system 21000. The processor 21100 may include one or more processor cores which are configured to perform operations. For example, the processor 21100 may include at least one of a CPU, an application processor (AP), a dedicated processor, or an application specific integrated circuit, based on a type of the computing system 21000.

The RAM module devices 21210 and 21212 may temporarily store data which is processed or to be processed by the application processor 21100. The RAM module devices 21210 and 21212 may be used as an operation memory, a working memory, or a buffer memory of the computing system 21000. For example, each of the RAM module devices 21210 and 21212 may include a volatile memory such as a static random access memory (SRAM), a dynamic RAM (DRAM), a synchronous DRAM (SDRAM), or a nonvolatile memory such as a phase-change RAM (PRAM), a magneto-resistive RAM (MRAM), a resistive RAM (ReRAM), or a ferroelectric RAM (FRAM).

The first-type storage devices 21220 and 21222 may store data regardless of whether power is supplied. The first-type storage devices 21220 and 21222 may store data permanently or semi-permanently without power supply. For example, each of the first-type storage devices 21220 and 21222 may include at least one of nonvolatile memories such as a flash memory, a PRAM, an MRAM, an ReRAM, and an FRAM.

The first-type storage devices 21220 and 21222 may be implemented based on embodiments of the disclosure. Embodiments of the first-type storage devices 21220 and 21222 will be described in detail with reference to FIGS. 35 to 50.

The RAM module devices 21210 and 21212 and the first-type storage devices 21220 and 21222 may be connected with the processor 21100 through a bus 21230 which operates at a high speed. For example, the bus 21230 may support a device implemented in the form of a DIMM and may utilize an interface protocol operating in a DDR manner. In the case where a North bridge chipset is embedded in the processor 21100, the RAM module devices 21210 and 21212 and the first-type storage devices 21220 and 21222 may directly communicate with the processor 21100 through the bus 21230.

In FIG. 34, an embodiment of the disclosure is exemplified in which the computing system 21000 includes two RAM module devices 21210 and 21212 and two first-type storage devices 21220 and 21222. However, the number of RAM module devices and the number of first-type storage devices may be variously modified or changed according to a configuration of the computing system 21000 and a configuration of the bus 21230.

The chipset 21300 may connect other components of the computing system 21000 to the processor 21100. For example, the chipset 21300 may connect the GPU 21400, the input/output device 21500, and the second-type storage device 21600 to the processor 21100. For example, the chipset 21300 may include a South bridge chipset.

For example, the GPU 21400 may perform an operation for processing image data. To this end, the GPU 21400 may include one or more cores and one or more memories. The GPU 21400 may provide an operation result to the processor 21100 through the chipset 21300 and may receive an operation result of the processor 21100. The GPU 21400 may allow a display device to display an image based on an operation result.

The input/output device 21500 may provide information from a user of the computing system 21000 to the processor 21100 through the chipset 21300. Alternatively, the input/output device 21500 may provide a service to a user of the computing system 21000 based on data provided from the processor 21100 through the chipset 21300. For example, the input/output device 21500 may include input interfaces such as a keyboard, a key pad, a button, a touch panel, a touch screen, a touch pad, a touch ball, a camera, a microphone, a gyro scope sensor, a vibration sensor, and the like. Furthermore, the input/output device 21500 may include output interfaces such as a speaker, a motor, and the like.

The second-type storage device 21600 may store data regardless of whether power is supplied. For example, the second-type storage device 21600 may include a storage medium such as a solid state drive (SSD), a hard disk drive (HDD), and the like.

Unlike the first-type storage devices 21220 and 21222, the second-type storage device 21600 may be connected with the processor 21100 through a bus 21230 which operates at a low speed. For example, in the case where the second-type storage device 21600 includes the SSD, the bus operating at a low speed may lower the performance thereof. By including a processor and a high-speed semiconductor nonvolatile memory, the SSD may have high operating performance. However, in the case where the SSD is connected to a bus operating at a low speed, it may be difficult to maximize the performance of the SSD.

According to an embodiment of the disclosure, the first-type storage devices 21220 and 21222 which are connected with the processor 21100 through the high-speed bus 21230 may have high operating performance That is, a storage device including a semiconductor nonvolatile memory such as SSD may have higher performance when implemented with the first-type solid state drives 21220 and 21222.

Below, there will be described a configuration and an operation of the first-type storage devices 21220 and 21222 which are connected with the processor 21100 through the high-speed bus 21230. Furthermore, a configuration, an operation, and a test process of a device controller which is configured to control the first-type storage devices 21220 and 21222 respectively will be described.

A storage device to be described below may be a first-type storage device connected with the processor 21100 through the bus 21230 operating at a high speed. It may be assumed that the bus 21230 operating at a high speed utilizes an interface protocol defined based on the DIMM specification. However, the assumption is to help understanding of the disclosure, and the disclosure is not limited thereto. Here, the DIMM specification may mean the specification associated with a configuration and an operation of a device which is implemented in the form of DIMM.

Figure 35:
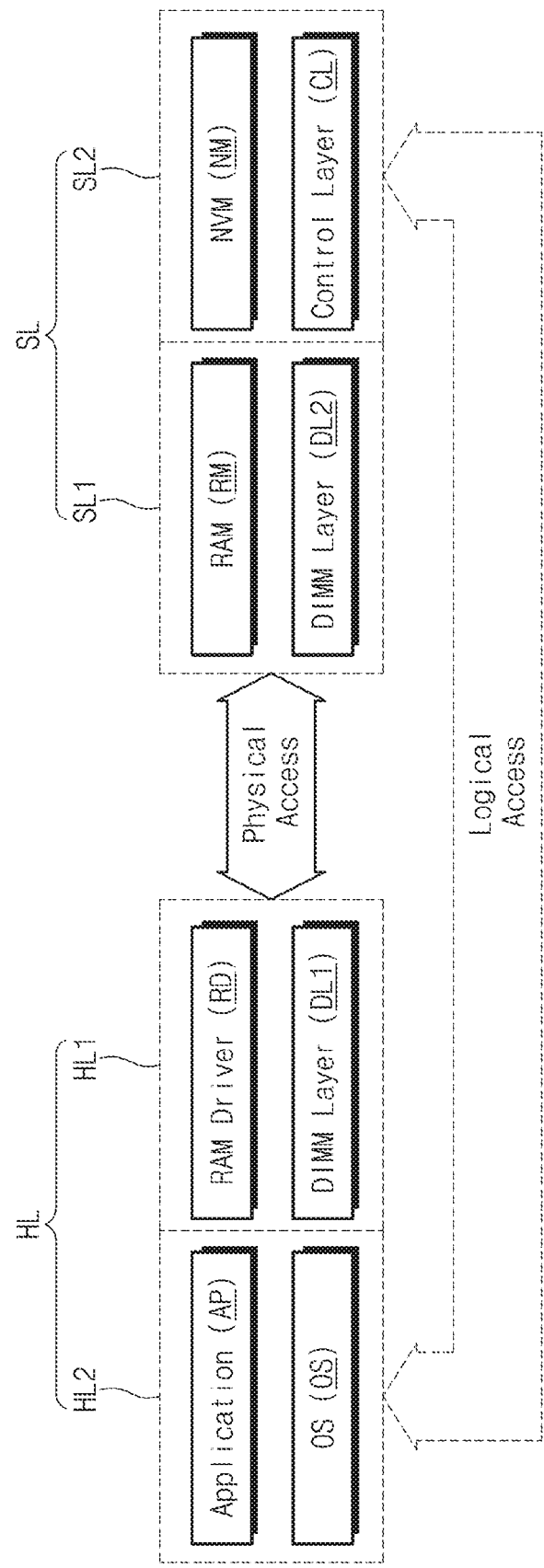
FIG. 35 is a conceptual diagram of a software layer of a computing system of FIG. 34.

FIG. 35 is a conceptual diagram of a software layer of a computing system of FIG. 34. In FIG. 34, software associated with a host layer (HL) may be driven on the processor 21100 of FIG. 34. Furthermore, software or firmware associated with a storage layer may be driven on a storage device (i.e., a first-type storage device 21220 or 21222) of FIG. 34.

The host layer HL may include a first host layer HL1 and a second host layer HL2. The storage layer SL may include a first storage layer SL1 and a second storage layer SL2. The first host layer HL1 and the second storage layer SL2 may be respectively provided as a physical layer of the host layer HL and a physical layer of the storage layer SL.

For example, the first host layer HL1 may include a DIMM layer DL1, and the first host layer SL1 may include a DIMM layer DL2. In this embodiment, a physical access between the host layer HL and the storage layer SL may be performed through the DIMM layers DL1 and DL2, based on a physical address. For example, the host layer HL and the storage layer SL may communicate with each other through the DIMM layers DL1 and DL2, based on the interface protocol which is defined according to the DIMM specification.

The first storage layer SL1 may include a RAM, which will be described in more detail with reference to FIG. 41. The second storage layer SL2 may include a nonvolatile memory NM. The nonvolatile memory NM may store data provided from the host layer HL permanently or semi-permanently, under control of a control layer CL of the second storage layer SL2. Furthermore, management operations such as garbage collection, wear leveling, and the like associated with the nonvolatile memory NM may be performed according to control of the control layer CL.

In some embodiments of the disclosure, the DIMM layer DL2 may be provided with a RAM command and a RAM address, which are used to control the RAM RM, from the host layer HL. The RAM RM may temporarily store a storage command and a storage address, which are used to control the nonvolatile memory NM, based on the RAM command and the RAM address. In addition, the RAM RM may temporarily store write data to be stored in the nonvolatile memory NM and/or read data read therefrom. This embodiment will be described in more detail with reference to FIGS. 41 to 44.

The first host layer HL1 may include a RAM driver RD for interfacing with the RAM RM. The second host layer HL2 may include an operating system (OS) for an operation of the host layer HL. The OS may control and manage an overall operation of the computing system 21000. For example, the OS may process various operations such as program execution, an access to a file, driving of applications, and control of a storage layer. The second host layer HL2 may execute one or more applications (AP) to provide a user of the host layer HL with various services.

The host layer HL may provide write data to be stored in the nonvolatile memory NM to the storage layer SL, based on an operation of the OS and/or application. Alternatively, the storage layer SL may provide the host layer HL with read data, which is used for an operation of the OS and/or application, from among data stored in the nonvolatile memory NM. Each of the second host layer HL2 and the second storage layer SL2 may logically recognize the counterpart based on a logical address.

Figure 36:
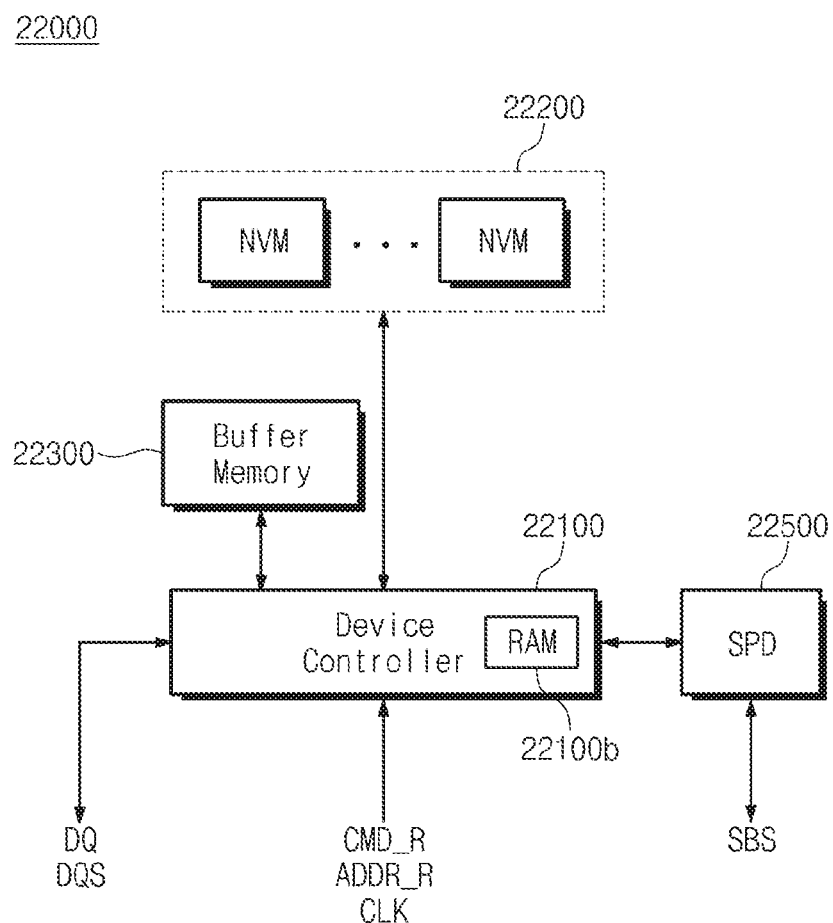
FIG. 36 is a block diagram schematically illustrating a storage device of FIG. 34, according to an embodiment of the disclosure.

FIG. 36 is a block diagram schematically illustrating a storage device of FIG. 34, according to an embodiment of the disclosure. At least one of first-type storage devices 21220 and 21222 of FIG. 34 may include a storage device 22000 of FIG. 36. For example, the storage device 22000 may be a module which is implemented in the form of LRDIMM. In this embodiment, the storage device 22000 may be connected to a DIMM socket of the computing system 21000 of FIG. 34 and may communicate with the processor of FIG. 34 based on the interface protocol defined according to the DIMM specification.

In an embodiment of FIG. 36, the storage device 22000 may include a device controller 22100, one or more nonvolatile memories 22200, a buffer memory 22300, and an SPD chip 22500. The device controller 22100 may control and manage an overall operation of the computing system 22000.

Under control of the device controller 22100, the nonvolatile memories 22200 may store data regardless of whether power is supplied. For example, the nonvolatile memories 22200 may be implemented with a chip or package. For example, each of the nonvolatile memories 22200 may be implemented with a chip, package, device, or module. Under control of the device controller 22100, the buffer memory 22300 may buffer write data to be stored in the nonvolatile memories 22200 or read data read therefrom.

The device controller 22100 may receive a RAM command CMD_R, a RAM address ADDR_R, and a clock signal CLK from the processor 21100 through a control signal line. The RAM command CMD_R and the RAM address ADDR_R may be used to control a read/write operation associated with a RAM 22100b. The device controller 22100 may transact a data signal DQ and a data strobe signal DQS with the processor 21100 through a data signal line independent of a control signal line.

According to an embodiment of the disclosure, the data signal DQ may include a storage command and a storage address which are used to control a read/write operation associated with the nonvolatile memories 22200. Furthermore, the data signal DQ may include write data to be stored in the nonvolatile memories 22200 or read data read therefrom. In some cases, the data signal DQ may include status information associated with write data and read data.

The RAM 22100b may temporarily store a storage command and a storage address based on the RAM command and the RAM address. Furthermore, the RAM 22100b may temporarily store write data and read data based on the RAM command and the RAM address. Based on the storage command and the storage address stored in the RAM 22100b, the device controller 22100 may control the nonvolatile memories 22200 such that write data is stored in the nonvolatile memories 22200 or read data is read from the nonvolatile memories 22200.

The device controller 22100, the RAM 22100b, the nonvolatile memories 22200, and the buffer memory 22300 may be the same in operation and configuration to the corresponding components described with reference to FIGS. 41 to 49. In particular, before the storage device 22000 is manufactured, the device controller 22100 may be tested according to a process to be described with reference to FIGS. 45 to 49. Accordingly, it may be possible to determine a faulty device controller 22100 in advance.

The SPD chip 22500 may store information associated with a characteristic of the storage device 22000. In an embodiment, the SPD chip 22500 may include initial information or device information such as a module type, a module configuration, a storage capacity, line arrangement, an execution environment, and the like of the storage device 22000. For example, the SPD chip 22500 may include a programmable read only memory, for example, an EEPROM.

When the computing system 21000 including the storage device 22000 is booted up, the processor 21100 of the computing system 21000 may read information stored in the SPD chip 22500. The processor 21100 may recognize and operate the storage device 22000 based on read information. According to an embodiment of the disclosure, the processor 21100 may recognize and operate the storage device 22000 as a storage medium based on read information.

In an embodiment, the SPD chip 22500 may communicate with the processor 21100 based on the side-band interface protocol. In an embodiment, the SPD chip 22500 and the processor 21100 may transact a side-band signal SBS through a communication channel supporting the side-band interface protocol. Furthermore, the SPD chip 22500 may communicate with the device controller 22100 based on the side-band interface protocol. For example, the side-band interface protocol may support a physical layer defined based on the I2C or UART specification.

Figure 37:
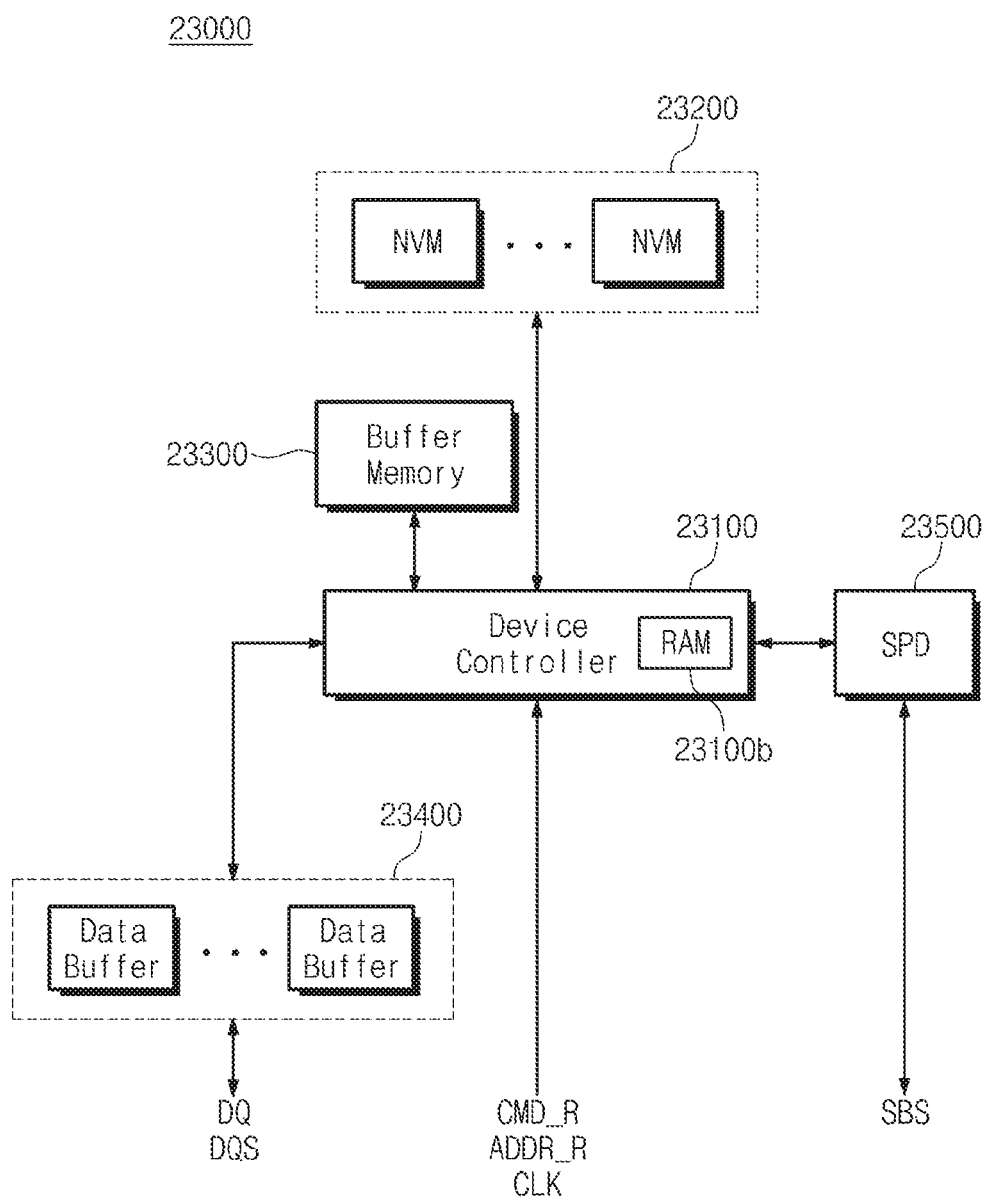
FIG. 37 is a block diagram schematically illustrating a storage device of FIG. 34, according to an embodiment of the disclosure.

FIG. 37 is a block diagram schematically illustrating a storage device of FIG. 34, according to an embodiment of the disclosure. At least one of first-type storage devices 21220 and 21222 of FIG. 34 may include a storage device 23000 of FIG. 37. For example, the storage device 23000 may be a module which is implemented in the form of RDIMM. In this embodiment, the storage device 23000 may be connected to a DIMM socket of the computing system 21000 of FIG. 34 and may communicate with the protocol 21100 of FIG. 37 based on the interface protocol which is defined according to the DIMM specification.

In an embodiment of FIG. 37, the storage device 23000 may include a device controller 23100, one or more nonvolatile memories 23200, a buffer memory 23300, a data buffer circuit 23400, and an SPD chip 23500. The device controller 23100, a RAM 23100b, the nonvolatile memories 23200, and the buffer memory 23300 may be the same in operation and configuration as the components described with reference to FIGS. 41 to 49. In particular, before the storage device 23000 is manufactured, the device controller 23100 may be tested according to a process to be described with reference to FIGS. 45 to 49. Accordingly, it may be possible to determine a faulty device controller 23100 in advance.

The device controller 23100, the RAM 23100b, the nonvolatile memories 23200, the buffer memory 23300, and the SPD chip 23500 may be the same in operation and configuration as or similar to those described with reference to FIG. 36. For descriptive convenience, a duplicate description about the device controller 23100, the RAM 23100b, the nonvolatile memories 23200, the buffer memory 23300, and the SPD chip 23500 is omitted.

The data buffer circuit 23400 may transact the data signal DQ and the data strobe signal DQS with the processor 21100. The data buffer circuit 23400 may provide a received signal to the device controller 23100 or may receive a to-be-transmitted signal from the device controller 23100. That is, the data buffer circuit 23400 may buffer data between the processor 21100 and the device controller 23100. For example, the data buffer circuit 23400 may be used to synchronize timing of a data transfer.

For example, the data buffer circuit 23400 may include one or more data buffers. Each of the data buffers may receive or output the data signal DQ and the data strobe signal DQS through a corresponding data signal line. The data buffers may operate under control of the device controller 23100.

Figure 38:
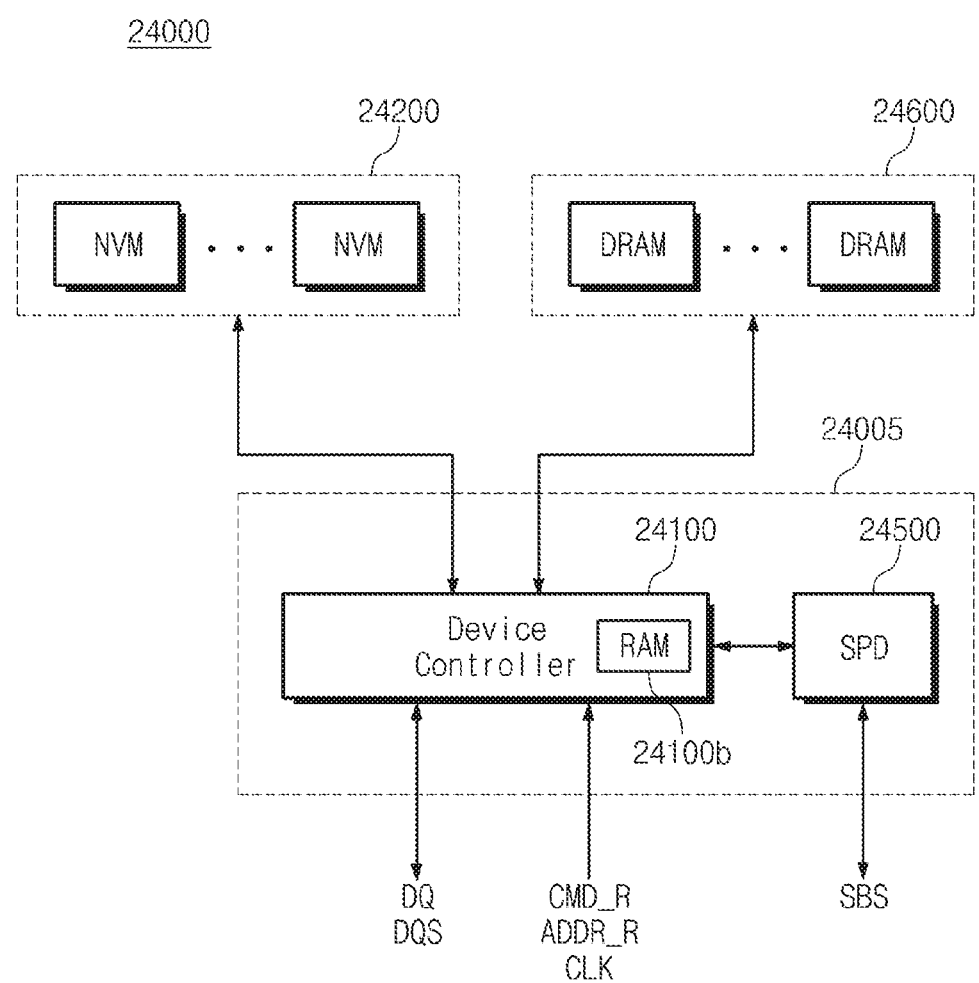
FIG. 38 is a block diagram schematically illustrating a storage device of FIG. 34, according to an embodiment of the disclosure.

FIG. 38 is a block diagram schematically illustrating a storage device of FIG. 34, according to an embodiment of the disclosure. At least one of first-type storage devices 21220 and 21222 of FIG. 34 may include a storage device 24000 of FIG. 38. In this embodiment, the storage device 24000 may be connected to a DIMM socket of the computing system 21000 of FIG. 34 and may communicate with the processor 21100 of FIG. 34 according to the interface protocol which is defined based on the DIMM specification.

In an embodiment of FIG. 38, the storage device 24000 may include a device controller 24005, one or more nonvolatile memories 24200, and one or more DRAMs 24600. The nonvolatile memories 24200 may be used as a storage medium of the computing system 21000. The DRAMs 24600 may be used as a main memory of the computing system 21000. That is, the storage device 24000 may perform a function of a main memory together with a function of a storage medium.

For example, the nonvolatile memories 24200 may include at least one of EEPROM, flash memory, PRAM, MRAM, ReRAM, or FRAM. In FIG. 38, the storage device 24000 is illustrated as including DRAMs 24600. However, in some embodiments, the DRAMs 24600 may be replaced with other memories capable of being randomly accessed such as SRAM, SDRM, PRAM, MRAM, ReRAM, and FRAM.

The control circuit 24005 may include a device controller 24100 and an SPD chip 24500. The device controller 24100 and the nonvolatile memories 24200 may be the same in operation and configuration as the corresponding components described with reference to FIGS. 41 to 49. In particular, before the storage device 24000 is manufactured, the device controller 24100 may be tested according to a process to be described with reference to FIGS. 45 to 49. Accordingly, it may be possible to determine a faulty device controller 24100 in advance.

The device controller 24100, a RAM 24100b, the nonvolatile memories 24200, and the SPD chip 24500 may be the same in operation and configuration as or similar to the corresponding components described with reference to FIG. 36. For descriptive convenience, a duplicate description about the device controller 24100, the RAM 24100b, the nonvolatile memories 24200, and the SPD chip 24500 is omitted.

The device controller 24100 may selectively provide data included in the data signal DQ and the data strobe signal DQS to the nonvolatile memory device 24200 or the DRAMs 24600 in response to a signal received from the processor 21100. Alternatively, the device controller 24100 may selectively output data, stored in the nonvolatile memory device 24200 or the DRAMs 24600, as the data signal DQ and the data strobe signal DQS in response to signals received from the processor 21100. For example, the processor 21100 may selectively access the nonvolatile memories 24200 or the DRAMs 24600 based on at least one of a RAM command CMD_R, a RAM address ADDR_R, a clock signal CLK, a storage command, a storage address, and a separate signal.

Figure 39:
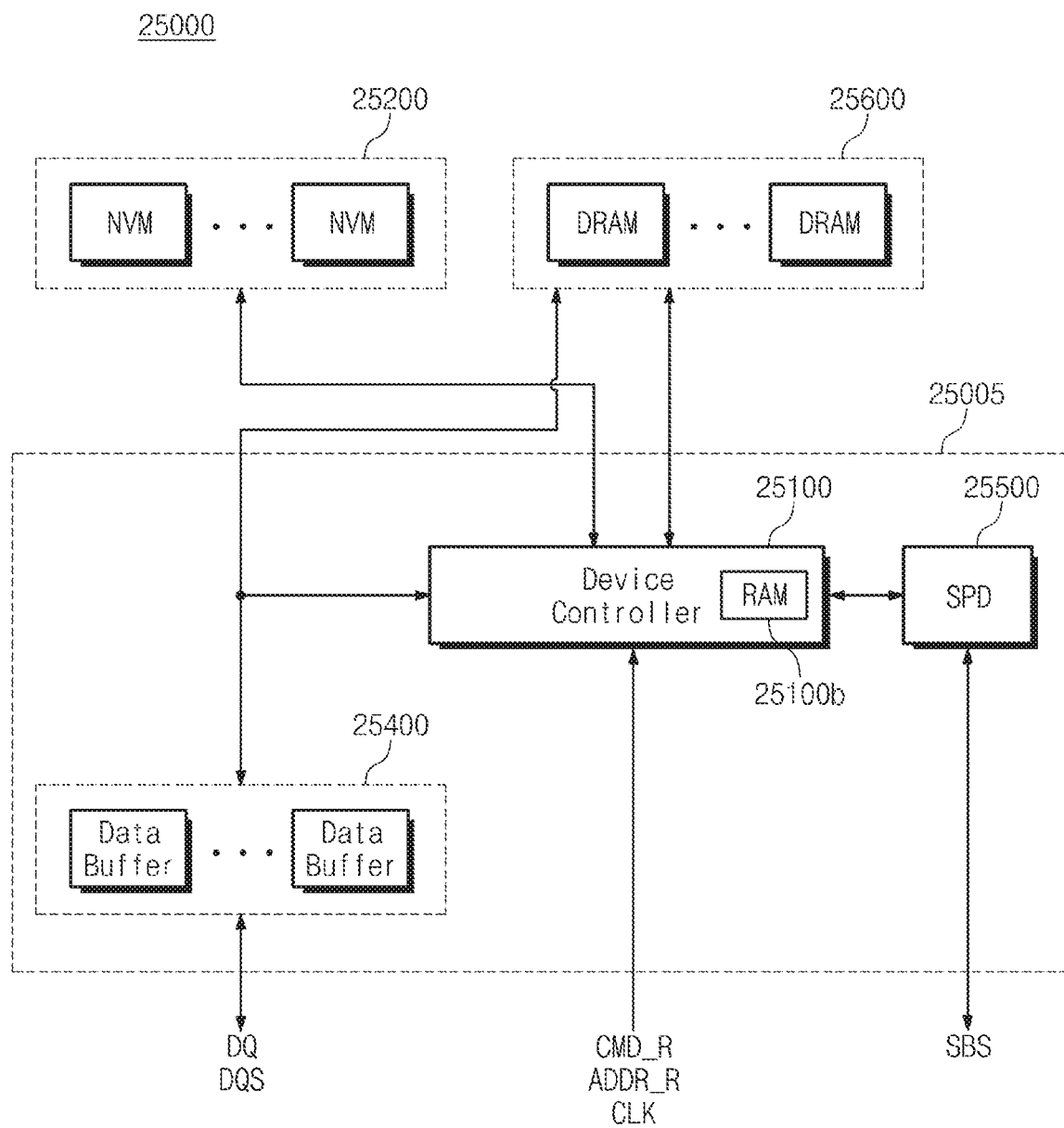
FIG. 39 is a block diagram schematically illustrating a storage device of FIG. 34, according to an embodiment of the disclosure.

FIG. 39 is a block diagram schematically illustrating a storage device of FIG. 34, according to an embodiment of the disclosure. At least one of first-type storage devices 21220 and 21222 of FIG. 34 may include a storage device 25000 of FIG. 39. In this embodiment, the storage device 25000 may be connected to a DIMM socket of the computing system 21000 of FIG. 34 and may communicate with the processor 21100 of FIG. 34 according to the interface protocol which is defined based on the DIMM specification.

In an embodiment of FIG. 39, the storage device 25000 may include a device controller 25005, one or more nonvolatile memories 25200, and one or more DRAMs 25600. The nonvolatile memories 25200 may be used as a storage medium of the computing system 21000. The DRAMs 25600 may be used as a main memory of the computing system 21000. The nonvolatile memories 25200 and the DRAMs 25600 may be configured and operate to be the same in configuration and operation as or similar to the nonvolatile memories 24200 and the DRAMs 24600 of FIG. 38. For descriptive convenience, a duplicate description about the nonvolatile memories 25200 and the DRAMs 25600 is omitted.

The control circuit 25005 may include a device controller 25100, a data buffer circuit 25400, and an SPD chip 25500. The device controller 25100 and the nonvolatile memories 25200 may be the same in operation and configuration as the corresponding components described with reference to FIGS. 41 to 49. In particular, before the storage device 25000 is manufactured, the device controller 25100 may be tested according to a process to be described with reference to FIGS. 45 to 49. Accordingly, it may be possible to determine a faulty device controller 25100 in advance.

The device controller 25100, a RAM 25100b, and the SPD chip 25500 may be the same in operation and configuration as or similar to the corresponding components described with reference to FIG. 36. The data buffer circuit 25400 may be the same in operation and configuration as or similar to the data buffer circuit 23400 described with reference to FIG. 36. For descriptive convenience, a duplicate description about the device controller 25100, the RAM 25100b, the data buffer circuit 25400, and the SPD chip 25500 is omitted.

The device controller 25100 may control the nonvolatile memory device 25200 and the DRAMs 25600 in response to a signal received from the processor 21100. The processor 21100 may selectively access the nonvolatile memories 25200 or the DRAMs 25600.

For example, in the case where the processor 21100 stores data in the nonvolatile memories 25200, data to be stored may be provided to the device controller 25100 through the data buffer circuit 25400 as the data signal DQ and the data strobe signal DQS. The device controller 25100 may transmit received data to the nonvolatile memories 25200. For example, in the case where the processor 21100 reads data stored in the nonvolatile memory device 25200, the device controller 25100 may provide data read from the nonvolatile memories 25200 to the processor 21100 through the data buffer circuit 25400 as the data signal DQ and the data strobe signal DQS.

For example, in the case where the processor 21100 stores data in the DRAMs 25600, the device controller 25100 may provide the DRAMs 25600 with a RAM command CMD_R, a RAM address ADDR_R, and a clock signal CLK. The data to be stored may be provided to the device controller 25600 through the data buffer circuit 25400 as the data signal DQ and the data strobe signal DQS. For example, in the case where the processor 21100 reads data from the DRAMs 25600, the device controller 25100 may provide the DRAMs 25600 with the RAM command CMD_R, the RAM address ADDR_R, and the clock signal CLK. The DRAMs 25600 may output data based on provided signals, and the data buffer circuit 25400 may provide data outputted from the DRAMs 25600 to the processor 21100 as the data signal DQ and the data strobe signal DQS.

Figure 40:
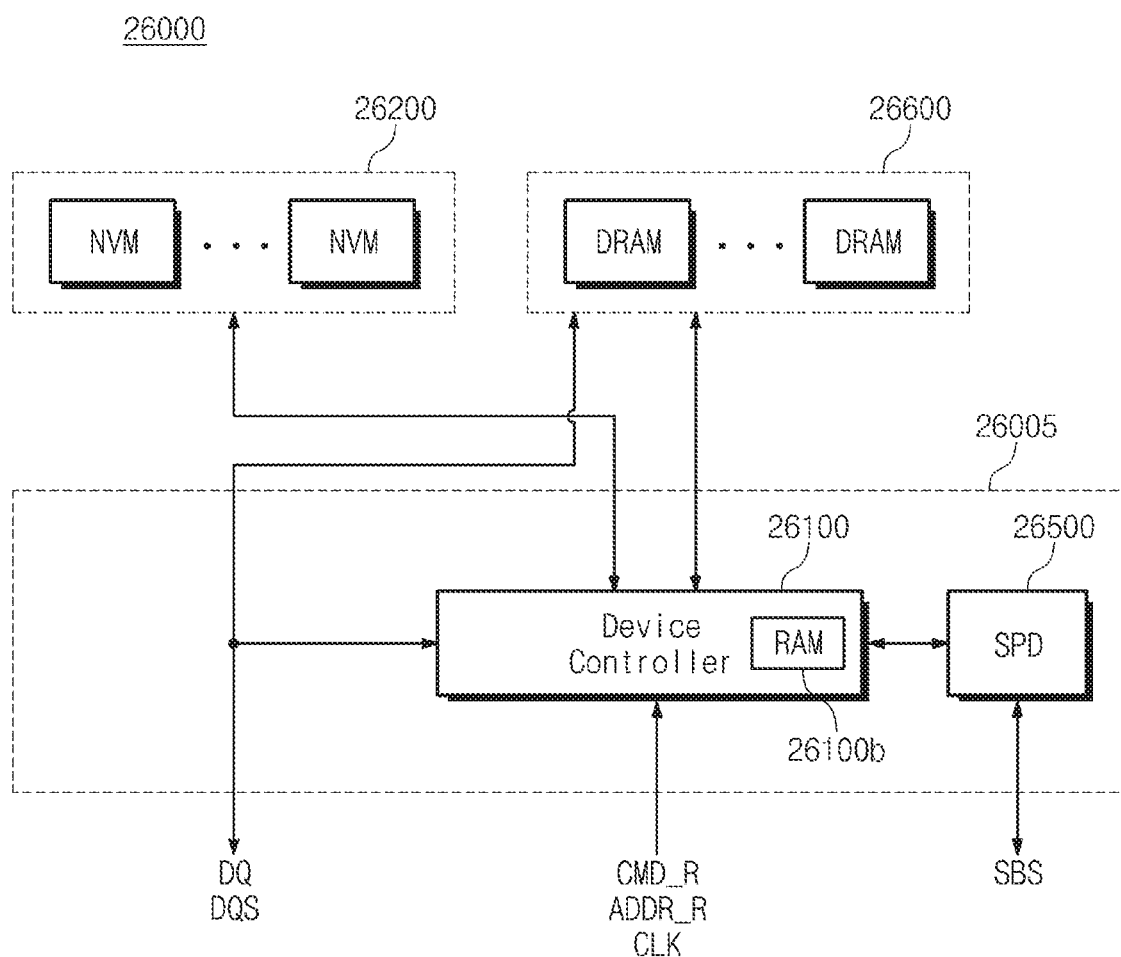
FIG. 40 is a block diagram schematically illustrating a storage device of FIG. 34, according to an embodiment of the disclosure.

FIG. 40 is a block diagram schematically illustrating a storage device of FIG. 34, according to an embodiment of the disclosure. At least one of first-type storage devices 21220 and 21222 of FIG. 34 may include a storage device 26000 of FIG. 40. In this embodiment, the storage device 26000 may be connected to a DIMM socket of the computing system 21000 of FIG. 34 and may communicate with the processor 21100 of FIG. 34 according to the interface protocol which is defined based on the DIMM specification.

In an embodiment of FIG. 40, the storage device 26000 may include a device controller 26005, one or more nonvolatile memories 26200, and one or more DRAMs 26600. The nonvolatile memories 26200 may be used as a storage medium of the computing system 21000. The DRAMs 26600 may be used as a main memory of the computing system 21000. The nonvolatile memories 26200 and the DRAMs 26600 may be configured and operate to be the same in configuration ad operation as or similar to the nonvolatile memories 24200 and the DRAMs 24600 of FIG. 38. For descriptive convenience, a duplicate description about the nonvolatile memories 26200 and the DRAMs 26600 is omitted.

The control circuit 26005 may include a device controller 26100 and an SPD chip 26500. The device controller 26100 and the nonvolatile memories 26200 may be the same in operation and configuration as the corresponding components described with reference to FIGS. 41 to 49. In particular, before the storage device 26000 is manufactured, the device controller 26100 may be tested according to a process to be described with reference to FIGS. 45 to 49. Accordingly, it may be possible to determine a faulty device controller 26100 in advance.

The device controller 26100, a RAM 26100*b*, and the SPD chip 26500 may be the same in operation and configuration as or similar to corresponding components described with reference to FIG. 36. For descriptive convenience, a duplicate description about the device controller 26100, the RAM 26100*b*, and the SPD chip 26500 is omitted.

The device controller 26100 may control the nonvolatile memory device 26200 or the DRAMs 26600 in response to a signal received from the processor 21100. The processor 21100 may selectively access the nonvolatile memories 26200 or the DRAMs 26600.

For example, in the case where the processor 21100 stores data in the nonvolatile memory device 26200, the nonvolatile memories 26200 may be provided with data to be stored through the device controller 26100 as the data signal DQ and the data strobe signal DQS. For example, in the case where the processor 21100 reads data from the nonvolatile memory device 26200, the device controller 26100 may provide data read from the nonvolatile memories 26200 to the processor 21100 as the data signal DQ and the data strobe signal DQS.

For example, in the case where the processor 21100 stores data in the DRAMs 26600, the device controller 26100 may provide the DRAMs 26600 with a RAM command CMD_R, a RAM address ADDR_R, and a clock signal CLK. The data to be stored may be provided to the DRAMs 26600 as the data signal DQ and the data strobe signal DQS. For example, in the case where the processor 21100 reads data from the DRAMs 26600, the device controller 26100 may provide the DRAMs 26600 with the RAM command CMD_R, the RAM address ADDR_R, and the clock signal CLK. The DRAMs 26600 may output data based on provided signals, and the outputted data may be provided to the processor 21100 as the data signal DQ and the data strobe signal DQS.

Figure 41:
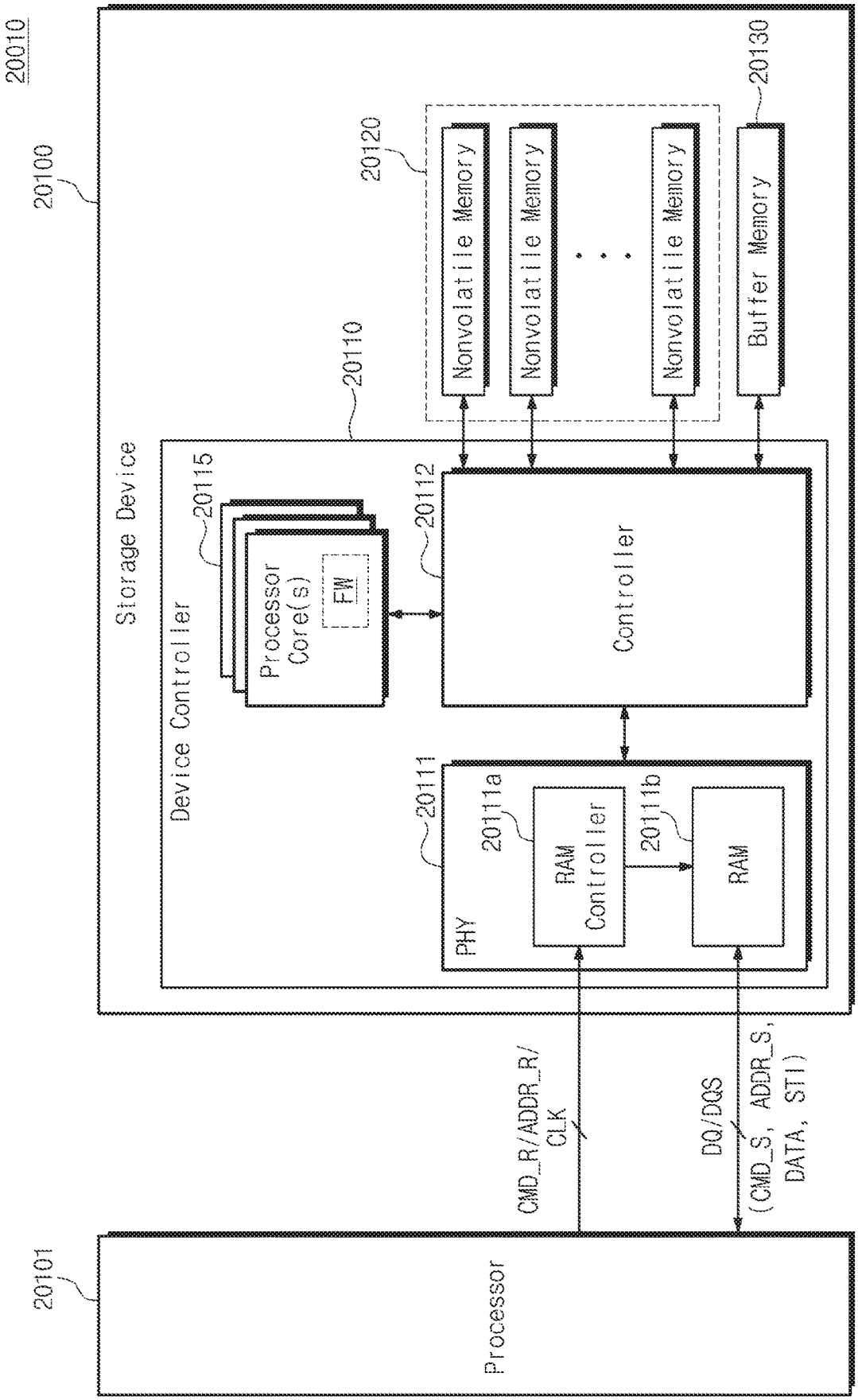
FIG. 41 is a block diagram schematically illustrating a storage system including a storage device of FIG. 34.

FIG. 41 is a block diagram schematically illustrating a storage system including a storage device of FIG. 34. The storage system 20010 may include a storage device 20100 and a processor 20101. The storage device 20100 and the processor 20101 may correspond to the first-type storage device 21220 or 21222 and the processor 21100 of FIG. 34, respectively. Thus, a duplicate description about the nonvolatile memories 20100 and the processor 20101 is omitted. A configuration and an operation of the storage device 20100 and communication between the storage device 20100 and the processor 20101 will be described with reference to FIG. 41.

In an embodiment, the storage device 20100 may include a device controller 20110, one or more nonvolatile memories 20120, and a buffer memory 20130. The device controller 20110 may correspond to one of the device controllers 22100, 23100, 24100, 25100, and 26100 described with reference to FIGS. 36 to 40. The nonvolatile memories 20120 may correspond to one of the nonvolatile memories 22200, 23200, 24200, 25200, and 26200 described with reference to FIGS. 36 to 40. The buffer memory 20130 may correspond to one of the buffer memories 22300 and 23300 of FIGS. 36 and 37.

In some embodiments, the storage device 20100 may further include at least ones of the data buffer circuits 23400 and 25400 of FIGS. 37 and 39, the SPD chips 22500, 23500, 24500, 25500, and 26500 of FIGS. 36 to 40, or the DRAMs 24600, 25600, 26600. FIG. 41 is an exemplification for helping understanding of the disclosure, and a configuration of the storage device 20100 may be variously changed or modified based on embodiments described with reference to FIGS. 36 to 40.

The storage device 20100 may perform its own function under control of the device controller 20110. Under control of the device controller 20110, data provided from the processor 20101 may be stored in the nonvolatile memories 20120 or the buffer memory 20130, or data stored in the nonvolatile memories 20120 or the buffer memory 20130 may be provided to the processor 20101. The device controller 20110 may include a physical layer 20111, a controller 20112, and a plurality of processor cores 20115.

The physical layer 20111 may include a RAM controller 20111*a* and a RAM 20111*b*. The RAM controller 20111*a* may receive a RAM command CMD_R, a RAM address ADDR_R, and a clock signal CLK from the processor 20101. The RAM controller 20111a may control the RAM 20111b based on the RAM command CMD_R and the RAM address ADDR_R.

The RAM 20111b may store or output data based on the RAM command CMD_R and the RAM address ADDR_R. The RAM 20111b may receive the data signal DQ and the data strobe signal DQS provided from the processor 20101 and may store data corresponding to data signal DQ. Alternatively, the RAM 20111b may output data stored thereby as the data signal DQ and may provide the outputted data to the processor 20101.

According to an embodiment of the disclosure, the data signal DQ may include a storage command CMD_S and a storage address ADDR_S provided from the processor 20101 to control the nonvolatile memories 20120. Furthermore, the data signal DQ may include write data DATA_W to be stored in the nonvolatile memories 20120 or read data DATA_R read from the nonvolatile memories 20120. In some cases, the data signal DQ may include status information STI associated with the write data and the read data.

At the write operation associated with the nonvolatile memories 20120, the RAM 20111b may store the storage command CMD_S and the storage address ADDR_S based on the RAM command CMD_R and the RAM address ADDR_R. Furthermore, the RAM 20111b may temporarily store the write data provided from the processor 20101 based on the RAM command CMD_R and the RAM address ADDR_R. Under control of the controller 20112, the storage command CMD_S, the storage address ADDR_S, and the write data may be provided to the nonvolatile memories 20120. The write data may be stored in the nonvolatile memories 20120 based on the storage command CMD_S and the storage address ADDR_S.

At the read operation associated with the nonvolatile memories 20120, the RAM 20111b may store the storage command CMD_S and the storage address ADDR_S based on the RAM command CMD_R and the RAM address ADDR_R. Under control of the controller 20112, the storage command CMD_S and the storage address ADDR_S may be provided to the nonvolatile memories 20120. The read data may be read from the nonvolatile memories 20120 based on the storage command CMD_S and the storage address ADDR_S and may be provided to the processor 20101 after being temporarily stored in the RAM 20111b.

That is, data may be transacted between the processor 20101 and the nonvolatile memories 20120 under control of the controller 20112. To this end, the physical layer 20111 may be defined based on the DIMM specification and may operate according to the DDR interface protocol. Under control of the RAM controller 20111a and the controller 20112, the RAM 20111b may store the status information STI associated with a progress of the write operation or the read operation. The processor 20101 may recognize whether the write operation or the read operation is completed, based on the status information STI. Furthermore, the controller 20112 may recognize whether the write operation or the read operation need be executed, based on the status information STI.

For example, the RAM 20111b may include a multi-port RAM such as dual port SRAM (DPSRAM) or a shared RAM. In an embodiment, the RAM 20111b may be accessed by the processor 20101 and the controller 20112 through different ports. A configuration of the RAM 20111b will be described in more detail with reference to FIG. 42. Furthermore, the write operation and the read operation will be described in more detail with reference to FIGS. 43 and 44.

The controller 20112 may include various hardware components or software components to control the physical layer 20111 and the nonvolatile memories 20120. For example, the controller 20112 may include an ECC encoding/decoding engine, a scrambler/descrambler, a data buffer, and a flash translation layer.

In the above embodiment, the controller 20112 may detect and correct an error of data through the ECC encoding/decoding engine and may generate and add an ECC code associated with data. The controller 20112 may scramble or descramble data through a scrambler/descrambler. The controller 20112 may temporarily store data read from the RAM 20111b or the nonvolatile memories 20120 in the data buffer. The controller 20112 may perform translation between a logical address and a physical address associated with the storage address ADDR_S through the flash translation layer. To this end, the buffer memory 20130 may store a mapping table between logical addresses and physical addresses of the nonvolatile memories 20120.

Processor cores 20115 may be configured to perform arithmetic/logic operations. In particular, the processor cores 20115 may perform an operation for controlling the physical layer 20111 and the nonvolatile memories 20120. The controller 20112 may control the physical layer 20111 and the nonvolatile memories 20120 based on the operation result of the processor cores 20115.

The processor cores 20115 may drive firmware FW. An operation for controlling the physical layer 20111 and the nonvolatile memories 20120 may be performed according to an operation of the firmware FW. According to an embodiment of the disclosure, the firmware FW may include test firmware used to test whether the device controller 20110 is defective, in particular, whether the physical layer 20111 is defective. A process of testing the physical layer 20111 will be described with reference to FIGS. 45 to 49.

Figure 42:
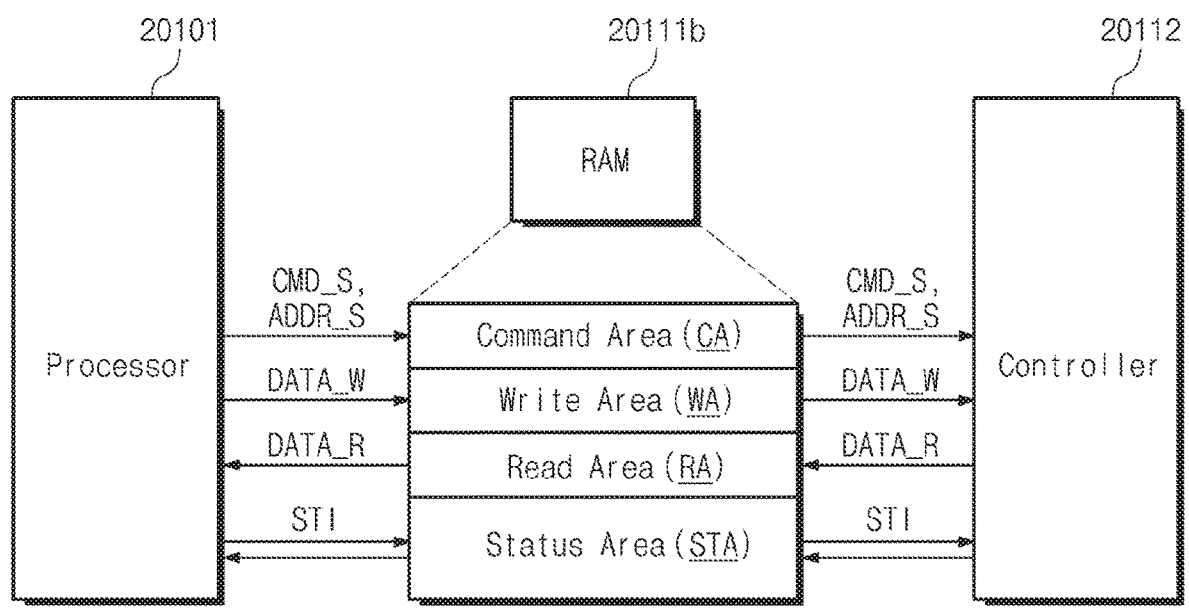
FIG. 42 is a diagram schematically illustrating a configuration of a RAM and communication between a RAM, a processor, and a controller.

FIG. 42 is a diagram schematically illustrating a configuration of a RAM and communication between a RAM, a processor, and a controller. In an embodiment, a RAM 20111b may include a command area CA, a write area WA, a read area RA, and a status area STA. The command area CA, write area WA, read area RA, and status area STA may be divided physically or logically.

One of the command area CA, write area WA, read area RA, and status area STA may be selected based on a RAM address ADDR_R (refer to FIG. 41) provided from the processor 20101. Furthermore, a write operation or a read operation may be performed with respect to the selected area based on a RAM command CMD_R (refer to FIG. 41) provided from the processor 20101. For example, a write operation may be performed at the selected area in the case where a RAM write command is provided as the RAM command CMD_R, and a read operation may be performed at the selected area in the case where a RAM read command is provided as the RAM command CMD_R.

The command area CA may store a storage command CMD_S and a storage address ADDR_S provided from the processor 20101. The controller 20112 may read the storage command CMD_S and the storage address ADDR_S stored in the command area CA. The storage command CMD_S may indicate whether any one of a write operation and a read operation is performed with respect to one or more nonvolatile memories 20120 (refer to FIG. 41). The storage address ADDR_S may indicate locations of nonvolatile memories 20120 where the write operation or the read operation is to be performed.

The write area WA and the read area RA may store write data DATA_W and read data DATA_R, respectively. The write data DATA_W provided from the processor 20101 may be temporarily stored in the write area WA and may be then provided to the nonvolatile memories 20120 under control of a controller 20112. The read data DATA_R read from the nonvolatile memories 20120 may be temporarily stored in the read area RA under control of the controller 20112 and may be then provided to the processor 20101.

Under control of the RAM controller 20111 (refer to FIG. 41) and the controller 20112, the status area STA may store the status information STI associated with the write data or the read data. The status information STI may include information associated with a progress of the write operation or the read operation. The processor 20101 may recognize whether the write operation or the read operation is completed, based on the status information STI. Furthermore, the controller 20112 may recognize whether the write operation or the read operation need be executed, based on the status information STI.

For example, in the case where the processor 20101 stores the write data DATA_W, the processor 20101 may provide the write data DATA_W to the write area WA. Furthermore, the processor 20101 may provide information associated with the write data DATA_W and the status information STI associated with a request of the write operation to the status area STA. Based on the status information STI, the controller 20112 may control the write operation such that the write data DATA_W is stored in the nonvolatile memories 20120. In the case where the controller 20112 stores the status information STI, indicating completion of the write operation, in the status area STA, the processor 20101 may recognize completion of the write operation based on the status information STI. To this end, the processor 20101 may perform polling about the status area STA every specific point in time (e.g., periodically).

For example, in the case where the processor 20101 reads the read data DATA_R, the processor 20101 may provide information associated with the read data DATA_R and the status information STI associated with a request of the read operation to the status area STA. Based on the status information STI, the controller 20112 may control the read operation such that the read data DATA_R is stored in the nonvolatile memories 20120. In the case where the controller 20112 stores the status information STI, indicating completion of the read operation, in the status area STA, the processor 20101 may recognize completion of the read operation based on the status information STI. Furthermore, the processor 20101 may be provided with the read data DATA_R stored in the read area RA.

Figure 43:
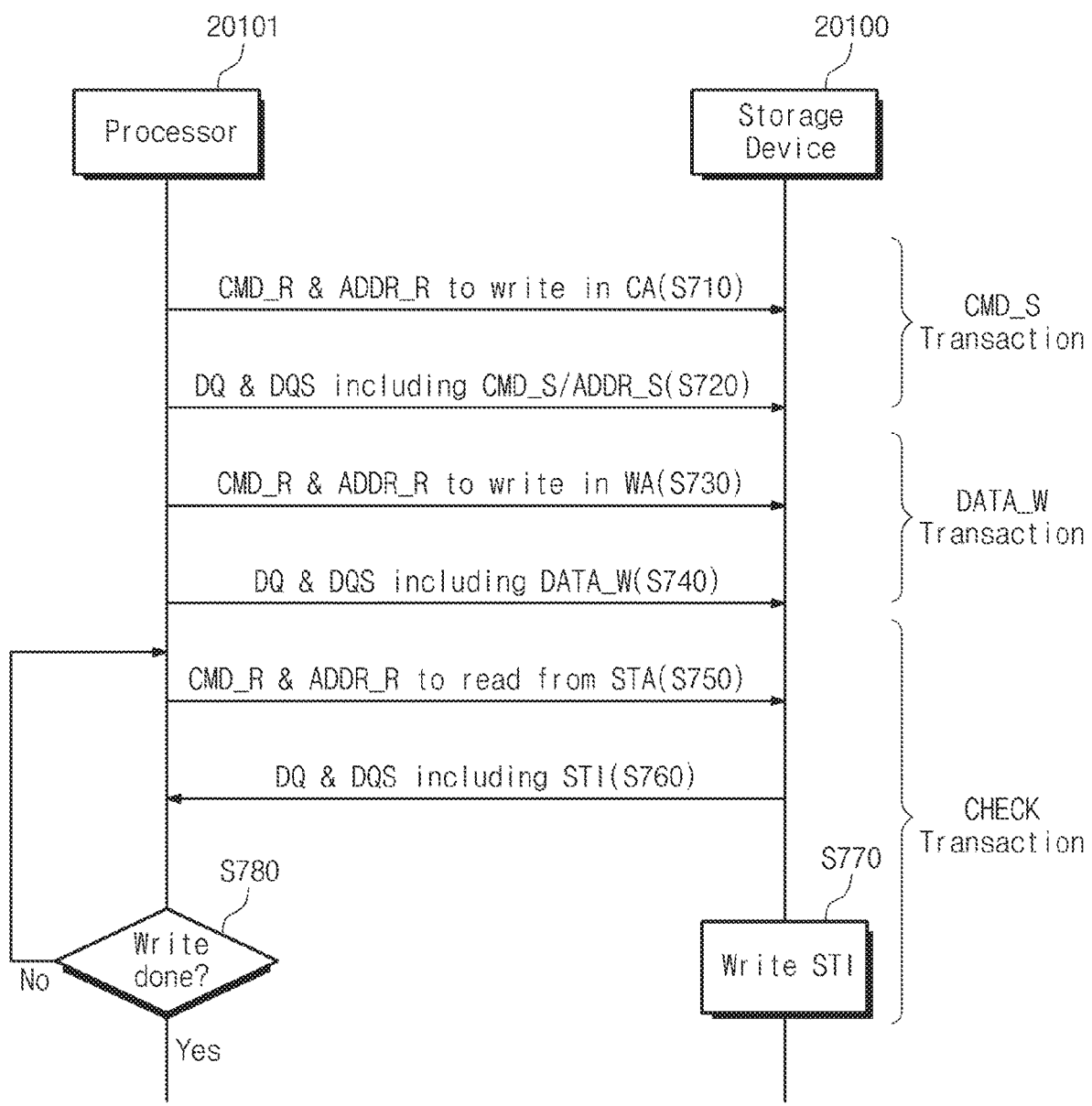
FIG. 43 is a flow chart for describing a write operation associated with a storage device of FIG. 41.

FIG. 43 is a flow chart for describing a write operation associated with a storage device of FIG. 41. The processor 20101 may store write data DATA_W in the storage device 20100 based on a write operation of FIG. 43. FIGS. 41 and 42 will be referenced to help promote an understanding of the disclosure.

In step S710, the processor 20101 may transmit a RAM command CMD_R requesting a write operation associated with the RAM 20111*b*, to the storage device 20100. Furthermore, the processor 20101 may transmit a RAM address ADDR_R for selecting a command area CA of the RAM 20111*b* to the storage device 20100.

In step S720, the processor 20101 may provide data signals DQ and a data strobe signal DQS to the storage device 20100. In step S720, the data signals DQ may include a storage command CMD_S for requesting a write operation associated with the storage device 20100, in more detail, a write operation associated with the nonvolatile memories 20120. Furthermore, the data signals DQ may include the storage address ADDR_S indicating locations of nonvolatile memories 20120 where the write operation is to be performed.

Steps S710 and S720 may form a command transaction operation for transmitting a write command about the nonvolatile memories 20120 to the storage device 20100. In the case where steps S710 and S720 are performed, the command area CA of the RAM 20111*b* may store the storage command CMD_S and the storage address ADDR_S. Here, the storage command CMD_S may indicate that the write operation is performed at the nonvolatile memories 20120.

In step S730, the processor 20101 may transmit a RAM command CMD_R for requesting a write operation associated with the RAM 20111*b* to the storage device 20100. Furthermore, the processor 20101 may transmit a RAM address ADDR_R for selecting a write area WA of the RAM 20111*b* to the storage device 20100.

In step S740, the processor 20101 may provide the data signals DQ and the data strobe signal DQS to the storage device 20100. In step S740, the data signal DQ may include the write data DATA_W to be stored in the storage device 20100.

Steps S730 and S740 may form a data transaction operation for transmitting write data DATA_W to be stored in the nonvolatile memories 20120 to the storage device 20100. In the case where steps S730 and S740 are performed, the write area WA of the RAM 20111*b* may store the write data DATA_W. As the storage command CMD_S, the storage address ADDR_S, and the write data DATA_W are stored in the RAM 20111*b*, the controller 20112 may control the write operation in response to the storage command CMD_S and the storage address ADDR_S.

In step S750, the processor 20101 may transmit a RAM command CMD_R for requesting a read operation associated with the RAM 20111*b* to the storage device 20100. Furthermore, the processor 20101 may transmit a RAM address ADDR_R for selecting the status area SA of the RAM 20111*b* to the storage device 20100.

In step S760, the processor 20101 may be provided with the data signal DQ and the data strobe signal DQS from the storage device 20100. In step S760, the data signal DQ may include status information STI associated with the write operation.

In step S770, the storage device 20100 may store the write data DATA_W and the status information STI associated with the write operation in the status area STA. For example, in the case where the write operation of the storage device 20100 is completed, the case where the write operation is scheduled, or the case where an instruction of the write operation enters a queue, step S770 may be performed.

In step S780, the processor 20101 may determine whether the write operation is completed. The processor 20101 may determine whether the write operation is completed based on the status information STI stored in the status area STA.

Steps S750 to S780 may form a check transaction operation for checking whether the write operation of the nonvolatile memories 20120 is completed. In the case where the write operation is determined as not being completed, the processor 20101 may repeat steps S750 and S760, and thus the processor 20101 may continue to perform polling about whether the write operation is completed. In contrast, in the case where the write operation is determined as being completed, the processor 20101 may request a next operation of the storage device 20100.

Figure 44:
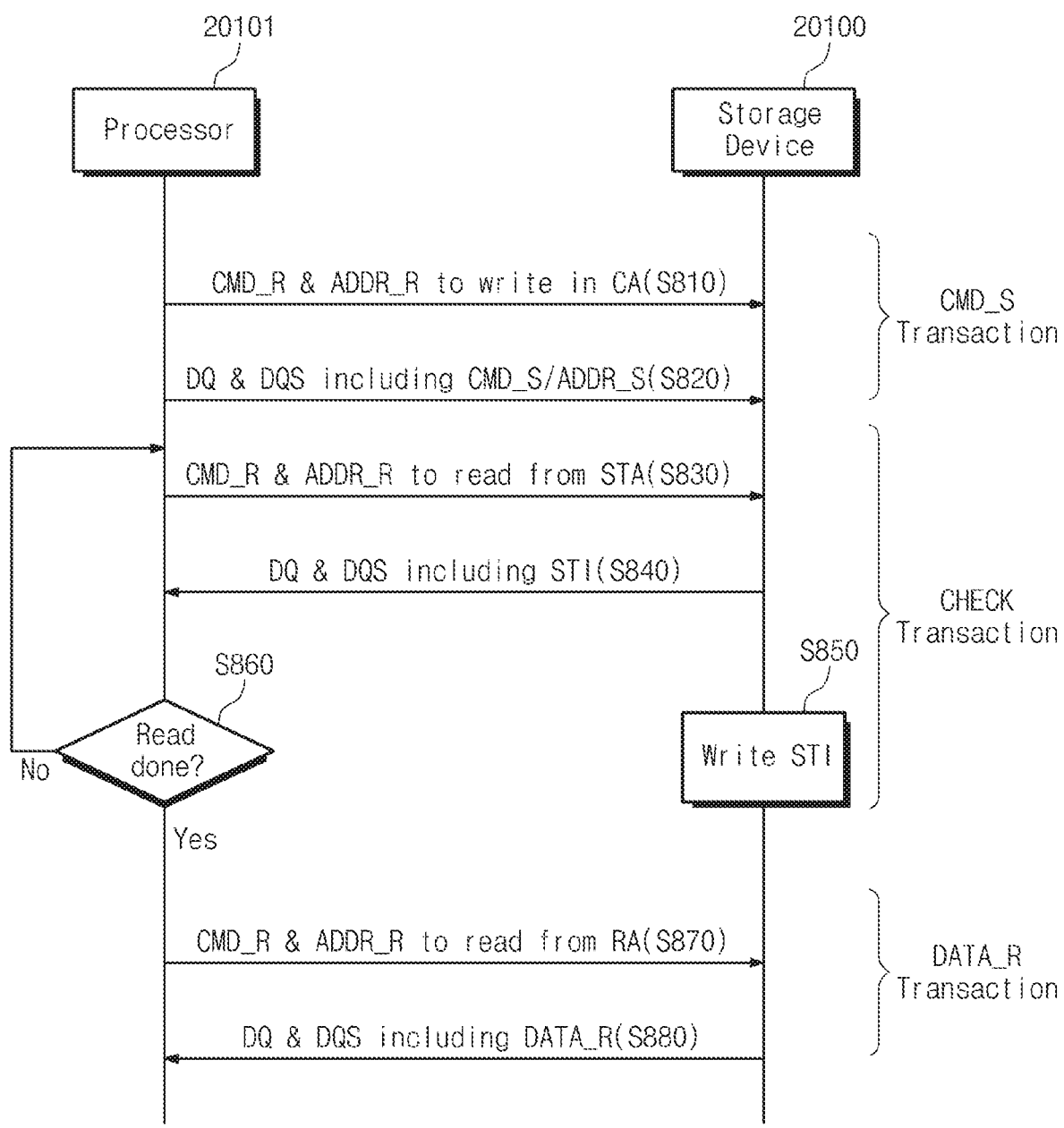
FIG. 44 is a flow chart for describing a read operation associated with a storage device of FIG. 41.

FIG. 44 is a flow chart for describing a read operation associated with a storage device of FIG. 41. The processor 20101 may be provided with read data DATA_R stored in the storage device 20100 based on a read operation of FIG. 44. FIGS. 41 and 42 will be referenced to help promote an understanding of the disclosure.

In step S810, the processor 20101 may transmit a RAM command CMD_R for requesting a write operation associated with the RAM 20111*b* to the storage device 20100. Furthermore, the processor 20101 may transmit a RAM address ADDR_R for selecting a command area CA of the RAM 20111*b* to the storage device 20100.

In step S820, the processor 20101 may provide the data signals DQ and the data strobe signal DQS to the storage device 20100. In step S820, the data signals DQ may include a storage command CMD_S for requesting a read operation associated with the storage device 20100, in more detail, a read operation associated with the nonvolatile memories 20120. Furthermore, the data signal DQ may include the storage address ADDR_S indicating locations of nonvolatile memories 20120 where the read operation is to be performed.

Steps S810 and S820 may form a command transaction operation for transmitting a read command about the nonvolatile memories 20120 to the storage device 20100. In the case where steps S810 and S820 are performed, the command area CA of the RAM 20111*b* may store the storage command CMD_S and the storage address ADDR_S. As the storage command CMD_S and the storage address ADDR_S are stored in the RAM 20111*b*, the controller 20112 may control the read operation in response to the storage command CMD_S and the storage address ADDR_S.

In step S830, the processor 20101 may transmit a RAM command CMD_R for requesting a read operation associated with the RAM 20111*b* to the storage device 20100. Furthermore, the processor 20101 may transmit a RAM address ADDR_R for selecting the status area SA of the RAM 20111*b* to the storage device 20100.

In step S840, the processor 20101 may be provided with the data signal DQ and the data strobe signal DQS from the storage device 20100. In step S840, the data signal DQ may include status information STI associated with the read operation.

In step S850, the storage device 20100 may store the read data DATA_R and the status information STI associated with the read operation in the status area STA. For example, step S850 may be performed in the case where the read operation about the storage device 20100 is completed.

In step S860, the processor 20101 may determine whether the read operation is completed. The processor 20101 may determine whether the read operation is completed based on the status information STI stored in the status area STA.

Steps S830 to S860 may form a check transaction operation for checking whether the read operation of the nonvolatile memories 20120 is completed. In the case where the read operation is determined as not being completed, the processor 20101 may repeat steps S830 and S840, and thus the processor 20101 may continue to perform polling about whether the read operation is completed. In contrast, step S870 may be performed in the case where the read operation is determined as being completed.

In step S870, the processor 20101 may transmit a RAM command CMD_R for requesting a read operation associated with the RAM 20111*b* to the storage device 20100. Furthermore, the processor 20101 may transmit a RAM address ADDR_R for selecting a read area RA of the RAM 20111*b* to the storage device 20100.

In step S880, the processor 20101 may be provided with the data signals DQ and the data strobe signal DQS from the storage device 20100. In step S880, the data signal DQ may include the read data DATA_R read from the storage device 20100.

Steps S870 and S880 may form a data transaction operation for transmitting the read data DATA_R to the processor 20101 from the storage device 20100. In the case where steps S870 and S880 are performed, the read data DATA_R may be stored in the read area RA and may be then provided to the processor 20101. After step S880 is completed, the processor 20101 may request a next operation of the storage device 20100.

According to embodiments described with reference to FIGS. 41 and 44, the processor 20101 may communicate with the device controller 20112 through a bus operating at a high speed, such as the bus 1230 of FIG. 1. For example, in the case where the storage device 20100 is implemented to have a DIMM form and the processor 20101 communicates with the device controller 20112 based on an interface protocol operating according to a DDR manner, the processor 20101 may recognize the storage device 20100 as a DIMM device and may perform the write operation and the read operation of the RAM 20111*b* based on the interface protocol operating according to the DDR manner Thus, according to an embodiment of the disclosure, it may be possible to provide the storage device 20100 with high operating performance.

Figure 45:
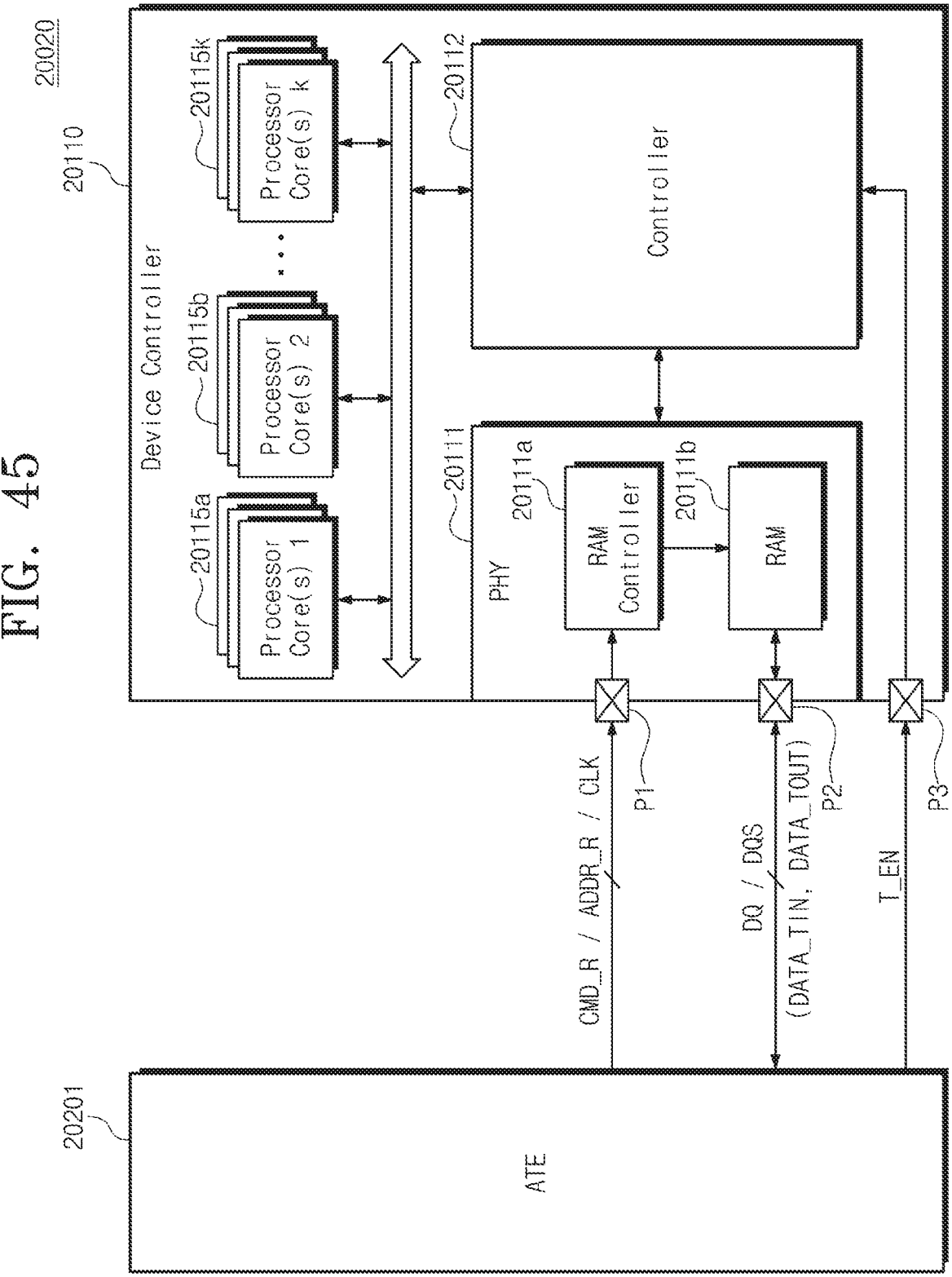
FIG. 45 is a block diagram schematically illustrating a test system for testing a device controller of FIG. 41.

FIG. 45 is a block diagram schematically illustrating a test system for testing a device controller of FIG. 41. A test system 20020 may include a device controller 20110 and automated test equipment (ATE) 20201.

The device controller 20110 may correspond to the device controller 20110 of FIG. 41. Configurations and operations of the physical layer 20111, the RAM controller 20111*a*, the RAM 20111*b*, and the controller 20112 are described with reference to FIG. 41. A plurality of processor cores 20115*a*, 20115*b*, and 20115*k* included in the device controller 20110 may correspond to the processor cores 20115 of FIG. 41. For descriptive convenience, a duplicate description about the physical layer 20111, the RAM controller 20111*a*, the RAM 20111*b*, the controller 20112, and the processor cores 20115*a*, 20115*b*, and 20115*k* is omitted.

Before the manufacture of the storage device 20100 (refer to FIG. 41) having the device controller 20110 is completed, the test system 20020 may test a fault of the device controller 20110 in advance. For example, before the device controller 20110 is connected with other components such as the nonvolatile memories 20120 (refer to FIG. 41), the buffer memory 20130 (refer to FIG. 41), the SPD chip 22500 (refer to FIG. 36), and the like, a determination of whether the device controller 20110 is faulty may be obtained using the ATE 20201. According to an embodiment of the disclosure, whether the physical layer 20111 is faulty may be determined in advance.

The ATE 20201 may communicate with the device controller 20110. The ATE 20201 may determine whether the physical layer of the device controller 20110 is faulty, based on a result of communication performed with the device controller 20110. For example, the ATE 20201 may be a computing device including an embedded processor such as, but not limited to, a personal computer, a workstation, a notebook, a mobile terminal, and the like.

In an embodiment, the device controller 20110 may at least include a first pad P1, a second pad P2, and a third pad P3. The first pad P1, the second pad P2, and the third pad P3 may be independent of each other. The device controller 20110 may transact a signal with the ATE 20201 or the processor 20101 (refer to FIG. 41) through the first pad P1, the second pad P2, and the third pad P3.

For example, the device controller 20110 may receive a RAM command CMD_R, a RAM address ADDR_R, and a clock CLK through the first pad P1. The RAM command CMD_R, the RAM address ADDR_R, and the clock CLK received through the first pad P1 may be used for the RAM controller 20111a to control the RAM 20111b. For example, in the case where the physical layer 20111 operates according to the interface protocol defined based on the DIMM specification, the first pad P1 may correspond to a pin which is defined based on the DIMM specification.

For example, the device controller 20110 may receive the data signal DQ and the data strobe signal DQS through the second pad P2. Accordingly, in the case where the storage device 20100 including the device controller 20110 is manufactured, the storage command CMD_S, the storage address ADDR_S, the write data DARTA_W, the read data DATA_R, and the status information STI may be transmitted through the second pad P2.

In the test system 20020, the data signal DQ may include test input data DATA_TIN and test output data DATA_TOUT. The ATE 20201 may determine whether the physical layer 20111 is faulty, based on the test input data DATA_TIN and the test output data DATA_TOUT. A process of testing a fault of the physical layer 20111 will be described with reference to FIGS. 46 to 49. For example, in the case where the physical layer 20111 operates according to the interface protocol defined based on the DIMM specification, the second pad P2 may correspond to a data input/output pin which is defined based on the DIMM specification.

For example, the device controller 20110 may receive a test enable signal T_EN through the second pad P3. The test enable signal T_EN may be used to enable a test of the device controller 20110. In the case where the controller 20112 receives the test enable signal T_EN through the third pad P3, an environment for testing the device controller 20110 may be set under control of the controller 20112. For example, in the case where the physical layer 20111 operates according to the interface protocol defined based on the DIMM specification, the third pad P3 may correspond to a test enable pin which is defined based on the DIMM specification.

For example, the processor cores 20115a, 20115b, and 20115k may be classified according to a function. In an embodiment, first processor cores 20115a may process communication with a host side (e.g., the processor 20101, the ATE 20201, and the like), and second processor cores 20115b may process communication with the nonvolatile memories 20120. Alternatively, the processor cores 20115a, 20115b, and 20115k may be classified according to performance. In an embodiment, the first processor cores 20115a may have relatively low performance, and the second processor cores 20115b may have relatively high performance. In another embodiment, the processor cores 20115a, 20115b, and 20115k may be classified according to a specific criterion.

Figure 46:
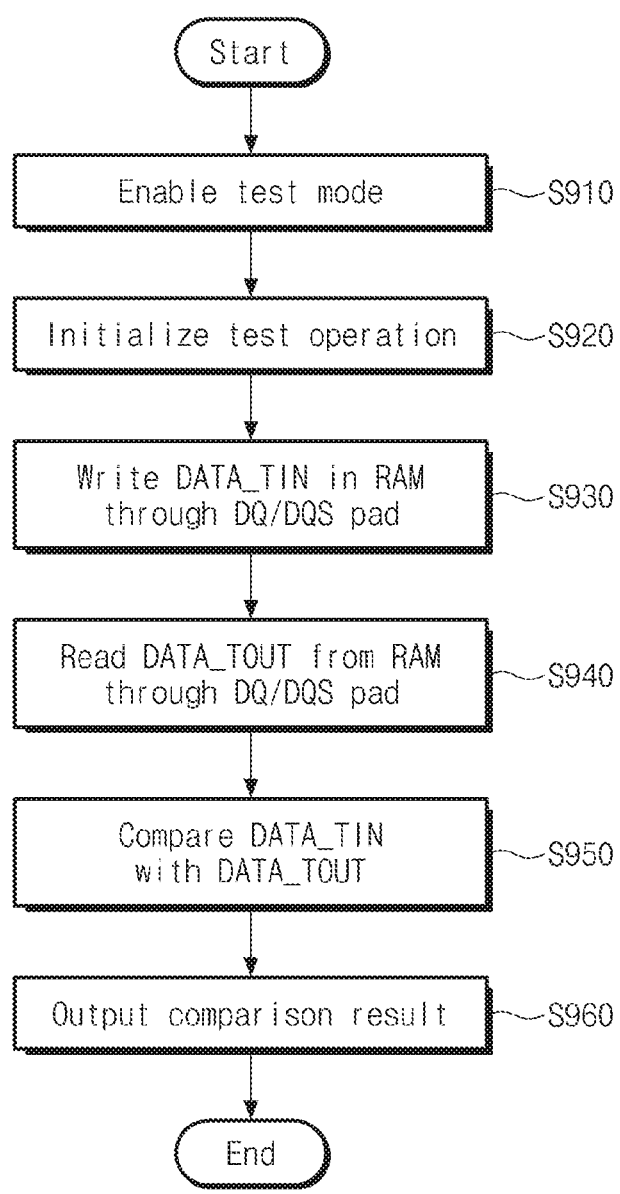
FIG. 46 is a flow chart for describing a process of testing a device controller on a test system of FIG. 45.
Figure 47:
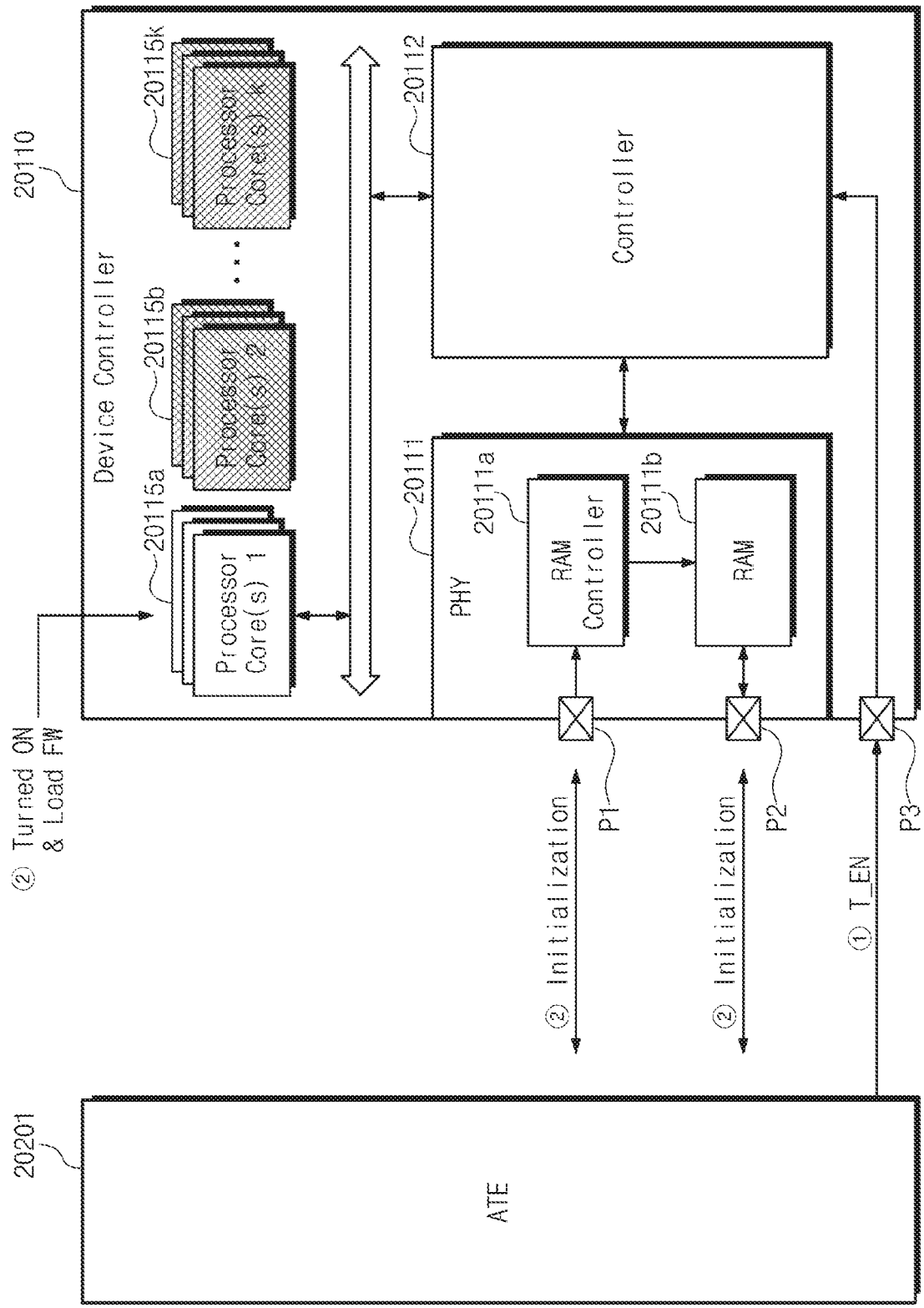
FIGS. 47 and 48 are diagrams for describing a process of testing a device controller on a test system of FIG. 45.
Figure 48:
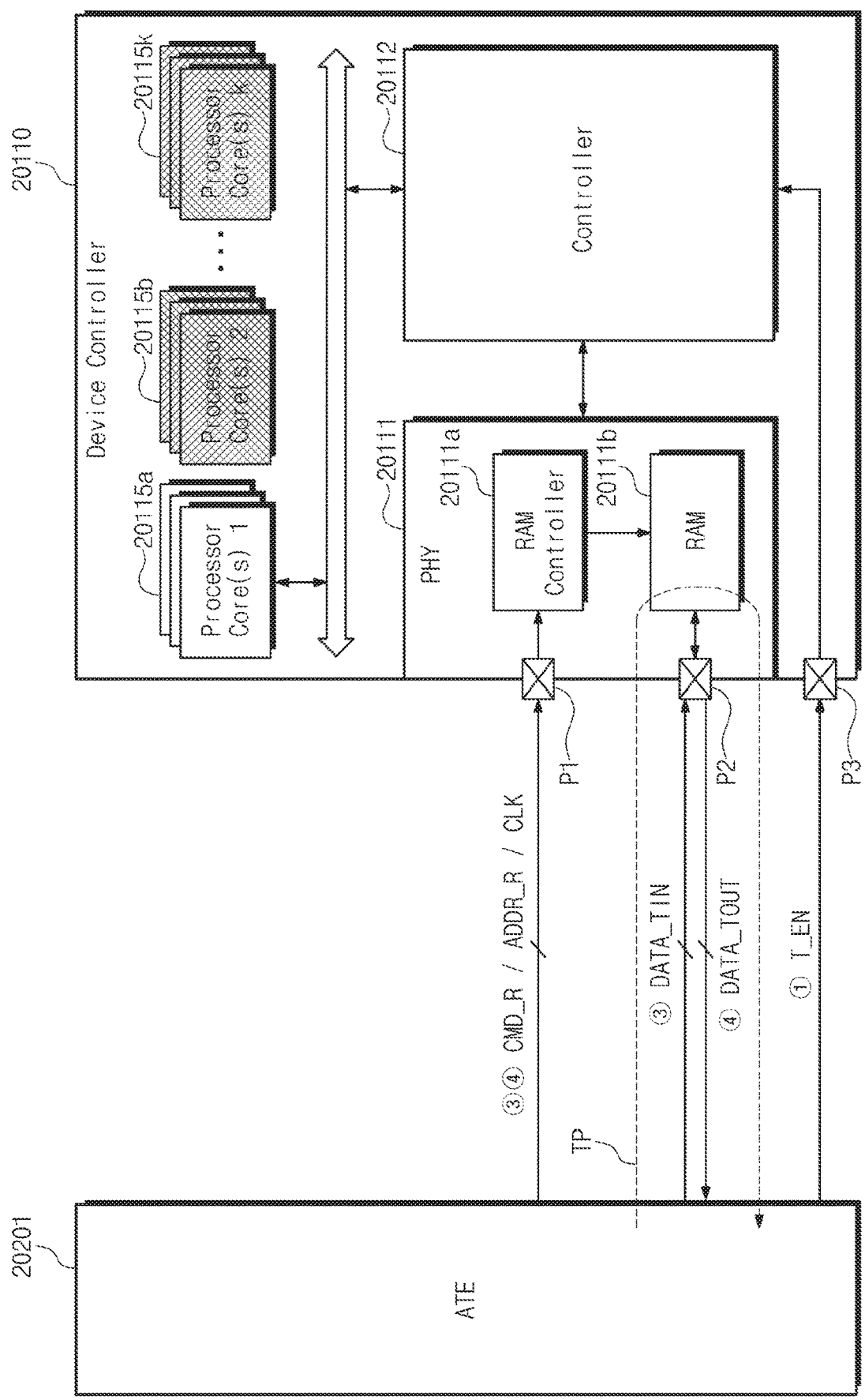

FIG. 46 is a flow chart for describing a process of testing a device controller on a test system of FIG. 45. FIGS. 47 and 48 are diagrams for describing a process of testing a device controller on a test system of FIG. 45. FIGS. 46, 47, and 48 will be referred to help promote an understanding of the disclosure.

In step S910, a test mode may be activated to test the device controller 20110. A test enable signal T_EN may be provided to the controller 20112 from the ATE 20201 through the third pad P3 (refer to (①) of FIG. 47). A test mode may initiate in the case where the controller 20112 receives the test enable signal T_EN.

After the test mode initiates, in step S920, a test operation may be reset, and an environment needed to test the device controller 20110 may be set. This may be performed under control of the controller 20112. For example, connections between the physical layer 20111 and the ATE 20201 using the first and second pads P1 and P2 may be initialized in response to the test enable signal T_EN (refer to (②) of FIG. 47). The process of initializing the connections may include recognizing device characteristics such as a type, operating performance, line connection, and the like of the other device. After the connections are initialized, the device controller 20110 and the ATE 20201 may stably exchange signals through the first pad P1 and the second pad P2.

For example, under control of the controller 20112, a part of processor cores 20115a, 20115b, and 20115k may operate (refer to (②) of FIG. 47). A test operation according to an embodiment of the disclosure may be executed according to communication with a host side (i.e., the ATE (20201)). Accordingly, a processor core, communicating with a host side, from among the processor cores 20115a, 20115b, and 20115k may operate, while the remaining processor cores may not operate. Alternatively, since it is unnecessary to perform operations for processing data such as an ECC operation, a scramble operation, and the like, a processor core, being relatively low in performance, from among the processor cores 20115a, 20115b, and 20115k may operate. Accordingly, it may be possible to reduce power consumed at the test operation.

For example, a processor core (e.g., the first processor core 20115a), operating, from among the processor cores 20115a, 20115b, and 20115k may drive firmware in response to a test enable signal T_EN such that the test operation is performed (refer to (②) of FIG. 47). According to an embodiment of the disclosure, the firmware may include test firmware for performing the test operation. Accordingly, an environment needed to test the device controller 20110 in a test mode may be set.

In step S930, test input data DATA_TIN may be stored in the RAM 20111b of the device controller 20110. In more detail, the device controller 20110 may receive a RAM write address and a RAM write command, corresponding to a write operation associated with the RAM 20111b, from the ATE 20201 through the first pad P1. The RAM write address and the RAM write command may be provided to the RAM controller 20111a as a RAM command CMD_R and a RAM address ADDR_R (refer to (③) of FIG. 48).

Afterwards, the device controller 20110 may be provided with the test input data DATA_TIN from the ATE 20201 through the second pad P2. The RAM 20111b may store the test input data DATA_TIN at a location corresponding to the RAM write address, based on the RAM write command.

The test input data DATA_TIN may be used to test the physical layer 20111 of the device controller 20110. Accordingly, the test input data DATA_TIN may include data without limitation of types thereof. The test input data DATA_TIN may include specific data or variable data.

In step S940, test output data DATA_TOUT may be read from the RAM 20111b of the device controller 20110. In more detail, the device controller 20110 may receive a RAM read address and a RAM read command, corresponding to a read operation associated with the RAM 20111b, from the ATE 20201 through the first pad P1. The RAM read address and the RAM read command may be provided to the RAM controller 20111a as the RAM command CMD_R and the RAM address ADDR_R (refer to (④) of FIG. 48).

Afterwards, the test input data DATA_TIN stored in the RAM 2011b may be read from a location corresponding to the RAM read address based on the RAM read command According to the above description, the test input data DATA_TIN read from the RAM 20111b may be outputted from the device controller 20110 as the test output data DATA_TOUT (refer to (④)) FIG. 48). The test output data DATA_TOUT may be provided to the ATE 20201 through the second pad P2.

In step S950, the test input data DATA_TIN may be compared with the test output data DATA_TOUT. Furthermore, in step S960, the comparison result may be outputted. A fault of the device controller 20110, in more detail, a fault of the physical layer 20111 may be tested. A fault of the physical layer 20111 may be tested along a test path TP (refer to FIG. 48) for providing the test input data DATA_TIN to the RAM 20111b from the ATE 20201 through the second pad P2 and providing the test output data DATA_TOUT to the ATE 20201 from the RAM 20111b through the second pad P2. Steps S950 and S960 will be described in detail with reference to FIG. 49.

Figure 49:
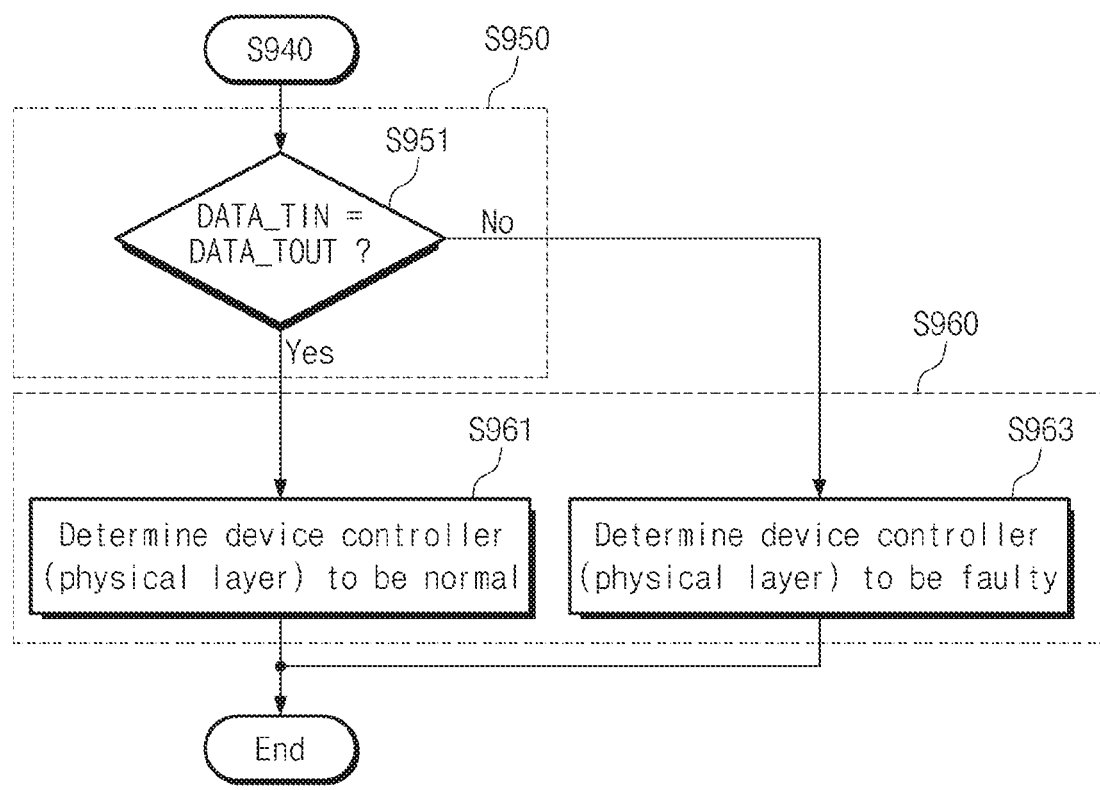
FIG. 49 is a flow chart for describing a process of determining whether a device controller is faulty, on a test system of FIG. 45.

FIG. 49 is a flow chart for describing a process of determining whether a device controller is faulty, on a test system of FIG. 45.

Step S950 of FIG. 49 may include step S951. In step S951, whether the test input data DATA_TIN corresponds to the test output data DATA_TOUT may be determined. The ATE 20201 (refer to FIG. 48) may determine whether the device controller 20110 is faulty, in more detail, whether the physical layer 20111 (refer to FIG. 48) has a fault, based on whether the test input data DATA_TIN to be provided to the device controller 20110 (refer to FIG. 48) corresponds to the test output data DATA_TOUT provided from the device controller 20110.

Step S960 of FIG. 49 may include steps S961 and S963. In the case where the test input data DATA_TIN is determined in step S951 as corresponding to the test output data DATA_TOUT, step S961 may be performed. In step S961, the device controller 20110 may be determined as being normal. In the case where an operation of the physical layer 20111 of the device controller 20110 is normal, test output data DATA_TOUT that is the same as the test input data DATA_TIN may be outputted. Accordingly, in the case where the test output data DATA_TOUT is the same as the test input data DATA_TIN, the ATE 20201 may determine the physical layer 20111 as being normal.

In contrast, in the case where the test input data DATA_TIN is determined in step S951 as not corresponding to the test output data DATA_TOUT, step S963 may be performed. In step S963, the device controller 20110 may be determined as being faulty. In the case where an operation of the physical layer 20111 of the device controller 20110 is abnormal, test output data DATA_TOUT which is different from the test input data DATA_TIN may be outputted.

In some cases, a fault may arise from the physical layer 20111 during manufacturing of the device controller 20110. For example, the first pad P1 or the second pad P2 may be faulty, or a line connected thereto may be faulty. For example, the RAM controller 20111a (refer to FIG. 48) or the RAM 20111b (refer to FIG. 48) may be faulty. In the case where the physical layer 20111 is faulty, the test input data DATA_TIN may be distorted and stored, and thus the test output data may be distorted and outputted. Accordingly, in the case where the physical layer 20111 is faulty, the test input data DATA_TIN provided to the device controller 20110 may be different from the test output data DATA_TOUT provided from the device controller 20110.

According to the above description, the ATE 20201 may determine whether the physical layer 20111 is faulty, based on whether the test output data DATA_TOUT is the same as the test input data DATA_TIN. In an embodiment, the test input data DATA_TIN may be stored in the entire storage area of the RAM 20111b to determine whether the RAM 20111b of the physical layer 20111 is faulty. In the case where the test input data DATA_TIN is not stored in a part of the RAM 20111b, testing about the part of the RAM 20111b may not be performed. For example, the test input data DATA_TIN may be stored in all areas including a command area CA, a write area WA, a read area RA, and a status area STA.

In the case where the test output data DATA_TOUT is not the same as the test input data DATA_TIN, the ATE 20201 may determine the physical layer 20111 as being faulty. With the above description, a fault of the device controller 20110 may be tested in advance before the storage device 20100 (refer to FIG. 41) including the device controller 20110 is completely manufactured, and thus the device controller 20110 with a fault may be sorted. This may mean that it is possible to reduce time and cost needed to manufacture the storage device 20100 including a faulty device controller 20110. Furthermore, end-user's satisfaction may be improved.

Figure 50:
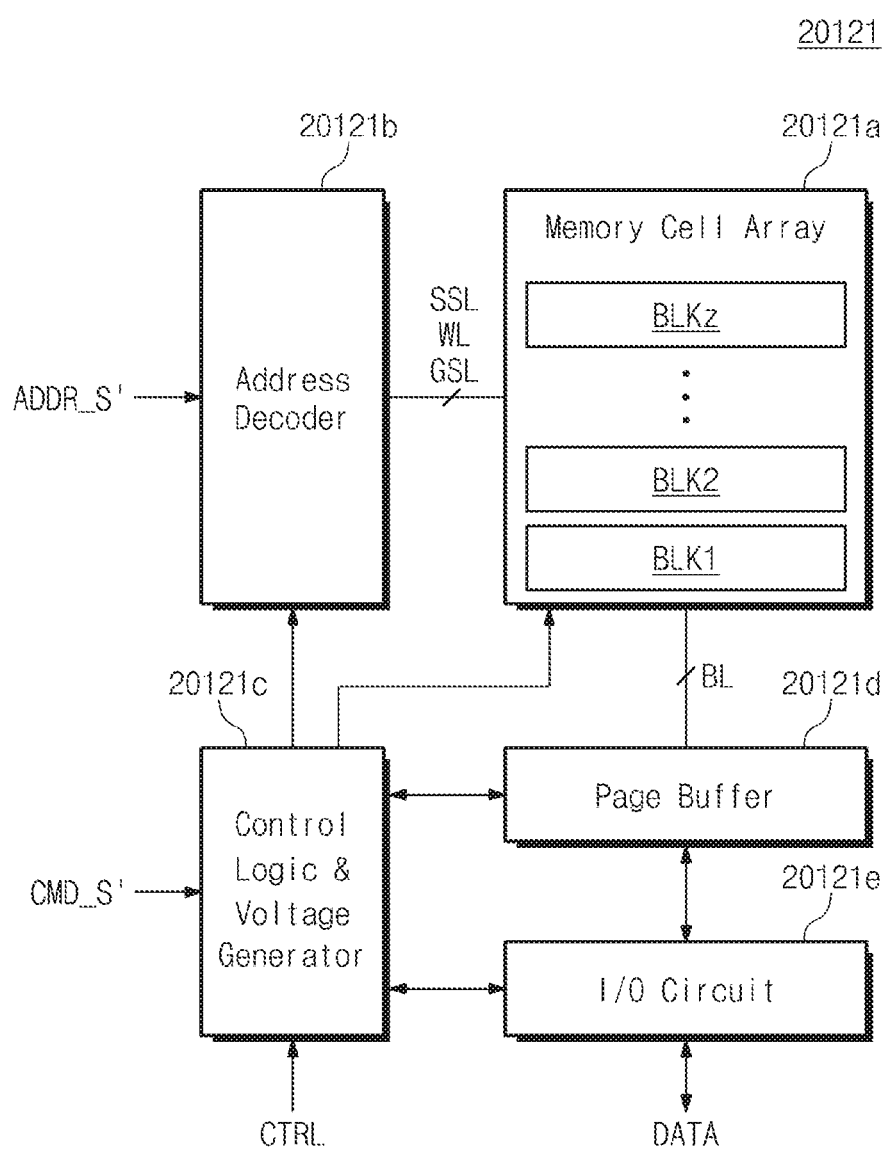
FIG. 50 is a block diagram schematically illustrating one of nonvolatile memories of FIG. 42.

FIG. 50 is a block diagram schematically illustrating one of the nonvolatile memories of FIG. 42. At least one of nonvolatile memories 20120 of FIG. 42 may include a nonvolatile memory 20121. The nonvolatile memory 20121 may include a memory cell array 20121a, an address decoder 20121b, a control logic and voltage generator block 20121c, a page buffer 20121d, and an input/output circuit 20121e.

The memory cell array 20121a may include a plurality of memory blocks BLK1 to BLKz. Each of the memory blocks may include a plurality of cell strings. Each of the cell strings may include a plurality of memory cells. Each of the memory cells may be connected with a plurality of word lines WL. Each memory cell may be a single level cell (SLC) storing one bit or a multi-level cell (MLC) storing at least two bits.

The address decoder 20121b may be connected with the memory cell array 20121a through the word lines WL, string selection lines SSL, and ground selection lines GSL The address decoder 20121b may decode a storage address ADDR_S' received from the device controller 20110 (refer to FIG. 42). The address decoder 20121b may select at least one of the word lines WL based on the decoded storage address ADDR_S' and may drive the at least one word line thus selected.

The control logic and voltage generator block 20121c may receive a storage command CMD_S' and a control signal CTRL from the device controller 20110. The control logic and voltage generator block 20121c may control the address decoder 20121b, the page buffer 20121d, and the input/output circuit 20121e. For example, the control logic and voltage generator 20121c may control the address decoder 20121b, the page buffer 20121d, and the input/output circuit 20121e in response to the storage command CMD_S' and the control signal CTRL such that write data provided from the device controller 20110 is stored in the memory cell array 20121a or such that read data stored in the memory cell array 20121a is read.

The control logic and voltage generator block 20121c may generate various voltages used to operate the nonvolatile memory 20121. For example, he control logic and voltage generator block 20121*c* may generate a plurality of program voltages, a plurality of pass voltages, a plurality of selection read voltages, a plurality of non-selection read voltages, a plurality of erase voltages, and a plurality of verification voltages. The control logic and voltage generator block 20121*c* may provide the generated voltages to the address decoder 20121*b* or to a substrate of the memory cell array 20121*a*.

The page buffer 20121*d* may be connected with the memory cell array 20121*a* through the bit lines BL. Under control of the control logic and voltage generator block 20121*c*, the page buffer 20121*d* may control the bit lines BL such that write data provided from the input/output circuit 20121*e* is stored in the memory cell array 20121*a*. Under control of the control logic and voltage generator block 20121*c*, the page buffer 20121*d* may read data stored in the memory cell array 20121*a* and may provide the read data to the input/output circuit 20121*e*. For example, the page buffer 20121*d* may be provided with data from the input/output circuit 20121*e* by the page or may read data from the memory cell array 20121*a* by the page. In an embodiment, the page buffer 20121*d* may include data latches for temporarily storing data read from the memory cell array 20121*a* or data provided from the input/output circuit 20121*e*.

The input/output circuit 20121*e* may be provided with write data from an external device such as the device controller 20110 and may provide the write data to the page buffer 20121*d*. Alternatively, the input/output circuit 20121*e* may be provided with read data from the page buffer 20121*d* and may provide the read data to an external device such as the device controller 20110. For example, the input/output circuit 20121*e* may exchange data with an external device in synchronization with the control signal CTRL.

As described above, a storage device controller according to an embodiment of the disclosure may include a physical layer including a RAM and a RAM controller configured to control the RAM based on a RAM command and a RAM address provided from a host through a first pad, and a controller configured to control the physical layer and one or more nonvolatile memories based on a storage command and a storage address which are provided from a host through a second pad and are stored in the RAM, such that data is exchanged between the host and the one or more nonvolatile memories through the second pad. When receiving a test embodiment through a third pad, the controller may store test input data provided through the second pad. The stored test input data may be outputted through the second pad as test output data, and whether the physical layer is faulty may be determined based on the test input data is the same as the test output data.

The storage device controller may further include a plurality of processor cores each configured to perform an operation for controlling the physical layer and the one or more nonvolatile memories. In the case where the controller receives a test enable signal, a part of the processor cores may operate, and the remaining process cores of the processor cores other than the part may not operate. A part of the processor cores may be configured to drive firmware such that a test operation is performed in response to the test enable signal. Connections between the physical layer and a test device using the first and second pads may be reset in response to the test enable signal.

The RAM may include a command area configured to store a storage command and a storage address, a write area configured to temporarily store write data to be provided to the one or more nonvolatile memories from the host through the second pad, a read area configured to temporarily store read data to be provided to the processor from the one or more nonvolatile memories through the second pad, and a status area configured to store status information associated with the write data and the read data.

The test input data may be stored in all of the command area, the write area, the read area, and the status area. The physical layer may be configured to operate according to an interface protocol defined by a DIMM specification. The first pad may correspond to a command pin defined by the DIMM specification. The second pad may correspond to a data input/output pin defined by the DIMM specification. The third pad may correspond to a test enable pin defined by the DIMM specification. The RAM may be a DPSRAM.

According to an embodiment of the disclosure, a method for testing a fault of a storage device controller which includes first to third pads may include receiving a RAM write command and a RAM write address, corresponding to a write operation of a RAM of the storage device controller, through the first pad after a test enable signal is received through the third pad, storing test input data, received through the second pad, at a location of the RAM corresponding to the RAM write address, receiving a RAM read command and a RAM read address, corresponding to a read operation associated with the RAM, through the first pad, and reading stored test input data from a location of the RAM corresponding to the RAM read address in response to the RAM read command and outputting the read test input data through the second pad as test output data. Whether the storage device controller is faulty may be determined based on whether the test input data is the same as the test output data, and the third pad may correspond to a test enable pin defined by a DIMM specification.

The storage device controller may include a physical layer, including a RAM and a RAM controller configured to control the RAM based on a RAM write command, a RAM write address, a RAM read command and a RAM read address, and a controller configured to control the physical layer and one or more nonvolatile memories based on a storage command and a storage address, which are provided through the second pad and are stored in the RAM, such that write data provided through the second pad is stored in the one or more nonvolatile memories or such that read data read from the one or more nonvolatile memories is outputted through the second pad.

The RAM may include a command area configured to store a storage command and a storage address, a write area configured to temporarily store write data, a read area configured to temporarily store read data, and a status area configured to store status information associated with the write data and the read data.

According to an embodiment of the disclosure, a method for testing a fault of a storage device controller which includes a physical layer, including a RAM and a RAM controller configured to control the RAM based on a RAM command and a RAM address provided from a host through a first pad, and a controller configured to control the physical layer and one or more nonvolatile memories based on a storage command and a storage address, which are provided from a host through a second pad and are stored in the RAM, such that write data provided from the host through the second pad is temporarily stored in the RAM and is then stored in one or more nonvolatile memories or such that read data to be provided to the host through the second pad is read from the one or more nonvolatile memories and is then temporarily stored in the RAM, the method may include providing a test enable signal to the storage device controller through a third pad, providing test input data to the storage device controller after providing the test enable signal, receiving the test input data stored in the RAM as test output data, and testing a fault of the physical layer based on whether the test input data is the same as the test output data.

The providing of the test input data may include providing the RAM controller with a RAM write command and a RAM write address corresponding to a write operation about the RAM through the first pad, and storing the test input data at a location of the RAM corresponding to the RAM write address, based on the RAM write command. The receiving of the test input data may include providing a RAM read command and a RAM read address, corresponding to a read operation about the RAM, to the RAM controller through the first pad, and reading the stored test input data from a location of the RAM corresponding to the RAM read address as the test output data, based on the RAM read command.

The testing may include determining the physical layer as being normal in the case where the test input data is the same as the test output data, and determining the physical layer as being faulty in the case where the test input data is different from the test output data. The physical layer may be configured to operate according to an interface protocol defined by the DIMM interface.

According to an embodiment of the disclosure, a storage device may internally perform a link training sequence between a data buffer and a device controller, and thus the storage device may be recognized as RDIMM. In this case, even though the storage device according to an embodiment of the disclosure is used together with another RDIMM, collision may not occur.

Furthermore, the storage device according to an embodiment of the disclosure may selectively use link training sequences of the RDIMM and LRDIMM. In this case, even though the storage device according to an embodiment of the disclosure is used together with another RDIMM, collision may not occur.

Accordingly, it may be possible to improve communication speed and flexibility of the storage device.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to embodiments, it will be apparent to those skilled in the art that various changes and modifications may be made without departing from the spirit and scope of the disclosure. Therefore, it should be understood that the above embodiments are not limiting, but illustrative.

What is claimed is:

1. A nonvolatile memory module comprising:
a plurality of nonvolatile memories; and
a device controller controlling the nonvolatile memories, wherein
the device controller comprises:
a random access memory (RAM) inputting and outputting data, the RAM includes:
a write data area storing data to be written in the nonvolatile memories;
a command area receiving a nonvolatile memory command for controlling the nonvolatile memories;
a status area storing information indicating a state of the RAM; and
a read data area storing data read from the nonvolatile memories;
a command parser receiving and recognizing a command from an external host; and
a process, voltage, temperature (PVT) compensation unit performing a PVT compensation operation in response to a refresh command or a precharge command recognized by the command parser.

2. The nonvolatile memory module of claim 1, wherein the RAM is a dual port static random access memory (SRAM).

3. The nonvolatile memory module of claim 1, wherein:
the nonvolatile memory module further comprises a buffer memory temporarily storing input/output data,
the device controller further comprises a buffer memory and a memory controller controlling the nonvolatile memories, and
data inputted/outputted between the RAM and the memory controller is of a packet form.

4. The nonvolatile memory module of claim 3, wherein:
the nonvolatile memory module communicates with an external device using a double data rate (DDR) interface, and
the RAM and the memory controller communicate with each other using an advance extensible interface (AXI) interface.

5. The nonvolatile memory module of claim 1, wherein the PVT compensation unit comprises:
host interface layer firmware outputting at least one control signal for performing the PVT compensation operation in response to the refresh command or the precharge command; and
a core driving the host interface layer firmware.

6. The nonvolatile memory module of claim 1, wherein:
the nonvolatile memory module further comprises a buffer driver connected to at least one of a data pad, a data strobe signal pad and a ZQ pad, and
the PVT compensation unit adjusts a slew or a strength in response to the refresh command or the precharge command.

7. The nonvolatile memory module of claim 1, further comprising:
a clock buffer generating an internal clock based on a received clock; and
a duty cycle correction unit controlling a duty cycle of the clock buffer, wherein
the PVT compensation unit controls the duty cycle correction unit in response to the refresh command or the precharge command.

8. The nonvolatile memory module of claim 1, wherein the PVT compensation unit determines a delay of a data signal or a data strobe signal by adjusting delay-tap delay cells in response to the refresh command or the precharge command.

9. The nonvolatile memory module of claim 1, wherein the nonvolatile memory module further comprises data buffers buffering data of the RAM and exchanging data with an external device.

10. The nonvolatile memory module of claim 9, wherein the PVT compensation unit performs a PVT compensation operation of each of the data buffers in response to the refresh command or the precharge command.

11. A computing system comprising:
a processor;
at least one dual in-line memory module connected to the processor through a first double data rate (DDR) slot; and
at least one nonvolatile memory module connected to the processor through a second DDR slot, wherein:
the at least one nonvolatile memory module performs a PVT compensation operation in response to a refresh command or a precharge command received from the processor,
the at least one nonvolatile memory module comprises:
at least one buffer memory;
a plurality of nonvolatile memories; and
a device controller controlling the at least one buffer memory and the nonvolatile memories, and
the device controller comprises:
a physical layer receiving and outputting data through a DDR interface from and to the processor and performing a PVT compensation operation; and
a memory controller receiving and outputting data of the physical layer through a memory interface.

12. The computing system of claim 11, wherein the at least one nonvolatile memory module further comprises data buffers buffering data received from the processor to transmit the buffered data to the physical layer or buffering data read from the physical layer to output the buffered read data to the processor.

13. The computing system of claim 11, wherein the at least one nonvolatile memory module further comprises a plurality of volatile memories receiving and outputting data from and to the processor through the DDR interface.

14. A nonvolatile memory module comprising:
a plurality of nonvolatile memories; and
a device controller controlling the nonvolatile memories, wherein:
the device controller comprises:
a random access memory (RAM) inputting and outputting data,
a command parser receiving and recognizing a command from an external host, and
a process, voltage, temperature (PVT) compensation unit performing a PVT compensation operation in response to a refresh command or a precharge command recognized by the command parser; and
the PVT compensation unit determines a delay of a data signal or a data strobe signal by adjusting delay-tap delay cells in response to the refresh command or the precharge command.

* * * * *